(12) United States Patent
Haddock et al.

(10) Patent No.: US 10,077,562 B2
(45) Date of Patent: Sep. 18, 2018

(54) MOUNTING DEVICE FOR BUILDING SURFACES HAVING ELONGATED MOUNTING SLOT

(71) Applicants: Dustin M. M. Haddock, Colorado Springs, CO (US); Robert M. M. Haddock, Colorado Springs, CO (US)

(72) Inventors: Dustin M. M. Haddock, Colorado Springs, CO (US); Robert M. M. Haddock, Colorado Springs, CO (US)

(*) Notice: Subject to any disclaimer, the term of this patent is extended or adjusted under 35 U.S.C. 154(b) by 0 days.

(21) Appl. No.: 15/621,092

(22) Filed: Jun. 13, 2017

(65) Prior Publication Data

US 2017/0275889 A1   Sep. 28, 2017

Related U.S. Application Data

(63) Continuation of application No. 15/452,388, filed on Mar. 7, 2017, now abandoned, which is a
(Continued)

(51) Int. Cl.
*A47B 97/00* (2006.01)
*E04F 13/08* (2006.01)
(Continued)

(52) U.S. Cl.
CPC ............ *E04F 13/0842* (2013.01); *E04B 1/61* (2013.01); *F24S 25/615* (2018.05); *F24S 25/636* (2018.05);
(Continued)

(58) Field of Classification Search
CPC . F16B 2/065; F16M 13/02; F16L 3/16; H02S 20/23; E04D 13/031
See application file for complete search history.

(56) References Cited

U.S. PATENT DOCUMENTS 2,429,833 A   10/1947  Luce
2,714,037 A    7/1955  Singer et al.
(Continued)

FOREIGN PATENT DOCUMENTS

AU   2009101276   1/2010
DE     10056177   5/2002
(Continued)

OTHER PUBLICATIONS

Kee Walk-Roof Top Walkway [online], [retrieved on Mar. 1, 2012], Retrieved from http://simplifiedsafety.com/solutions/keewalk-rooftop-walkway/.
(Continued)

*Primary Examiner* — Amy J. Sterling
(74) *Attorney, Agent, or Firm* — Marsh Fischmann & Breyfogle LLP

(57) ABSTRACT

A mounting device or bracket for paneled building surfaces is disclosed. The mounting bracket includes an upper wall in the form of a flat surface for supporting various types of attachments. An elongated mounting slot extends through the upper wall, and the mounting bracket includes an elongated nut receptacle that is positioned below this elongated mounting slot. With an attachment being positioned on the upper wall, an attachment fastener may be directed through the attachment, then through the elongated mounting slot, and then may be threadably engaged with a nut that is positioned within and movable along the nut receptacle in its elongated dimension. The elongated configuration of the mounting slot and nut receptacle provides adjustability for the position of the attachment fastener relative to the mounting bracket, including after the mounting bracket has already been installed on the building surface.

25 Claims, 40 Drawing Sheets

Related U.S. Application Data continuation of application No. 14/500,919, filed on Sep. 29, 2014, now Pat. No. 9,611,652, which is a continuation-in-part of application No. 14/444,405, filed on Jul. 28, 2014, now abandoned, which is a continuation of application No. 13/403,463, filed on Feb. 23, 2012, now Pat. No. 8,833,714, said application No. 14/500,919 is a continuation-in-part of application No. 14/005,784, filed as application No. PCT/US2012/029160 on Mar. 15, 2012, now Pat. No. 9,530,916.

(60) Provisional application No. 61/446,787, filed on Feb. 25, 2011, provisional application No. 61/454,011, filed on Mar. 18, 2011.

(51) Int. Cl.
| | |
|---|---|
| *E04B 1/61* | (2006.01) |
| *F24S 25/615* | (2018.01) |
| *F24S 25/636* | (2018.01) |
| *H02S 20/00* | (2014.01) |
| *H02S 20/22* | (2014.01) |
| *E04B 1/38* | (2006.01) |
| *F24S 25/60* | (2018.01) |

(52) U.S. Cl.
CPC ............ *H02S 20/00* (2013.01); *H02S 20/22* (2014.12); *E04B 2001/405* (2013.01); *F24S 2025/6008* (2018.05); *Y02B 10/10* (2013.01); *Y02E 10/47* (2013.01); *Y02E 10/50* (2013.01)

(56) References Cited

U.S. PATENT DOCUMENTS

| | | | |
|---|---|---|---|
| 2,875,805 A | 3/1959 | Flora | |
| 3,095,672 A | 7/1963 | Di Tullio et al. | |
| 4,475,776 A | 10/1984 | Teramachi | |
| 4,905,444 A | 3/1990 | Semaan et al. | |
| 5,743,063 A | 4/1998 | Boozer | |
| 5,809,703 A | 9/1998 | Kelly | |
| 5,890,340 A | 4/1999 | Kafarowski | |
| 8,109,048 B2 | 2/2012 | West et al. | |
| 8,146,299 B2 | 4/2012 | Stearns et al. | |
| 8,151,522 B2 | 4/2012 | Stearns et al. | |
| 8,153,700 B2 | 4/2012 | Stearns et al. | |
| 8,701,354 B2 | 4/2014 | Stearns et al. | |
| 8,826,618 B2 | 9/2014 | Stearns | |
| 8,833,714 B2 | 9/2014 | Haddock et al. | |
| 8,910,928 B2* | 12/2014 | Header | E04D 13/10 269/91 |
| 8,966,833 B2 | 3/2015 | Ally | |
| 9,011,034 B2* | 4/2015 | Liu | F16B 2/065 403/256 |
| 9,134,044 B2 | 9/2015 | Stearns et al. | |
| 9,530,916 B2 | 12/2016 | Haddock et al. | |
| 9,534,390 B2* | 1/2017 | Pendley | E04D 13/031 |
| 9,611,652 B2 | 4/2017 | Haddock et al. | |
| 9,647,433 B2* | 5/2017 | Meine | H02S 40/36 |
| 9,722,532 B2* | 8/2017 | Almy | H02S 20/23 |
| 2008/0236520 A1 | 10/2008 | Maehara et al. | |
| 2009/0320826 A1 | 12/2009 | Kufner | |
| 2011/0271611 A1 | 11/2011 | Maracci et al. | |
| 2012/0102853 A1 | 5/2012 | Rizzo | |
| 2015/0107168 A1 | 4/2015 | Kobayashi | |
| 2016/0025262 A1 | 1/2016 | Stearns et al. | |
| 2017/0067258 A1 | 3/2017 | Stearns et al. | |

FOREIGN PATENT DOCUMENTS

| | | |
|---|---|---|
| EP | 1804008 | 7/2007 |
| EP | 2105971 | 9/2009 |
| GB | 2465484 A | 5/2010 |
| JP | 2003-155803 | 5/2003 |
| WO | 2003098126 A1 | 11/2003 |
| WO | 2012017711 | 2/2012 |
| WO | 2012048056 | 4/2012 |
| WO | 2012125327 A2 | 9/2012 |
| WO | 2013009375 A1 | 1/2013 |
| WO | 2014016882 | 1/2014 |

OTHER PUBLICATIONS

Miller Fusion Roof Anchor Post [online], [retrieved on Mar. 1, 2012], Retrieved from http://millerfallprotection.com/fall-protection-products/roofing-products/miller-fusion-roof-anchor-post.
KeeLine The Safety Solution for Horizontal Lines [online], [retrieved on Mar. 1, 2012], Retrieved from http://keesafety.co.uk/products/kee_line, Reading, United Kingdom.
New "Alzone 360 system" [online], [retrieved Mar. 1, 2012], Retrieved from http://www.arrid.com.au/?act=racking_parts, Australia.
REES—Snow Retention Systems [online], [retrieved Mar. 1, 2012], Retrieved from http://www.rees-oberstdorf.de/en/products/snow-retention-system.html.
EJOT Solar Fastening System for Trapezoidal and Corrugated Metal Profile Roofs/Sandwich Panels [online], [retrieved Mar. 1, 2012], Retrieved from http://www.ejot.com/ejot.de/EJOT_Solarbefestiger-fuer-Trapez-_und_WellprofilSandwichelemente--4608,websiteLang_en.htm.
Schuco mounting system MSE 21-On-Roof [online], [retrieved Mar. 1, 2012], Retrieved from http://www.schueco.com/web/de-en/partner/solarstrom_und_waerme/products/photovoltaik/kristalline_pv-module/montagesystem_mse_210/8319272.
Schletter Solar-Mounting Systems Component Overview 2011 [online], [retrieved Mar. 6, 2012], Reterieved from http://www.schletter.de/152-1-Solar-mounting-system.html.
IDEEMATIC Tracking & Mounting Systems [online], Apr. 2008, [retrieved Mar. 6, 2012], Retrieved from http://www.ideematec.de. SafeTec Solar brackets brochure, IDEEMATEC, Germany.

\* cited by examiner

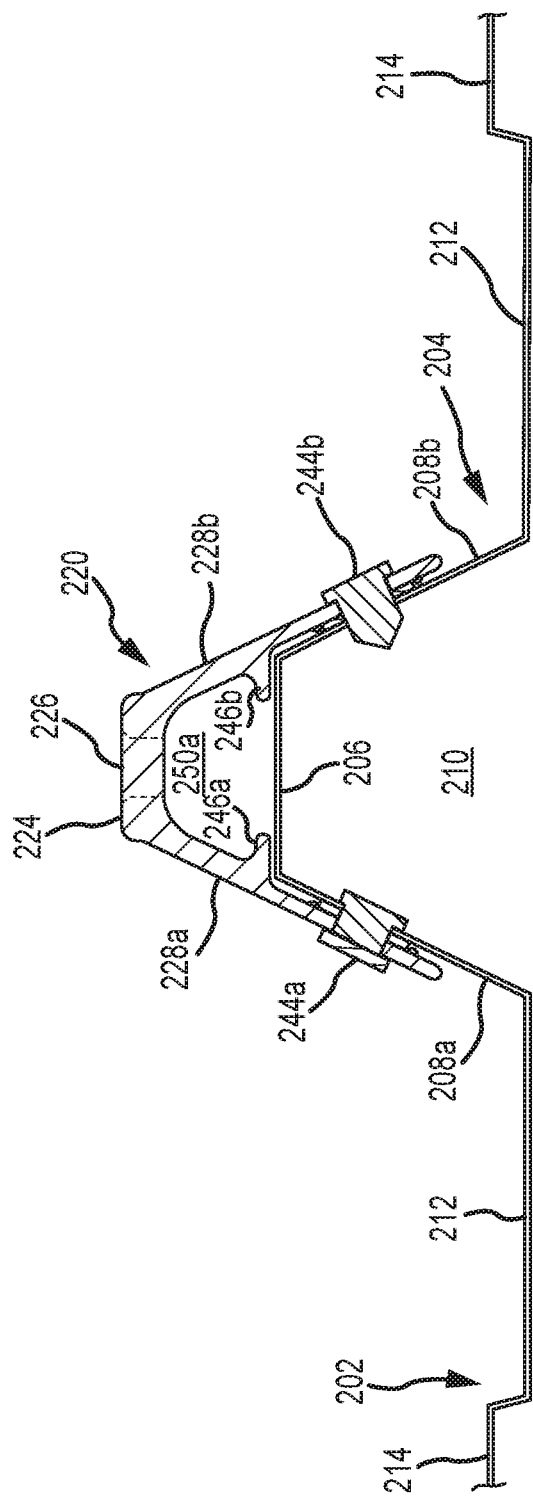

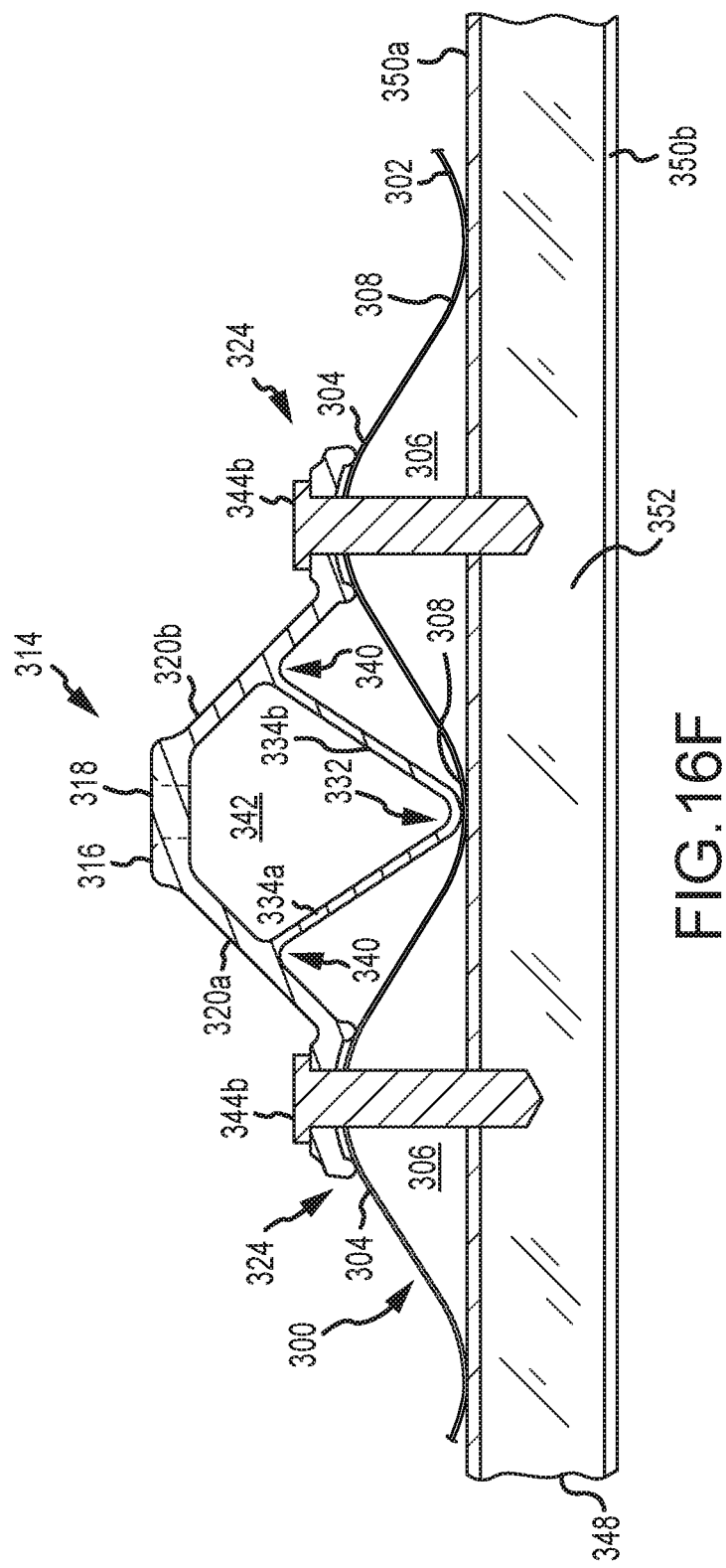

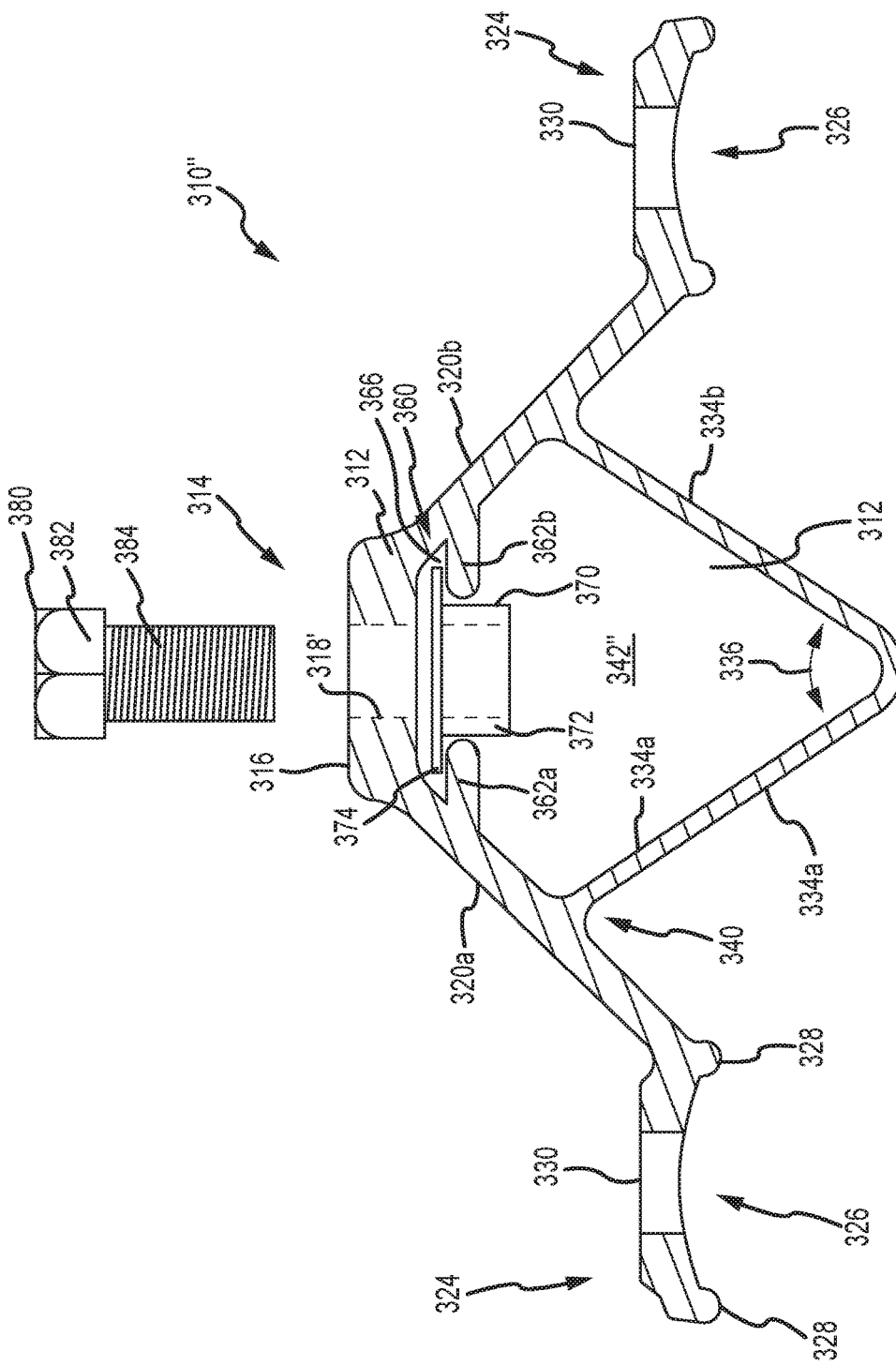

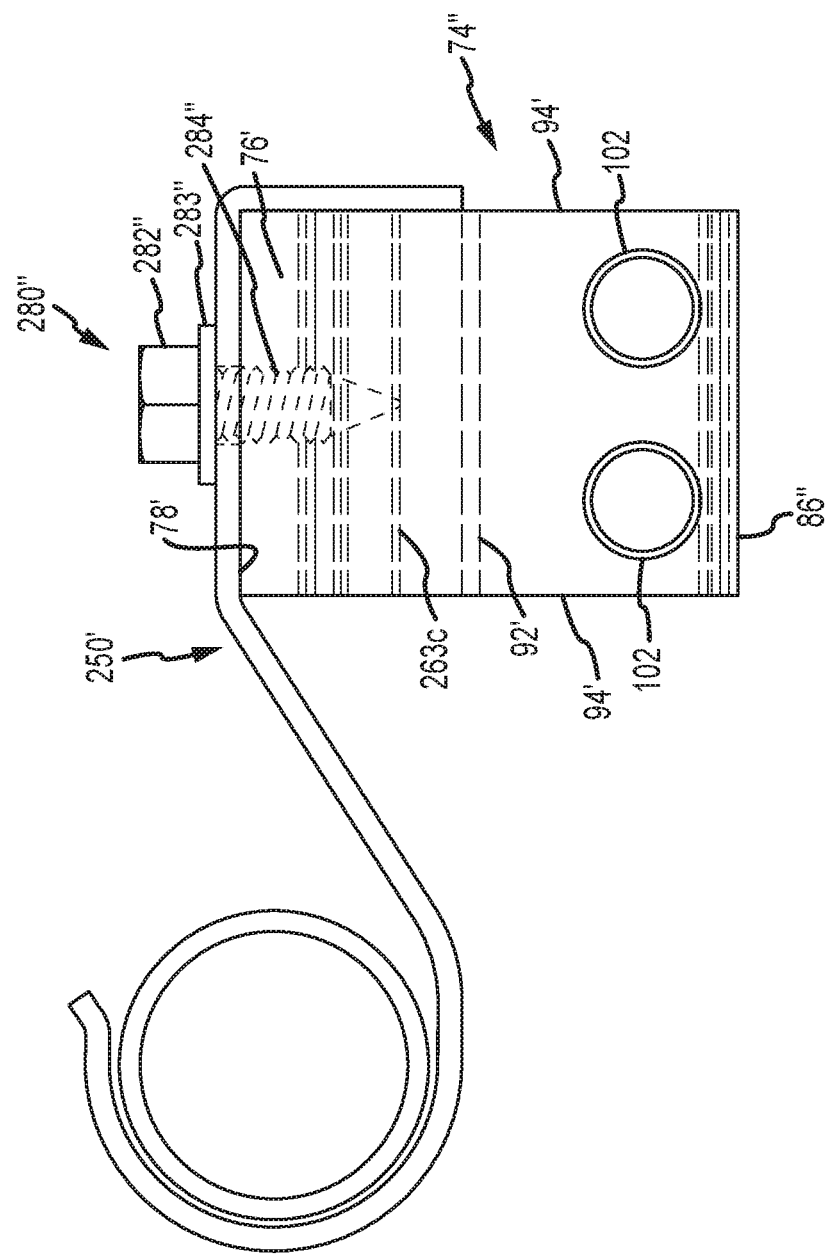

US 10,077,562 B2

MOUNTING DEVICE FOR BUILDING SURFACES HAVING ELONGATED MOUNTING SLOT

CROSS-REFERENCE TO RELATED APPLICATIONS

This patent application is a continuation of U.S. patent application Ser. No. 15/452,388, that was filed on Mar. 7, 2017, which is a continuation of U.S. patent application Ser. No. 14/500,919, that was filed on Sep. 29, 2014 (U.S. Pat. No. 9,611,652), which is a continuation-in-part of the following: 1) U.S. patent application Ser. No. 14/444,405, that was filed on Jul. 28, 2014, which is a continuation of U.S. patent application Ser. No. 13/403,463, that was filed on Feb. 23, 2012 (now U.S. Pat. No. 8,833,714), which claims the benefit of U.S. Provisional Patent Application Ser. No. 61/446,787, that was filed on Feb. 25, 2011; and 2) U.S. patent application Ser. No. 14/005,784, having a 371(c) date of Jun. 13, 2014 (now U.S. Pat. No. 9,530,916), which is a U.S. National Stage of PCT/US2012/029160, filed 15 Mar. 2012, which claims the benefit of U.S. Provisional Patent Application Ser. No. 61/454,011, that was filed on Mar. 18, 2011. Priority is claimed to each patent application set forth in this "CROSS-REFERENCE TO RELATED APPLICATIONS, and the entire disclosure of each patent application set forth in this "CROSS-REFERENCE TO RELATED APPLICATIONS" section is hereby incorporated by reference.

FIELD OF THE INVENTION

The present invention generally relates to installing structures on a building surface and, more particularly, to mounting devices for installing attachments on such a building surface.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY

A first aspect of the present invention is embodied by a building system that in turn includes a building surface and a mounting device. The building surface is defined by a plurality of interconnected panels (e.g., any appropriate type of metal panel). The mounting device is maintained in a fixed position relative to this building surface and includes an upper wall, a mounting slot that is not threaded, and a nut receptacle. The upper wall is disposed in spaced relation to an underlying portion of the building surface, and where the mounting slot extends through this upper wall and is elongated in a first dimension. The nut receptacle is aligned with the mounting slot, is also elongated in the same first dimension, and is located between the building surface and the mounting slot (e.g., the nut receptacle may be characterized as being disposed under or beneath the mounting slot). At least part of a nut is disposed and retained within the nut receptacle in a manner such that the nut remains movable along the nut receptacle in the first dimension. An attachment fastener extends through the mounting slot and is threadably engaged with the nut (again where this nut is at least partially disposed and retained within the nut receptacle). The attachment fastener may be disposed in a number of different positions along the mounting slot in the noted first dimension, and furthermore may be threadably engaged with the nut in each of these positions by moving the nut along the nut receptacle in the first dimension and into alignment with the attachment fastener.

A second aspect of the present invention is embodied by a building system that in turn includes a building surface and a mounting device. The building surface is defined by a plurality of interconnected panels (e.g., any appropriate type of metal panel). The mounting device is maintained in a fixed position relative to this building surface, and includes an upper wall and a mounting slot. The upper wall is disposed in spaced relation to an underlying portion of the building surface, where the mounting slot extends through this upper wall, is elongated in a first dimension, and is free from threads (e.g., a perimeter wall that defines the mounting slot does not include threads, and for instance may be in the form of a smooth surface). An attachment fastener extends through the mounting slot and is threadably engaged with a nut that is located between the upper wall and the building surface. The attachment fastener may be disposed in a number of different positions along the mounting slot in the noted first dimension.

A number of feature refinements and additional features are separately applicable to each of the above-noted first and second aspects of the present invention as well. These feature refinements and additional features may be used individually or in any combination in relation to each of the first and second aspects.

The mounting device may be of any appropriate configuration. Moreover, the mounting device may be of one-piece construction, where the mounting device lacks a joint of any kind between adjacent portions of the mounting device. In one embodiment, the entire mounting device is in the form of an extrusion, and which provides the noted one-piece construction. The mounting device may be formed from any appropriate material or combination of materials, such as an appropriate metal alloy.

The mounting device may be directly attached to the building surface. One embodiment has one or more fasteners that extend through a corresponding portion of the mounting device and into engagement with only an exterior of the building surface (e.g., the fasteners do not penetrate the building surface in this instance). Another embodiment has one or more fasteners that extend through a corresponding portion of the mounting device and also through an aligned portion of the building surface (e.g., the fasteners penetrate the building surface in this instance).

The building surface may include a plurality of building surface protrusions (e.g., standing seams, ribs) that are disposed in parallel relation to one another. The mounting slot may be elongated in a dimension that is parallel to these building surface protrusions. In one embodiment the length of the mounting slot is three times or more greater than the width of the mounting slot. The mounting device may be characterized as having first and second ends that are spaced from one another. The mounting slot may be elongated in a dimension that the first and second ends of the mounting device are spaced from one another.

A nut receptacle may be positioned below the upper wall of the mounting device, including immediately below this upper wall. This nut receptacle may be elongated in the same first dimension as the mounting slot. The nut receptacle may be configured to allow a nut to be moved along the nut receptacle in the first dimension, but to limit the amount that this nut may be moved in a direction that is away from the upper wall of the mounting device (e.g., the nut receptacle may be configured to retain at least part of the nut within the nut receptacle).

The nut receptacle may be defined at least in part by a base that is spaced from an underside of the upper wall. This base may be configured to retain at least part of the nut within the nut receptacle in a dimension that corresponds with a depth of the mounting slot. In this regard and in one embodiment, the base includes a pair of base surfaces that are spaced from one another and that each project in the direction of the upper wall. These base surfaces may support the underside of two opposing portions of the nut (e.g., a nut flange; a bottom of the nut), at least prior to threadably interconnecting the attachment fastener with the nut. Moreover, these base surfaces may define the maximum amount that the nut is able to move in a direction that is away from the upper wall when disposed within the nut receptacle.

The nut receptacle may be defined at least in part by a pair of base surfaces, where these two base surfaces are disposed opposite of one another and project or face toward each other. Each such base surface may be associated with a flat on a sidewall of the nut. These base surfaces may be spaced from each other such that each of the noted flats is unable to be rotated past their corresponding base surface.

The nut may include both a nut flange and a nut body. The nut receptacle may include a nut flange receptacle and a nut body receptacle (including where the nut flange receptacle is located between the nut body receptacle and the upper wall), where a width of the nut flange receptacle is larger than a width of the nut body receptacle. An entirety of the nut flange may be retained in the nut flange receptacle, while the nut body may at least extend into the nut body receptacle. The effective outer diameter of the nut flange may be larger than a width of the nut body receptacle, for instance for retaining the nut flange within the nut receptacle. The bottom of the nut body receptacle may be open (e.g., at least part of the nut body may extend entirely through the nut body receptacle), or the nut body receptacle may be closed.

The base may be defined by first and second base portions, where the nut body receptacle extends between these first and second base portions. The first and second base portions may be disposed at least substantially adjacent to, in closely spaced relation with, or in contact with a corresponding portion of a sidewall of the nut body. Such a relative positioning limits the amount that the nut should be able to rotate relative to the mounting device (e.g., when rotating the attachment fastener to threadably engage the attachment fastener with the nut). In one embodiment only minimum relative rotational movement is allowed between the nut and the mounting device to facilitate threading of the attachment fastener into/through the nut, such as when securing an attachment to the mounting device.

Any references herein to "above," "below," or the like are in relation to the mounting device or bracket being in an upright position. References herein to a "vertical" dimension is that which coincides with an upright position or orientation for the mounting device or bracket. In a roofing application, the pitch of the roof may define the baseline for what is "upright" for purposes of a mounting device or bracket. That is, the noted vertical dimension may be characterized as being the dimension that is orthogonal to the pitch of the roof in this case (e.g., the upper wall of the mounting bracket may be disposed above an upper rib wall of a trapezoidal rib on which the mounting device or bracket is positioned, where "above" is measured in the noted vertical dimension (e.g., orthogonal to the pitch of the roof in this case)).

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof. Finally, a reference of a feature in conjunction with the phrase "in one embodiment" does not limit the use of the feature to a single embodiment.

BRIEF DESCRIPTION OF THE FIGURES

FIG. 12D is a cross-sectional view of the mounting bracket of FIG. 12A when installed on a trapezoidal rib of a trapezoidal rib panel.

FIG. 16F is a cross-sectional view of the mounting bracket of FIG. 16A when installed on a corrugated panel for a third installation configuration, where bracket fasteners are anchored in a Z-shaped purlin that supports the corrugated panel.

FIG. 23 shows a nut disposed in the nut receptacle of the mounting bracket of FIG. 22, along with a corresponding attachment fastener.

FIG. 25C is a side view of the mounting bracket of FIG. 25A, along with a corresponding attachment fastener and attachment.

DETAILED DESCRIPTION

Figure 1:
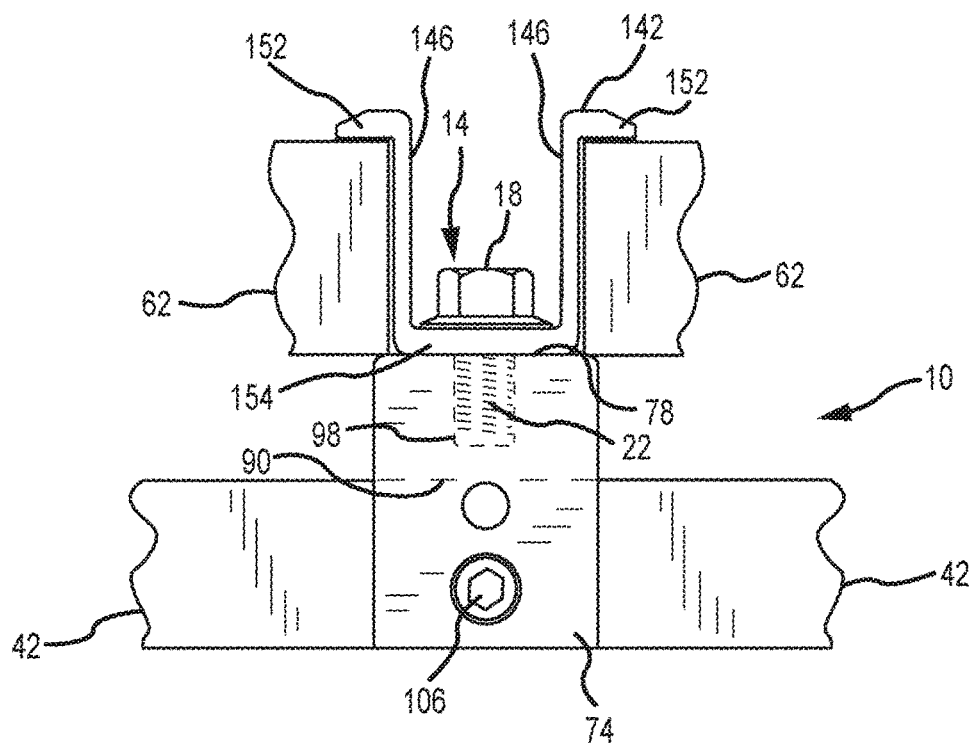
FIG. 1 is a side view of a prior art mounting assembly for interconnecting solar cell modules with a standing seam roof.
Figure 2:
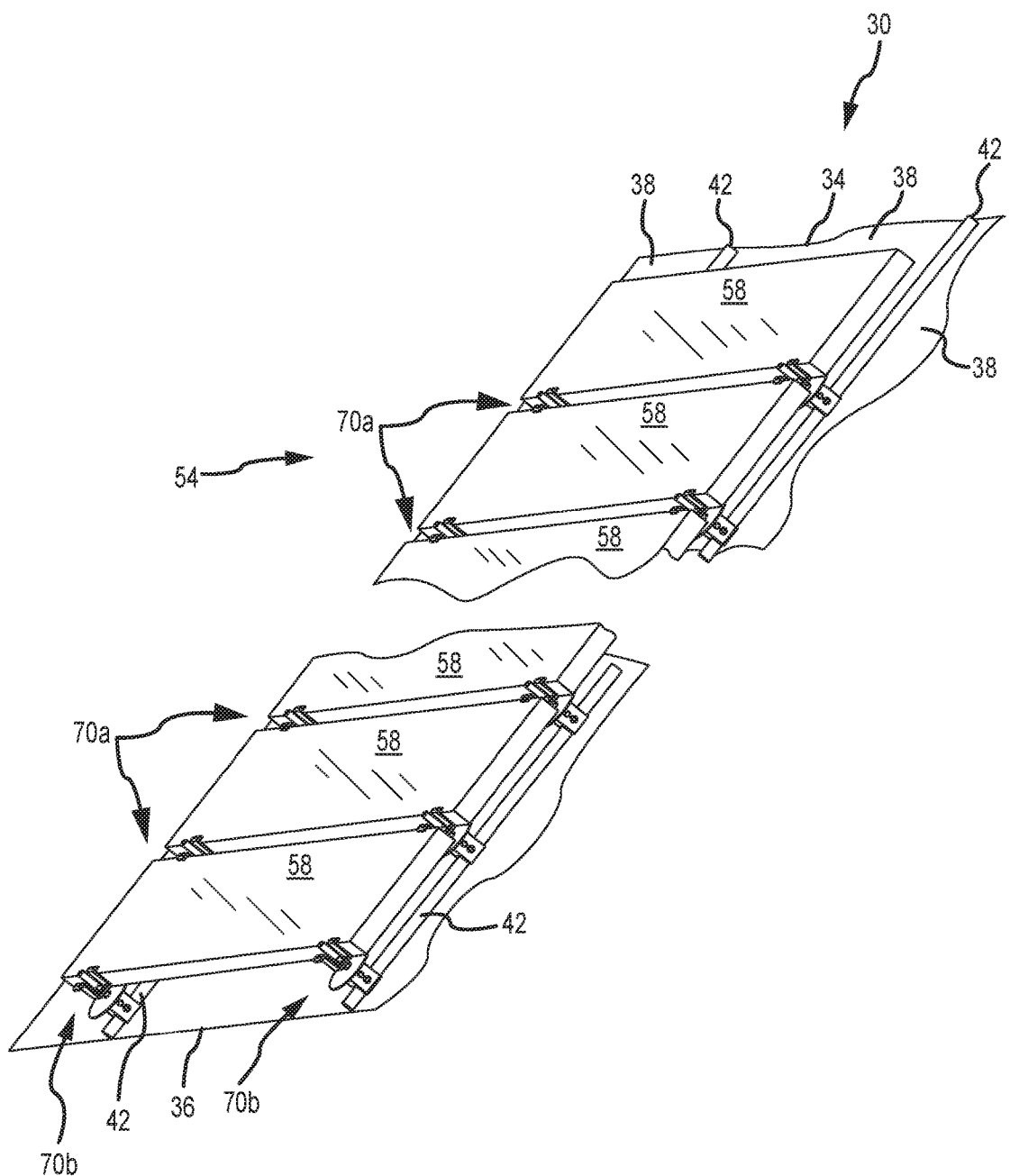
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
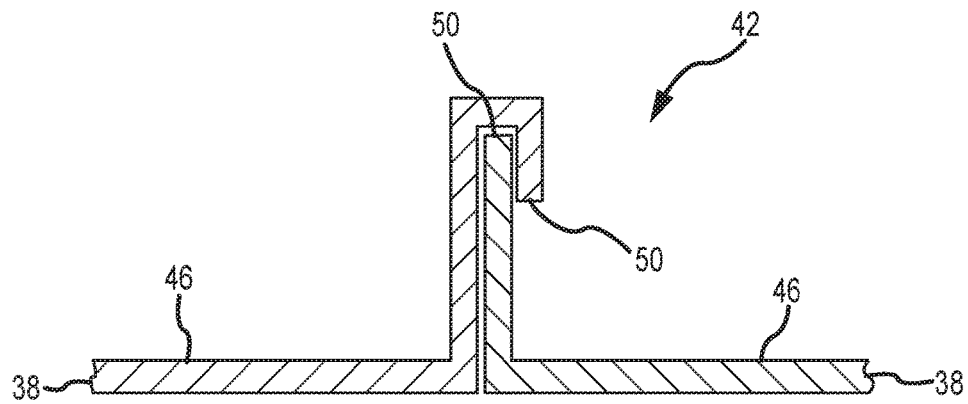
FIG. 3 is a cross-sectional schematic of a representative standing seam defined by interconnecting a pair of panels.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

Figure 4:
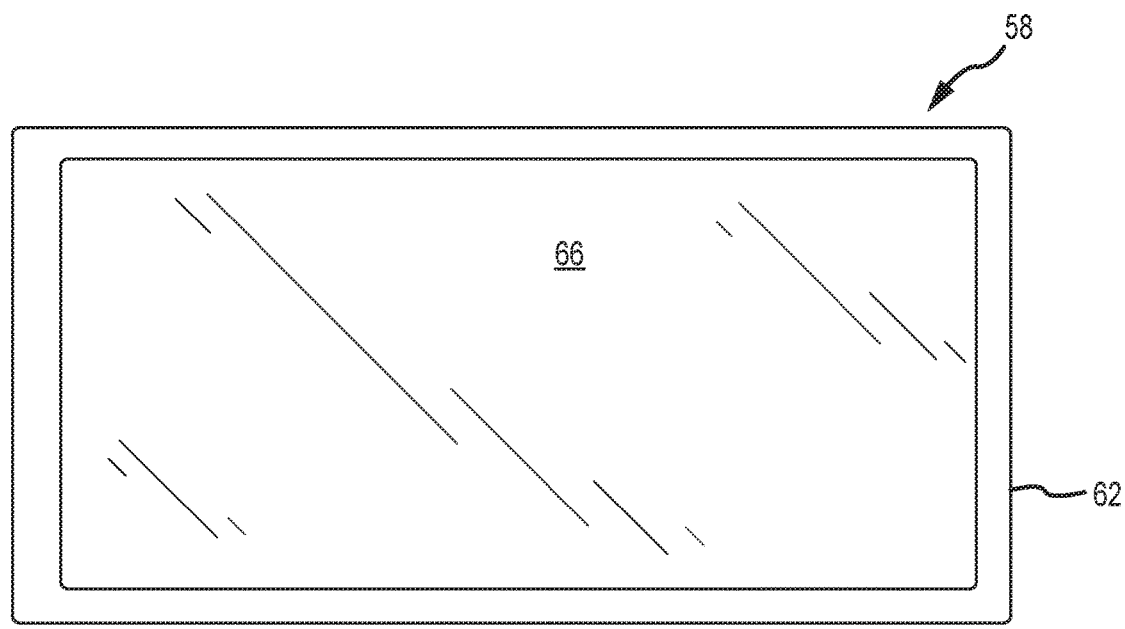
FIG. 4 is a top view of one of the solar cell modules illustrated in FIG. 2.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
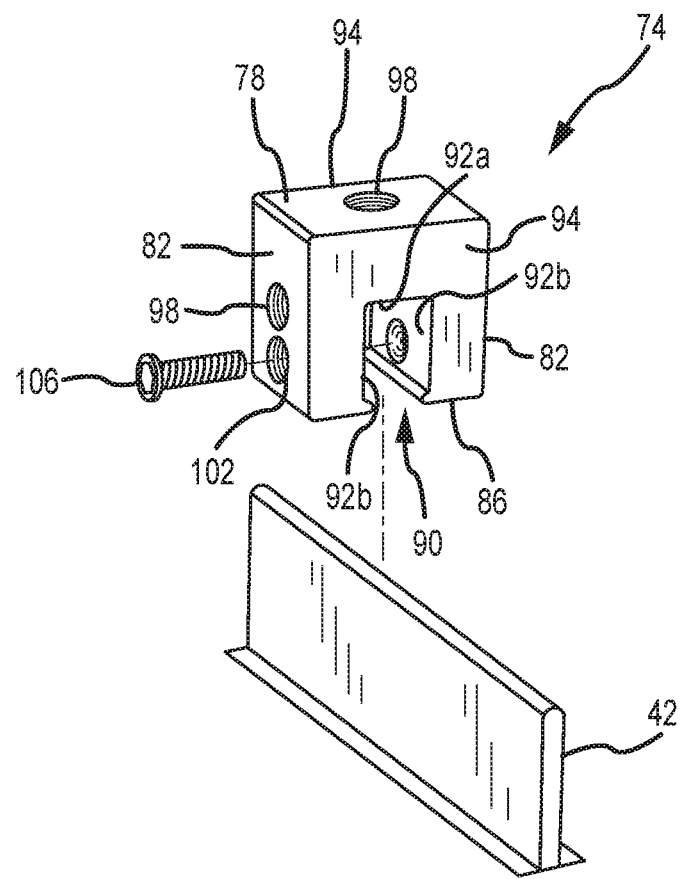
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
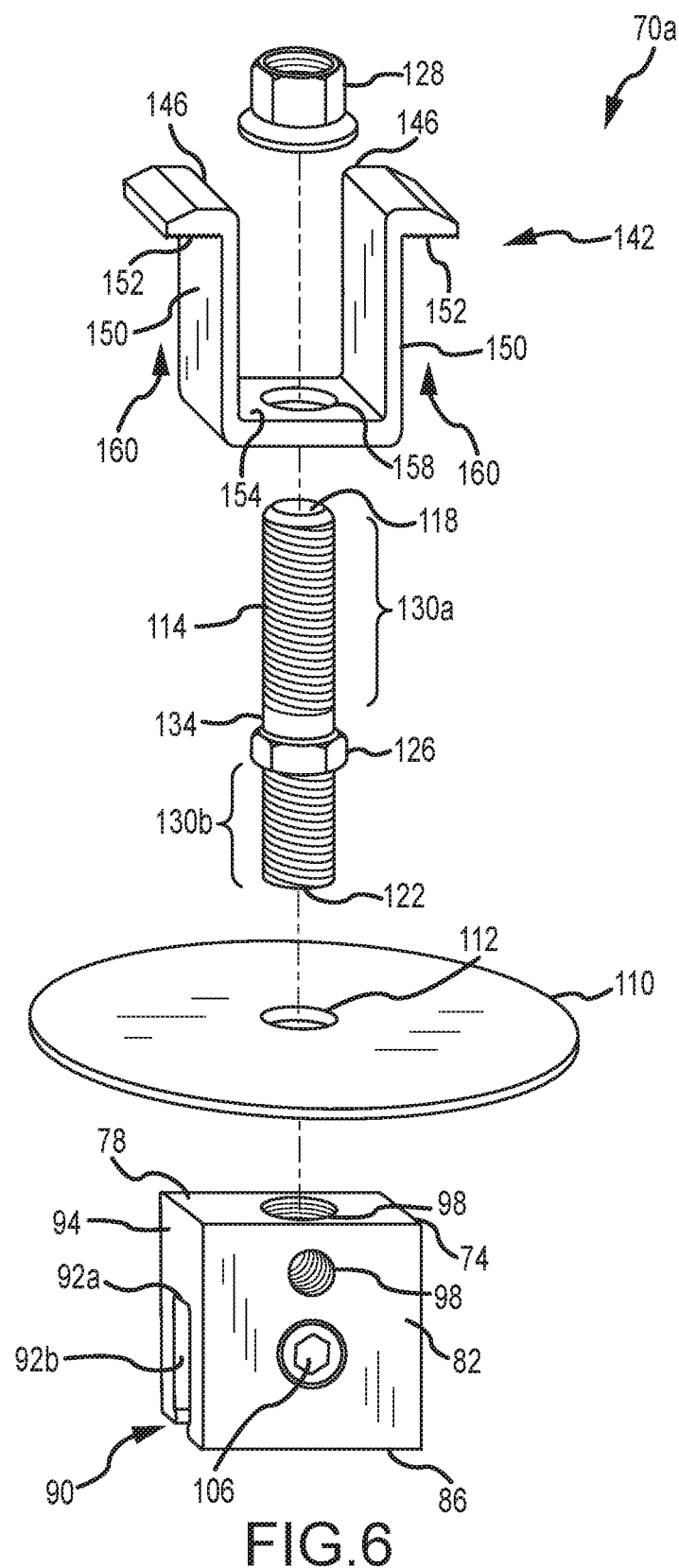
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
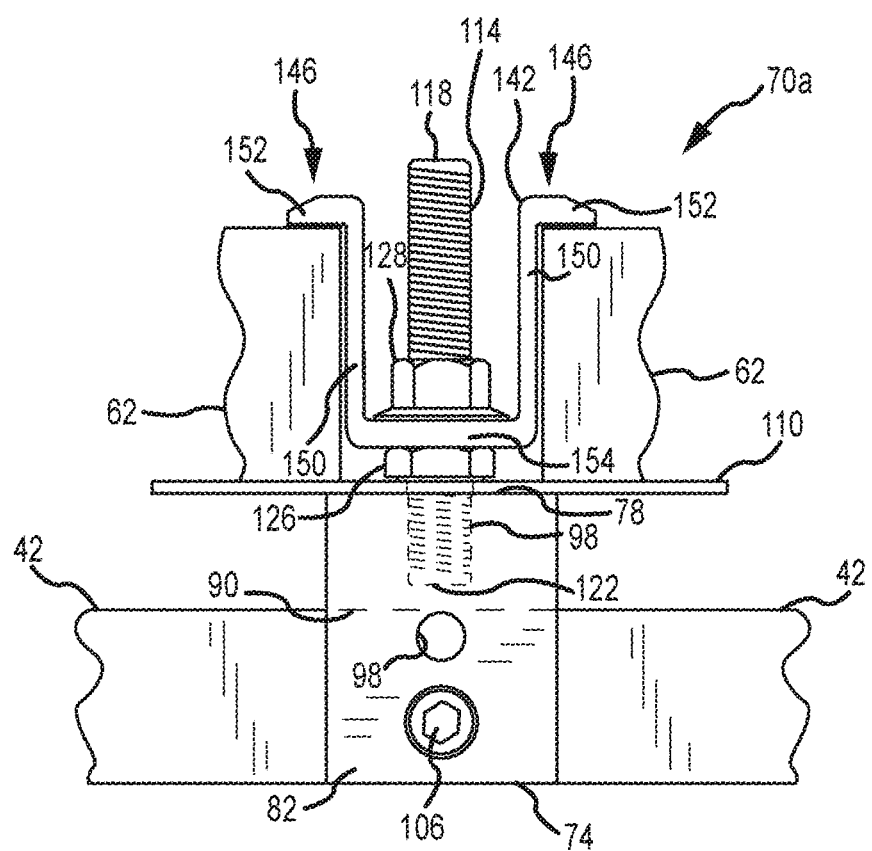
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
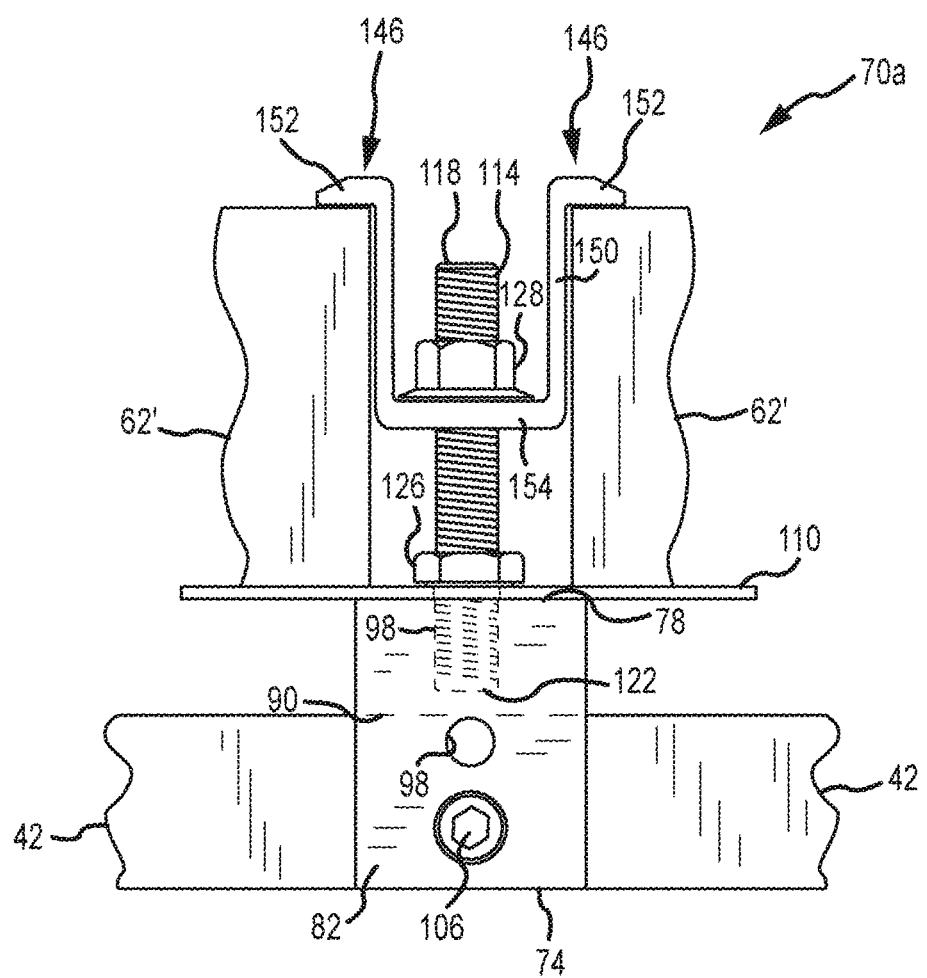
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
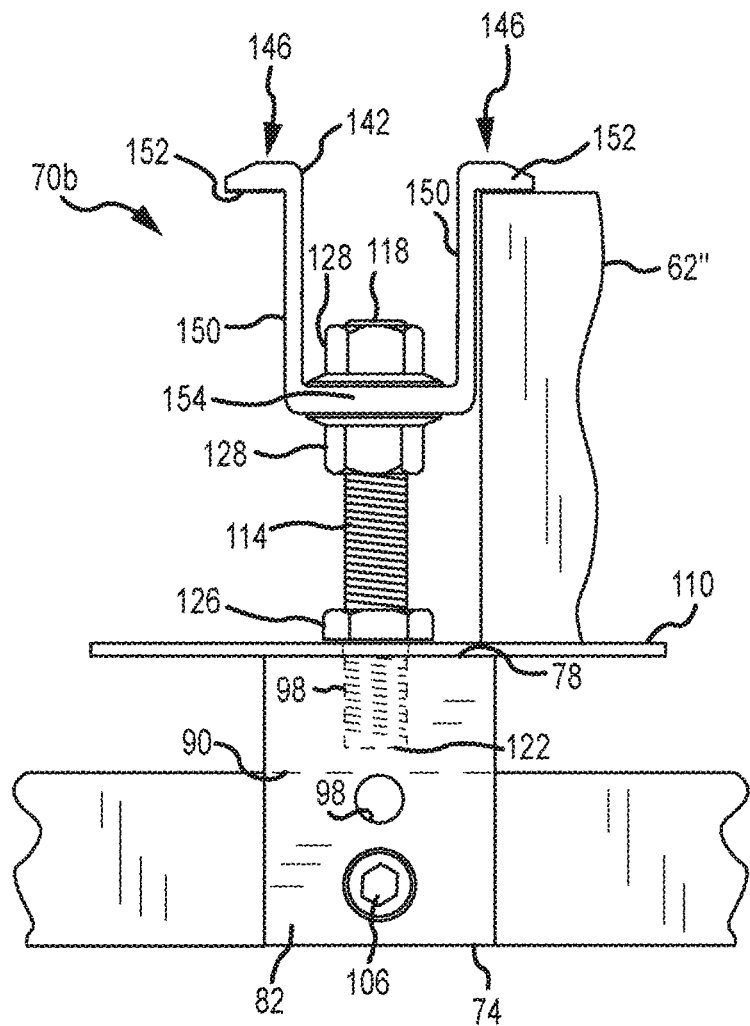
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70*b* and the mounting assembly 70*a* is that an additional nut 128 is used by the mounting assembly 70*b*. Therefore, the remainder of the discussion presented above also applies to the mounting assembly 70*b*.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70*c*. Corresponding components between the mounting assembly 70*c* and the above-discussed mounting assembly 70*a* are identified by the same reference numerals. Those corresponding components between these two embodiments that differ in at least some respect are identified by the same reference numeral, but with a "single prime" designation in relation to the mounting assembly 70*c*.

The mounting assembly 70*c* of FIGS. 8A-F utilizes the above-discussed mounting device 74, clamping member 142, and stud 114. All of the features discussed above in relation to each of these components remain equally applicable to the mounting assembly 70*c*. The mounting assembly 70*c* does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70*a*, and therefore the noted "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70*c*, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. Consider the case where the ends 94 of the mounting device 74 define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc), and yet at least one grounding projection 172 will engage each photovoltaic module being mounted to a building surface by the clamp assembly 70*c*. The "angle" of each such grounding projection 172 is the angle between first and second reference lines that are disposed within a common plane, the first reference line remaining in a fixed position relative to the mounting plate 110' and extending from the stud 114, for instance, to the noted 12 o'clock position. The second reference line may also extend from the stud 114 to a particular grounding projection 172, and thereby may rotate along with the mounting plate 110' as its angular position is adjusted relative to the stud 114 and/or mounting device 74.

The grounding projections 172 may facilitate establishing an electrical connection with and/or assisting in grounding one or more photovoltaic modules. The grounding projections 172 may be characterized as providing electrical continuity between adjacent photovoltaic modules that are positioned on the same mounting plate 110' (e.g., an electrical path may encompass the frame of one photovoltaic module, one or more grounding projections 172 engaged therewith, the mounting plate 110', one or more additional grounding projections 172, and the frame of another photovoltaic module engaged by such an additional grounding projection(s) 172). This may be referred to in the art as "bonding." In any case, the grounding projections 172 may be used in providing a grounding function for a corresponding photovoltaic module(s). The noted electrical connection provided by the grounding projections 172 may be used to electrically connect adjacent photovoltaic modules (e.g., those positioned on a common mounting plate 110'), and which may be used to provide an electrical path to ground a string or collection of photovoltaic modules.

The mounting device 110' also includes a raised structure 174 on its upper surface 170. The raised structure 174 may be disposed about the un-threaded hole 112 in the mounting plate 110' and through which the stud 114 passes. Generally and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each an adjacent pair of photovoltaic modules being clamped by a common mounting assembly 70*c*.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both.

In one embodiment, the number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used the support and/or retain the quick-connect lead(s) associated with one of the photovoltaic modules being clamped by the corresponding mounting assembly 70c (e.g., by being positioned within the space between the second segment 180b of a given wiring clip 178 and the lower surface 176 of the mounting plate 110', for instance by resting in a concave portion of the second segment 180b in the form of the noted recessed region 182). Other wires could be directed into the space between the second segment 180b of a given wiring clip 178 and the lower surface 176 of the mounting plate 110'.

Another function is indirectly provided by the wiring clips 178. The aperture 184 associated with each wiring clip 178 provides a space through which an installer may direct cable or zip tie or the like to bundle together various wires that may be located at a lower elevation than the mounting plate 110' (e.g., wires underneath the mounting assembly 70c; wires underneath a photovoltaic module being clamped by the mounting assembly 70c; wires in a space between a pair of photovoltaic modules being clamped by the mounting assembly 70c).

Figure 8A:
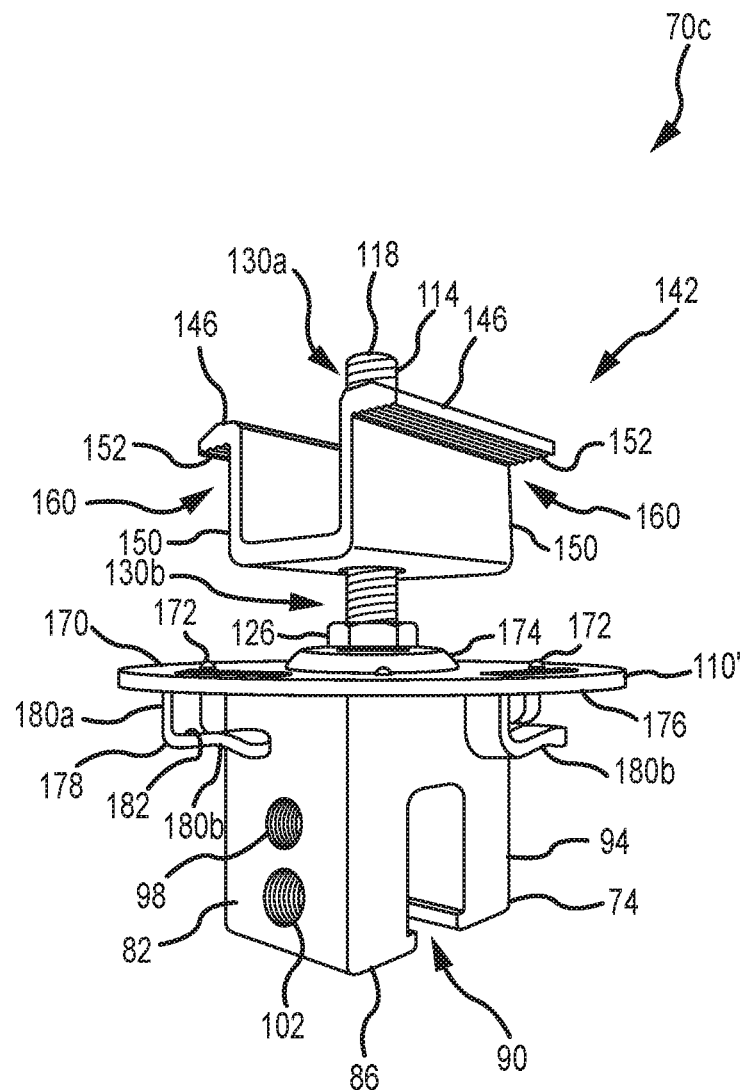
FIG. 8A is one side-based perspective view of another embodiment of a mounting assembly for photovoltaic modules.
Figure 8B:
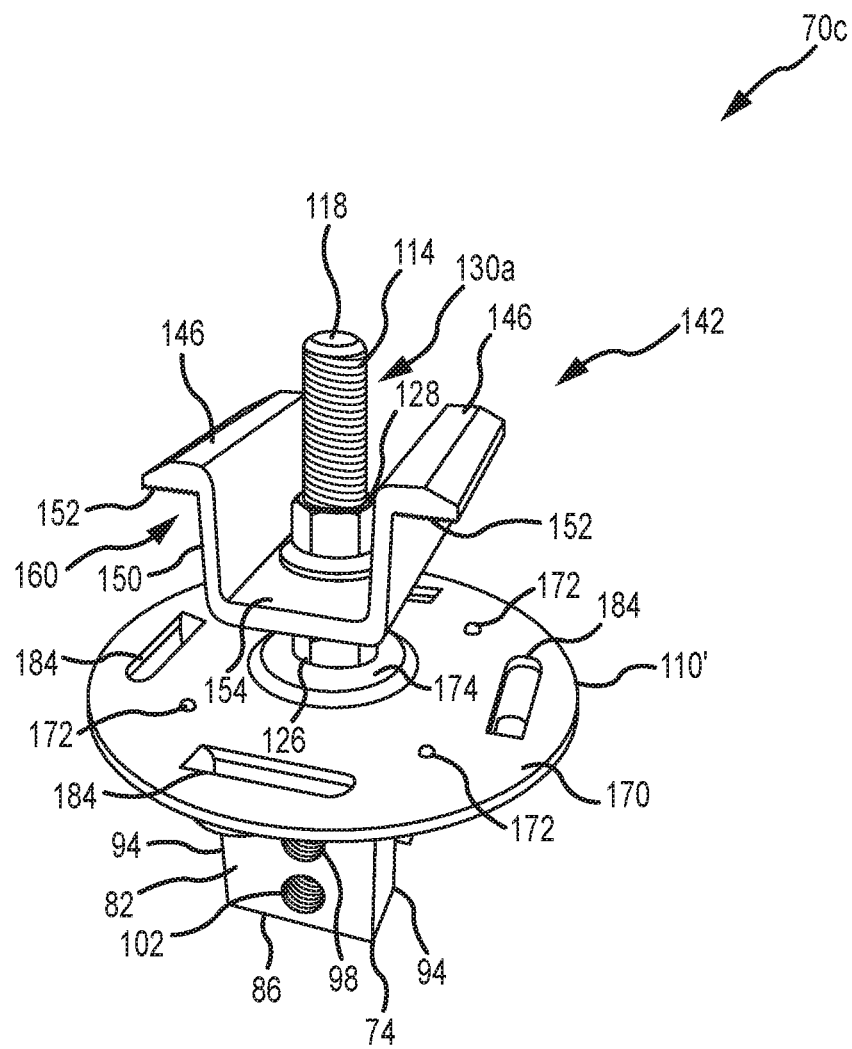
FIG. 8B is one top-based perspective view of the mounting assembly of FIG. 8A.
Figure 8C:
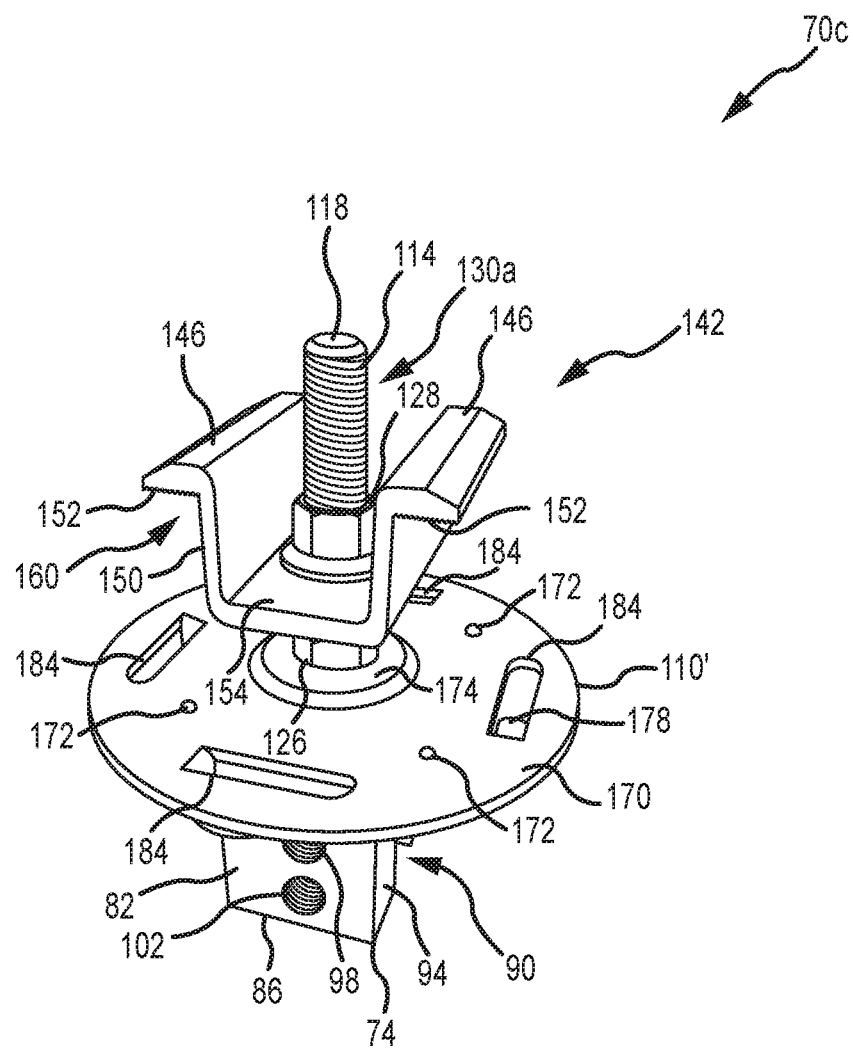
FIG. 8C is another one top-based perspective view of the mounting assembly of FIG. 8A.
Figure 8D:
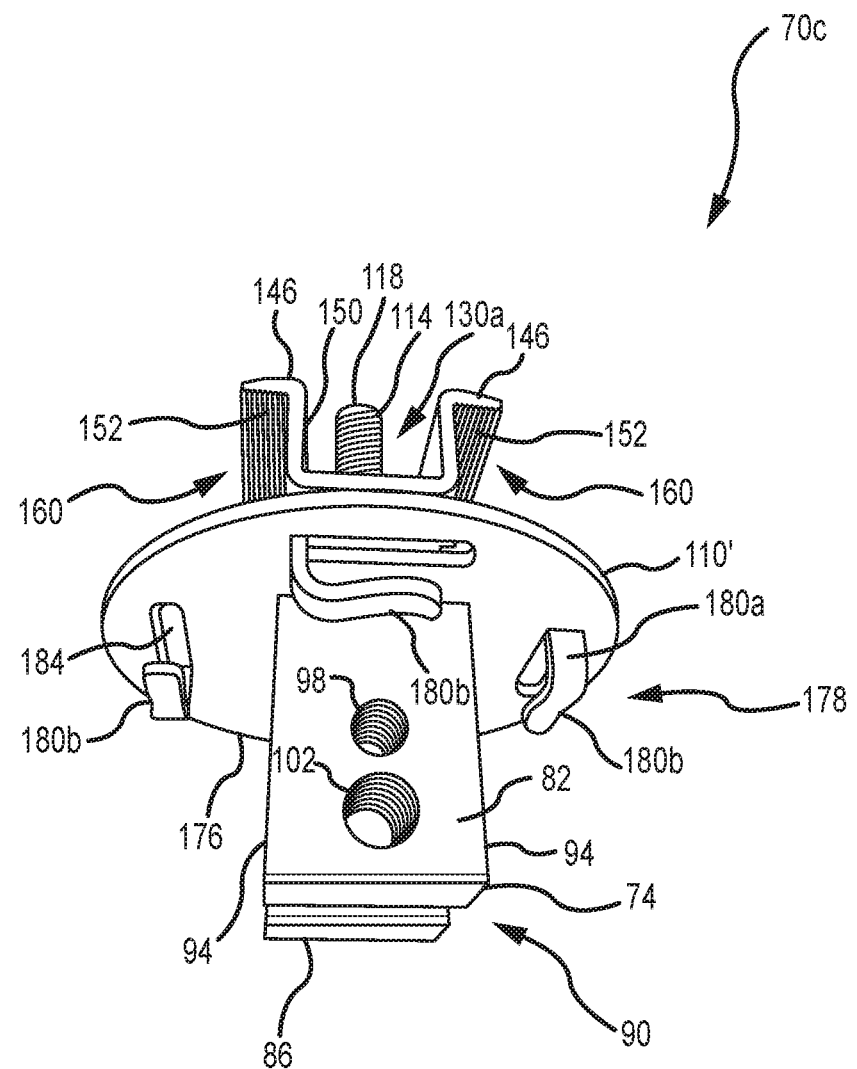
FIG. 8D is a bottom-based perspective view of the mounting assembly of FIG. 8A.
Figure 8E:
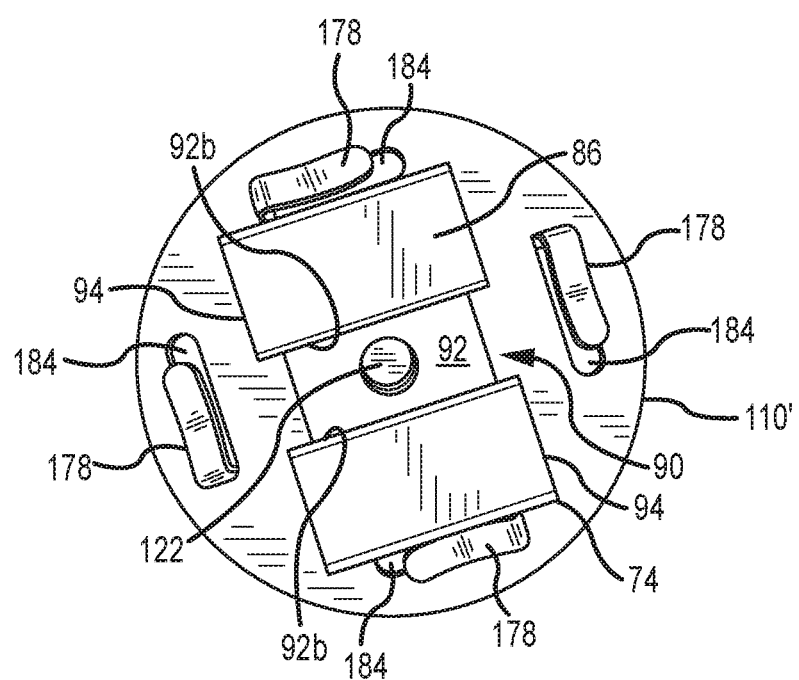
FIG. 8E is a plan view of a bottom of the mounting assembly of FIG. 8A.
Figure 8F:
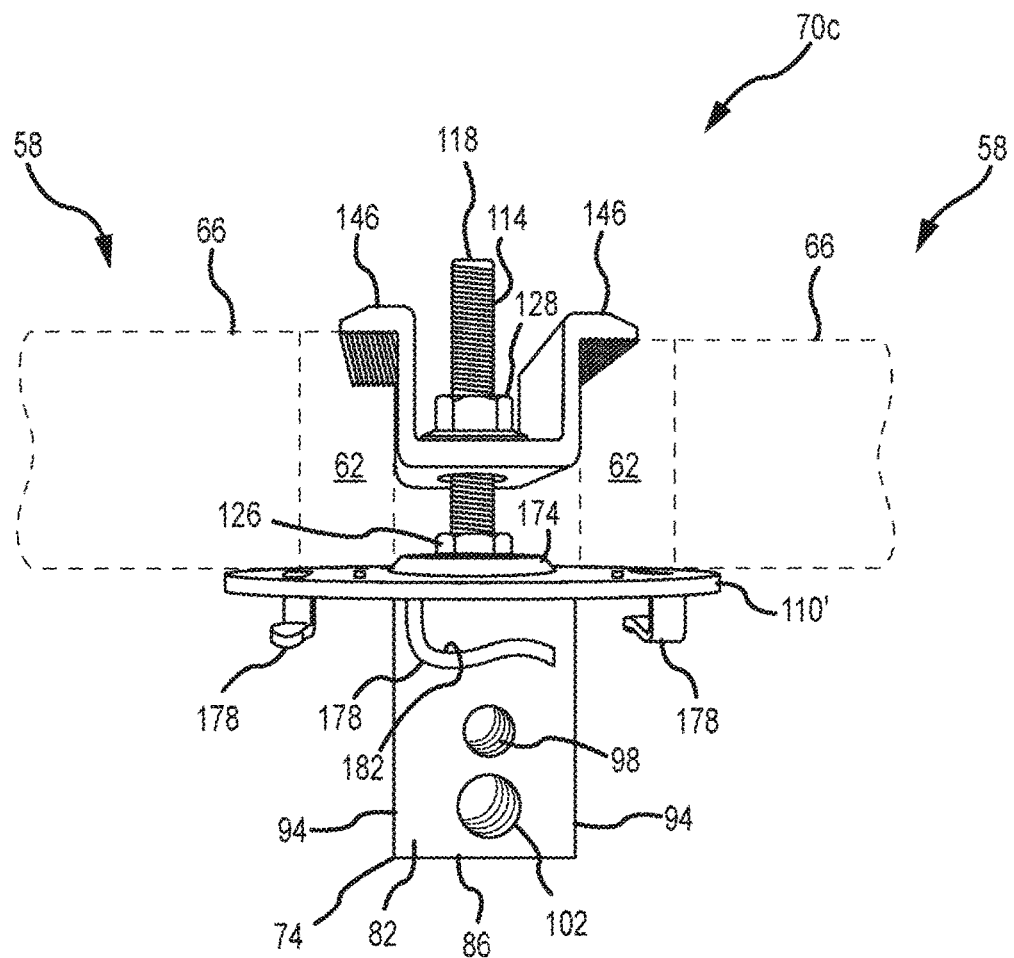
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70c abuts one portion on a perimeter of the raised structure 174, while the frame 62 of another photovoltaic module 58 being clamped by the mounting assembly 70c is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142. In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

At least one grounding projection 172 of the mounting plate 110' shown in FIG. 8F should be engaged with the frame 62 of one photovoltaic module 58 shown in FIG. 8F, and at least one other grounding projection 172 of this same mounting plate 110' should be engaged with the frame 62 of the other photovoltaic module 58 shown in FIG. 8F. This again provides electrical continuity between the two modules 58 shown in FIG. 8F—an electrical path exists from one module 58 to the other module 58 via the mounting plate 110' and each grounding projection 172 that is engaged with either of the modules 58.

Figure 9A:
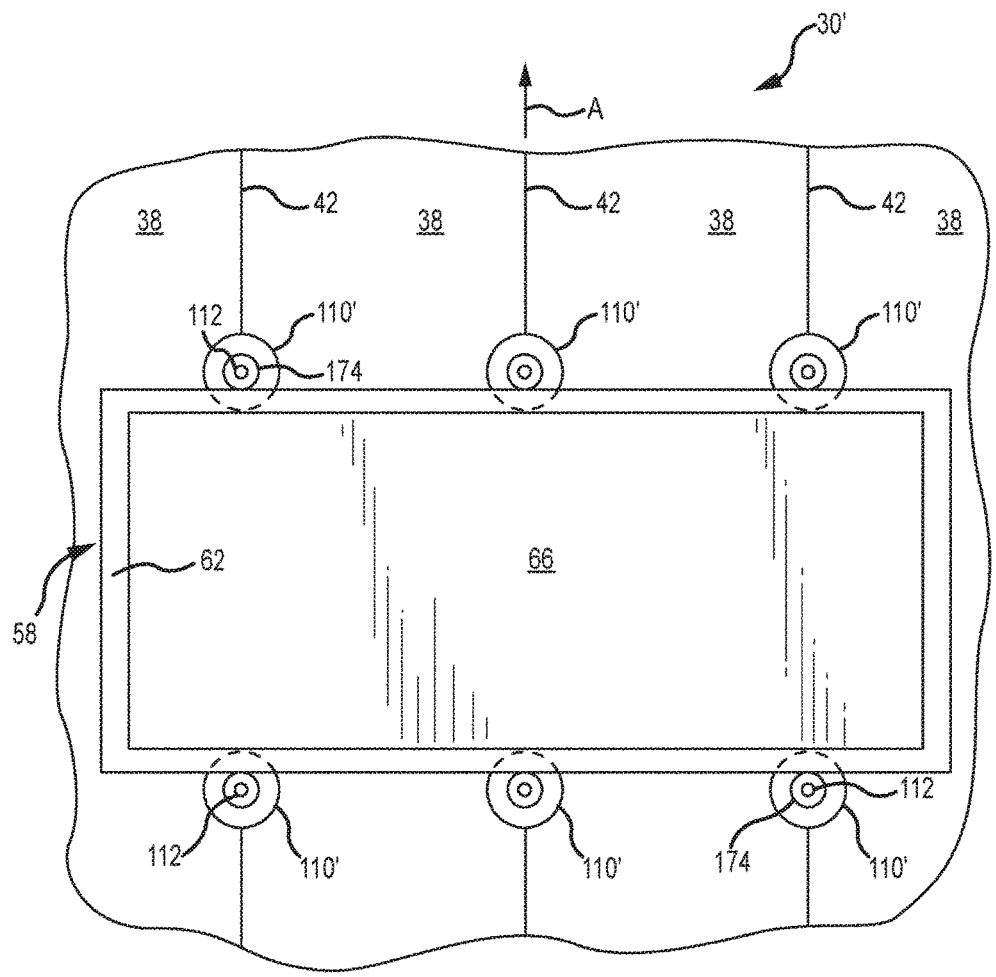
FIG. 9A is a plan view of one embodiment of a photovoltaic system using a plurality of the mounting assemblies of FIGS. 8A-F, and with the clamping members being removed to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70c.

Figure 9B:
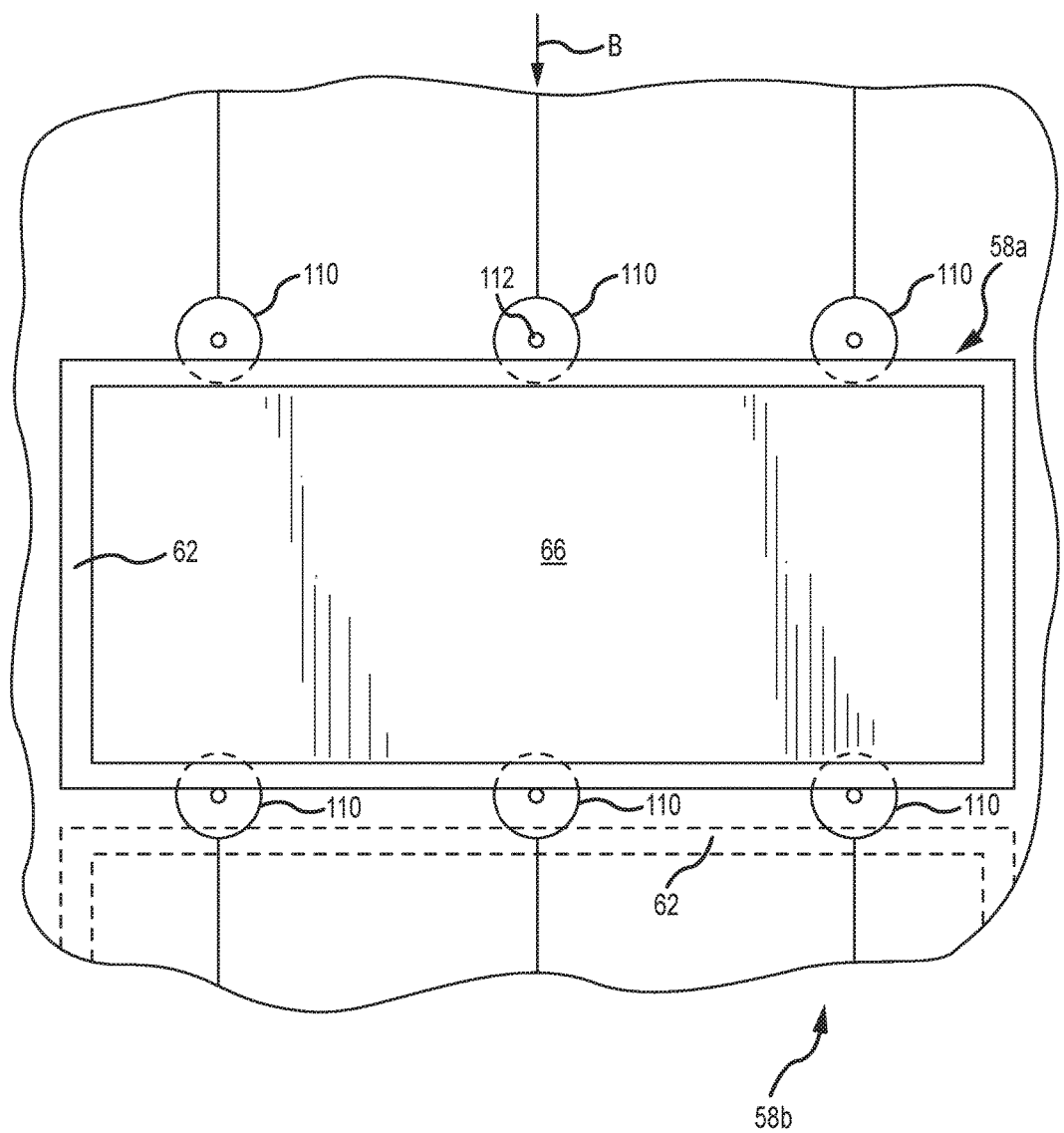
FIG. 9B is a plan view of a photovoltaic system using a plurality of the mounting assemblies of FIG. 6, and with the clamping members being removed therefrom to illustrate how a misaligned mounting assembly can affect the ability of the same to clamp onto one or more photovoltaic modules.

Now compare FIG. 9A to FIG. 9B. In FIG. 9B, the mounting assembly 70a has been used, and whose mounting plate 110 does not incorporate the raised structure 174 from the mounting plate 110' of FIGS. 8A-F. Here it can be seen that the uphill photovoltaic module 58a (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 now may not sufficiently engage the downhill photovoltaic module 58b.

Figure 10A:
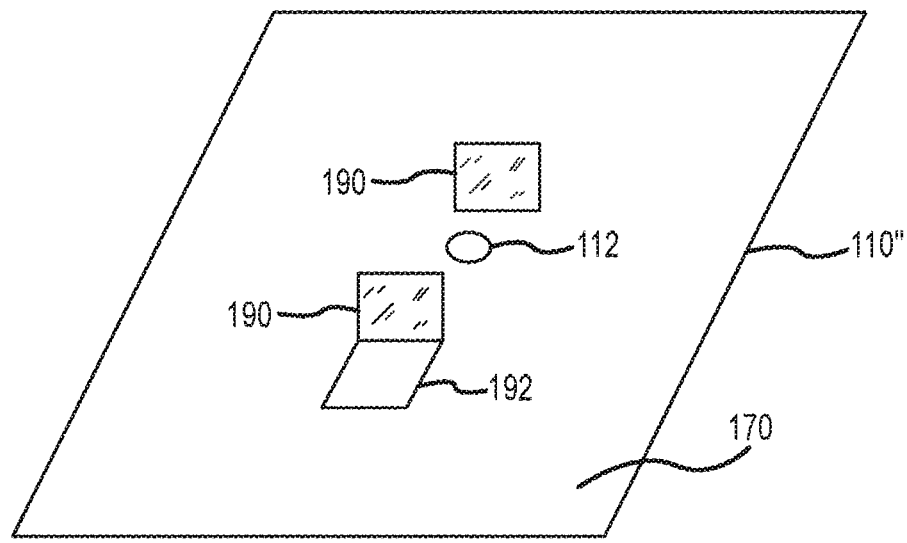
FIG. 10A is a perspective view of another embodiment of a mounting plate that incorporates a discrete pair of PV module positional registrants.
Figure 10B:
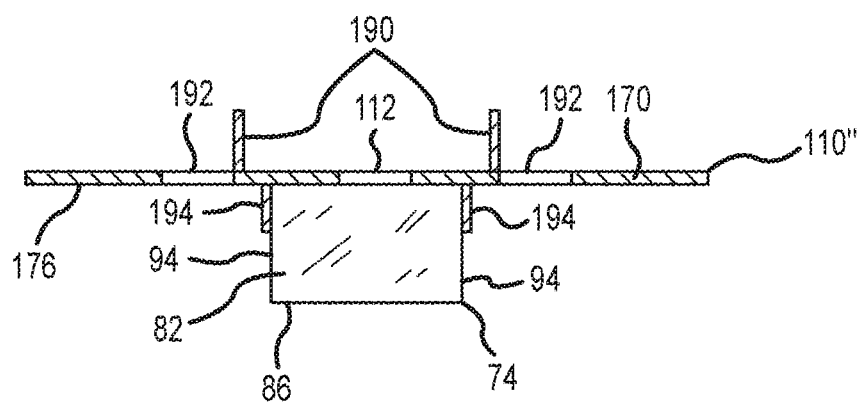
FIG. 10B is a side view of the mounting plate of FIG. 10 disposed on a mounting device, where the mounting plate includes a pair of mounting device positional registrants.

The mounting plate 110' from the mounting assembly 70c of FIGS. 8A-F uses a single raised structure 174 to provide a positional registration or alignment function for each of the two photovoltaic modules that may be clamped by a single mounting assembly 70c. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110'; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 such that they provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" and that engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

Figure 11:
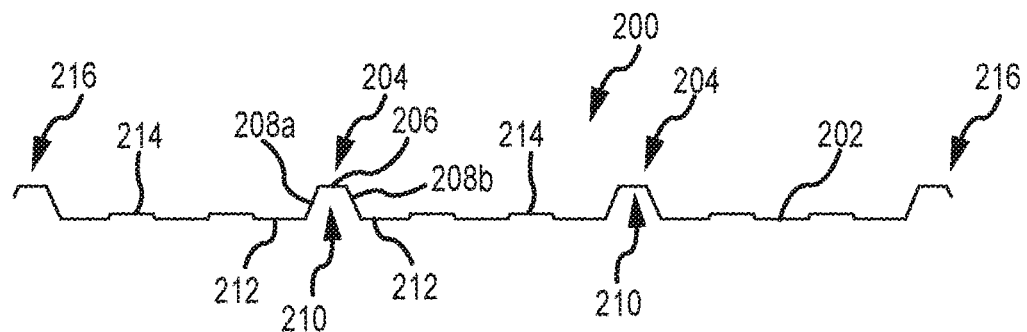
FIG. 11 is an end view of a representative trapezoidal rib panel.

Standing seam panels 38 were addressed above. Other types of panels are commercially available. Another example of a panel configuration is commonly referred to as a trapezoidal rib panel (e.g., formed from an appropriate metal alloy). A representative trapezoidal rib panel is illustrated in FIG. 11 and is identified by reference numeral 202. A plurality of these panels 202 may be assembled to define a building surface or a trapezoidal rib panel surface 200 (e.g., a roof or roofing surface). A given trapezoidal rib panel 202 may include one or more trapezoidal ribs 204 with a base section 212 positioned on each side thereof, and furthermore may include one or more minor ribs 214. A given trapezoidal rib panel 202 may in fact not use any minor ribs 214. In any case, an edge portion 216 of one trapezoidal rib panel 202 may be nested with an edge portion 216 of an adjacent trapezoidal rib panel 202 to collectively define a trapezoidal rib 204 as well.

Each trapezoidal rib 204 may include an upper rib wall 206 in the form of a flat or planar surface. Each trapezoidal rib 204 may also include a pair of sides 208a, 208b. The sides 208a, 208b are spaced from each other and are disposed in non-parallel relation. Typically the sides 208a, 208b of a trapezoidal rib 204 will be the mirror image of each other in relation to their respective orientations. In any case, the upper rib wall 206 and the two sides 208a, 208b collectively define a hollow interior or open space 210 for the trapezoidal rib 204.

One embodiment of a mounting device that is adapted for use with trapezoidal rib panels is illustrated in FIGS. 12A-D, and may be used to install various types of attachments on such trapezoidal rib panels. The mounting device shown in FIGS. 12A-D is in the form of a mounting device or bracket 220 that is of one-piece construction (e.g., no joint of any kind between any adjacent portions of the mounting bracket 220; the mounting bracket 220 is not an assembly of two or more separately-formed and separately-joined portions). In one embodiment, the mounting bracket 220 is in the form of extrusion to provide such a one-piece construction. The mounting bracket 220 may be formed from any appropriate material or combination of materials (e.g., an aluminum alloy; other metal alloys).

The mounting bracket 220 includes an upper wall or mounting surface 224 and a pair of side legs 228a, 228b that extend downwardly from the upper wall 224 when the mounting bracket 220 is installed on a trapezoidal rib 204. The upper wall 224 is the uppermost portion of the mounting bracket 220 when positioned on a trapezoidal rib 204, extends between a pair of open ends 222 of the mounting bracket 220, and is in the form of a single flat surface (rectangular in the illustrated embodiment). In one embodiment, the upper wall 224 provides a flat surface area, that is defined by a perimeter which in turn defines an area of at least 2.5 inches$^2$, to provide an appropriate surface for supporting attachments of any appropriate type (discussed below). In this regard, the upper wall 224 includes a mounting hole 226 that extends completely through this upper wall 224. Although a single mounting hole 226 is shown, multiple mounting holes could be incorporated by the upper wall 224 if required by a particular application or if otherwise desired.

A single mounting hole 226 is shown in the illustrated embodiment (e.g., located equidistantly from the two ends 222, although such may not be required in all instances). Multiple mounting holes could be incorporated by the upper wall 224 if required by a particular application or if otherwise desired. Each given mounting hole 226 may be threaded or unthreaded. In the case of a threaded mounting hole 226, a threaded attachment fastener (e.g., a threaded stud or bolt) could have its threads engaged with the threads of a particular mounting hole 226 to secure at least one attachment relative to the mounting bracket 220. An attachment fastener could also extend through a particular mounting hole 226 without having any type of threaded engagement with the mounting bracket 220, and a nut could be threaded onto an end of this attachment fastener (this end being disposed within an open space 250a of the mounting bracket 220, discussed below) to secure at least one attachment relative to the mounting bracket 220.

Any appropriate configuration may be utilized by each mounting hole 226 through the upper wall 224 of the mounting bracket 220. Representative configurations for each mounting hole 226 include circular or round. A given mounting hole could also be in the form of an elongated slot 226', as shown by dashed lines in FIG. 12C. Such an elongated slot 226' allows the position of an attachment fastener to be adjusted relative to the mounting bracket 220, for instance after the mounting bracket 220 has already been anchored relative to a building surface and which may be of significant benefit for at least certain installations on a building surface (e.g., an attachment fastener can be moved to any position along the length of the mounting slot 226', and can then be secured relative to the mounting bracket 220 by the above-noted nut).

The bracket side legs 228a, 228b are spaced from one another, and will typically be the mirror image of each other with regard to their respective orientations (e.g., an included angle between the underside of the upper wall 224 and the inside surface 230 each of the side legs 228, 228b being greater than 90° as shown). The bracket side leg 228a is positioned along an upper portion of the side 208a of a trapezoidal rib 204 (FIG. 12D), while the opposite bracket side leg 228b is positioned along an upper portion of the opposite side 208b of this same trapezoidal rib 204 (FIG. 12D). The bracket side legs 228a, 228b may be disposed in overlying relation with respect to any relevant portion of the corresponding side 208a, 208b of the trapezoidal rib 204. It should be appreciated that the bracket side legs 228a, 228b will typically be disposed in at least generally parallel relation to their corresponding side 208a, 208 of the trapezoidal rib 204.

At least part of the bracket side leg 228a may engage the side 208a of the trapezoidal rib 204, while at least part of the bracket side leg 228b may engage the side 208b of the trapezoidal rib 204. In the illustrated embodiment, each of the bracket side legs 228a, 228b includes an inner surface 230 that faces or projects toward the corresponding side 208a, 208b of the trapezoidal rib 204. In the illustrated embodiment, there may be two discrete zones of contact between each bracket side leg 228a, 228b and its corresponding side 208a, 208b of the trapezoidal rib 204. In this regard, each inner surface 230 includes a pair of rails, projections, or dimples 234 that may extend between the two open ends 222 of the mounting bracket 220. If the spacing between the two open ends 222 is characterized as the length dimension for the mounting bracket 220, each projection 234 may be extend along at least part of the length of the mounting bracket 220.

Each projection 234 may provide a discrete zone of contact (e.g., extending along a line or axial path) between the corresponding bracket side leg 228a, 228b and its corresponding side 208a, 208b of the trapezoidal rib 204.

Generally, the use of the projections 234 reduces the area of contact between the mounting bracket 220 and the trapezoidal rib 204, which should reduce the potential for capillary entrapment (e.g., should reduce the potential of water "wicking" into interfacing surfaces of the mounting bracket 220 and trapezoidal rib 204, which could lead to the development of corrosion and premature failure of the building surface 200).

A gasket pocket or receptacle 232 is defined between the projections 234 on the inner surface 230 of each of the bracket side legs 228a, 228b. At least one fastener hole 236 extends through each of the bracket side legs 228a, 228b and intersects the corresponding gasket pocket 232. In the illustrated embodiment, there are two fastener holes 236 that are aligned with the gasket pocket 232 for each of the bracket side legs 228a, 228b. A gasket 233 of any appropriate type (e.g., an EPDM gasket) is disposed within each of the gasket pockets 232. The projections 234 on the inner surface 230 of the bracket side leg 228a confine the corresponding gasket 233 therebetween. Similarly, the projections 234 on the inner surface 230 of the bracket side leg 228b confine the corresponding gasket 233 therebetween.

In one embodiment, each gasket 233 is thicker than the depth of its corresponding gasket pocket 232 prior to the mounting bracket 220 being secured to the trapezoidal rib 204. As such, the gaskets 233 may be compressed between the mounting bracket 220 and the trapezoidal rib 204 as the mounting bracket 220 is secured to the trapezoidal rib 204. The above-described projections 234 may also provide the function of reducing the potential of these gaskets 233 being "over compressed" while securing the mounting bracket 220 to a trapezoidal rib 204.

Each gasket 233 may be installed within its corresponding gasket pocket 232 prior to installing the mounting bracket 220 on a trapezoidal rib 204. Any appropriate way of maintaining a gasket 233 within its corresponding gasket pocket 232 may be utilized (e.g., by being press fit within the corresponding gasket pocket 232; adhering a gasket 233 to the inner surface 230 of its corresponding gasket pocket 232). When the mounting bracket 220 is secured to the trapezoidal rib 204, the gasket 233 may compress to bring the above-noted projections 234 into contact with the corresponding side 208a, 208b of the trapezoidal rib 204. However, the projections 234 should still at least substantially confine the corresponding gasket 233 within its corresponding gasket pocket 232, and furthermore should reduce the potential for the gaskets 233 being over-compressed during installation as noted.

The mounting bracket 220 further includes a pair of rib offsetting members 246a, 246b that are disposed within a hollow interior 248 of the mounting bracket 220 (e.g., the partially enclosed space collectively defined by the upper wall 224 and the pair of bracket side legs 228a, 228b). Each rib offsetting member 246a, 246b is disposed in spaced relation to the upper wall 224 of the mounting bracket 220. One rib offsetting member 246a extends from the bracket side leg 228a toward, but not to, the opposite bracket side leg 228b. The other rib offsetting member 246b extends from the bracket side leg 228b toward, but not to, the opposite bracket side leg 228a.

The underside of each rib offsetting member 246a, 246b is positioned on the upper rib wall 206 of the trapezoidal rib 204 to dispose the upper wall 224 of the mounting bracket 220 above and in spaced relation to the upper rib wall 206 of the trapezoidal rib 204 (FIG. 12D). The hollow interior 248 of the mounting bracket 220 may be characterized as including a first open space 250a that is positioned above the rib offsetting members 246a, 246b (and below the upper wall 224 of the bracket 220), a second open space 250b between the opposing free ends of the rib offsetting members 246a, 246b, and a third open space or rib receptacle 242 that is positioned below the rib offsetting members 246a, 246b. That is, the two rib offsetting members 246a, 246b, and each of the bracket side legs 228a, 228b may be characterized as collectively defining the rib receptacle 242 (e.g., by defining the portion of the hollow interior 248 of the mounting bracket 220 in which a trapezoidal rib 204 may be disposed). At least an upper portion of a trapezoidal rib 204 may be disposed within the rib receptacle 242 of the mounting bracket 220 when the mounting bracket 220 is installed on such a trapezoidal rib 204 (e.g., FIG. 12D).

At least one fastener extends through the bracket side leg 228a (two being accommodated in the illustrated embodiment), through the gasket 233 in its corresponding gasket pocket 232, and terminates within the hollow interior 210 of the trapezoidal rib 204 when securing the mounting bracket 220 to a trapezoidal rib 204 (e.g., FIG. 12D). In the embodiment shown in FIG. 12D, the illustrated fastener for the bracket side leg 228a is in the form of a rivet 244a. At least one fastener also extends through the bracket side leg 228b (two being accommodated in the illustrated embodiment), through the gasket 233 in its corresponding gasket pocket 232, and also terminates within the hollow interior 210 of the trapezoidal rib 204 when securing the mounting bracket 220 to a trapezoidal rib 204 (e.g., FIG. 12D). In the embodiment shown in FIG. 12D, the illustrated fastener for the bracket side leg 228b is in the form of a sheet metal screw 244b. Any appropriate type/number of fasteners may be used to separately secure each bracket side leg 228a, 228b to the trapezoidal rib 204. As the upper wall 224 of the mounting bracket 220 is used as a supporting surface, no fasteners extend through the upper wall 224 of the mounting bracket 220 and through any portion of the trapezoidal rib 204. Moreover, all fasteners that are used to secure the mounting bracket 220 to the trapezoidal rib 204 terminate within the hollow interior 210 of the trapezoidal rib 204 (e.g., no fastener extends through the mounting bracket 220, through the trapezoidal rib panel 202, and into any underlying deck or supporting structure).

Figure 13:
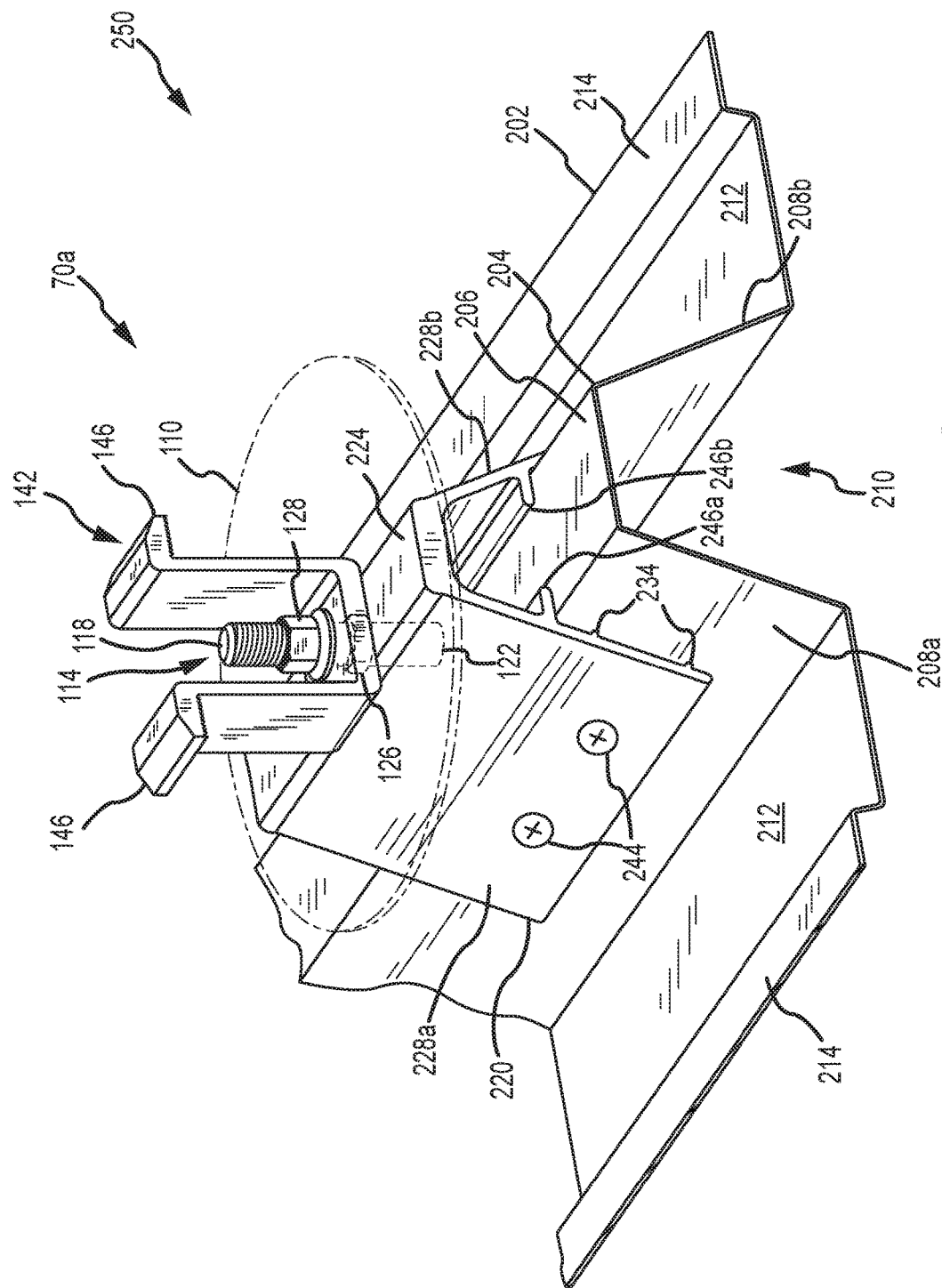
FIG. 13 is a perspective view of the mounting bracket of FIGS. 12A-D mounted on a trapezoidal rib of a trapezoidal rib panel, and with the mounting assembly 70a from FIGS. 7A-B being mounted on this mounting bracket.

Various types of attachments may be installed on a building surface defined by trapezoidal rib panels 202 using the above-described mounting bracket 220. One example is shown in FIG. 13, where a pair of fasteners 244 have been used to secure the bracket side leg 228a to the side 208a of the trapezoidal rib 204 in the above-noted manner, and where the bracket side leg 228b would be similarly secured to the side 208b of the trapezoidal rib 204. Here, the mounting assembly 70a (discussed above, and illustrated in FIG. 7A—the associated photovoltaic modules 58 not being shown in FIG. 13 for clarity) is installed on the mounting bracket 220 (i.e., the mounting bracket 220 may be used in place of the mounting device 74 for trapezoidal rib panel configurations and for the above-noted photovoltaic module applications, and in conjunction with each of the above-discussed mounting assemblies (e.g., mounting 70a-c)). The threaded stud 114 of the mounting assembly 70a is engaged with the mounting hole 226 (threaded in this example) on the upper wall 224 of the mounting bracket 220. The second stud end 122 is disposed within the hollow interior 248 of the mounting bracket 220 (e.g., the first open space 250a, and so as to not contact any structure of the mounting bracket 220). The mounting assemblies 70b, 70c discussed above may be similarly mounted to the mounting bracket 220 and at least generally in the above-discussed manner. It should be appreciated that the clamping member 142 may be rotated 90° from the position illustrated in FIG. 13 to accommodate installation of one or more photovoltaic modules 58 in the above-described manner.

The mounting assemblies 70a-c addressed above each may be characterized as an "attachment" when secured to the mounting bracket 220 in the above-noted manner (e.g., a mounting bracket 220 secured to a trapezoidal rib 202, and having an attachment that is secured relative to the mounting bracket 220, may be collectively characterized as an "attachment assembly 250", with such a representative attachment assembly 250 being shown in FIG. 13). Any photovoltaic module 58 that is engaged by any such mounting assembly 70a-c (when installed on a mounting bracket 220) may also be characterized as an attachment" that is secured relative to the mounting bracket 220 using an attachment fastener (e.g., threaded stud 114) that at least extends into a mounting hole 226 on the upper wall 224 of the mounting bracket 220, and collectively may be referred to as an "attachment assembly" as well.

Figure 14:
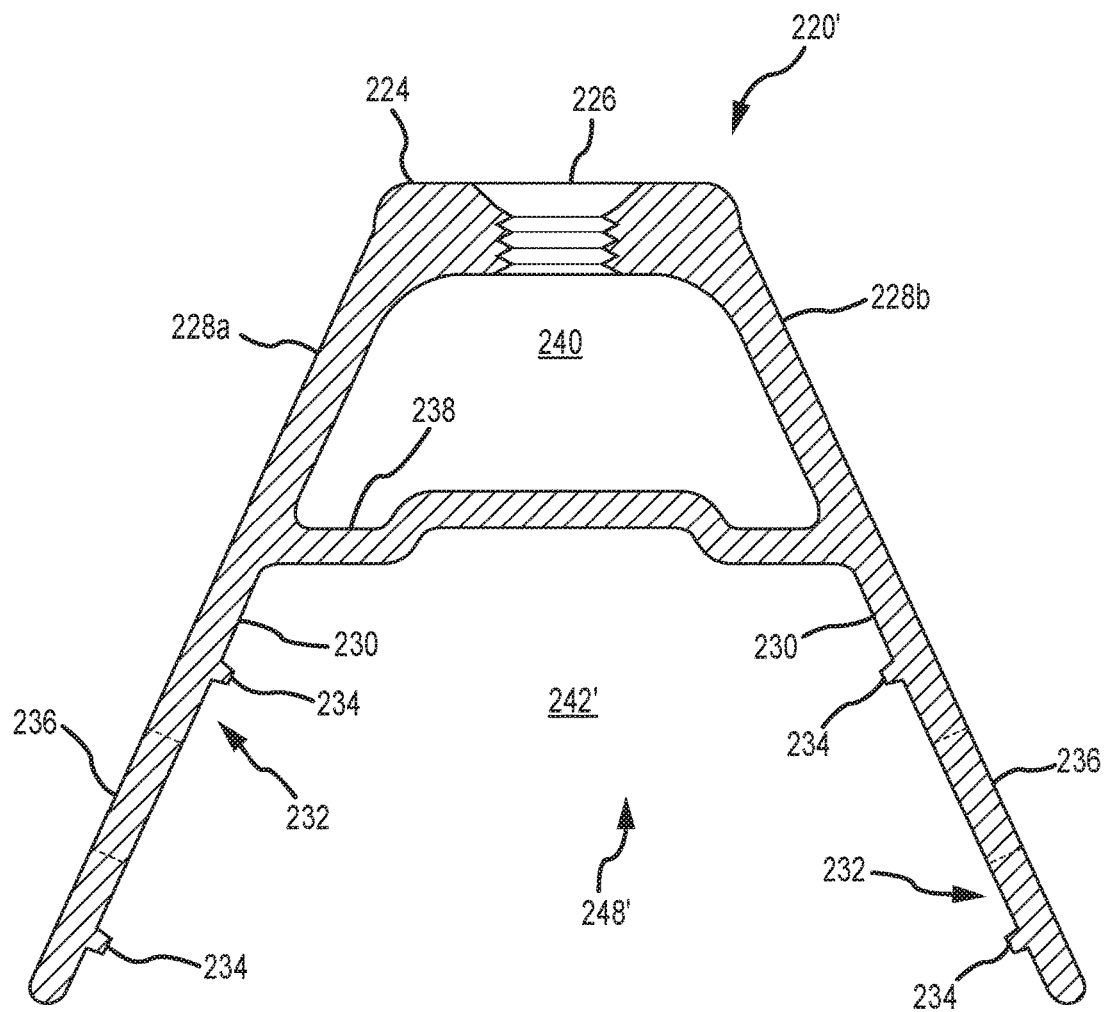
FIG. 14 is a cross-sectional view of a variation of the mounting bracket of FIG. 12A.

A variation of the mounting bracket 220 of FIGS. 12A-D is presented in FIG. 14. Corresponding components of these two embodiments are identified by the same reference numerals, and the discussion presented above remains applicable unless otherwise noted. Those corresponding components that differ in at least some respect are identified by a "single prime" designation. In the case of the mounting device or bracket 220' of FIG. 14, the two rib offsetting members 246a, 246b of the mounting bracket 220 of FIGS. 12A-D are replaced by a single rib offsetting member in the form of a cross member 238). This cross member 238 is disposed within the hollow interior 248' of the mounting bracket 220' (e.g., in the partially enclosed space collectively defined by the upper wall 224 and the pair of bracket legs 228a, 228b). This cross member 238 extends between the inner surfaces 230 of the two bracket side legs 228a, 228b. The cross member 238 is seated on the upper rib wall 206 of the trapezoidal rib 204 when the mounting bracket 220 is positioned on the trapezoidal rib 204. Although the entire underside of the cross member 238 could interface with the upper rib wall 206 of the rib 204, a central portion thereof may "bulge" away from the upper rib wall 206 of the rib 204 to address capillary entrapment.

The cross member 238 is disposed in spaced relation to the upper wall 224 of the mounting bracket 220'. An upper cavity or open space 240 (part of the hollow interior 248' of the mounting bracket 220') exists between the cross member 238 and the upper wall 224, and accommodates receipt of an attachment fastener that may extend through a mounting hole 226 to secure an attachment in position relative to the mounting bracket 220. In one embodiment, the upper wall 224 and the cross member 238 are separated by a distance of at least about ½ inch (e.g., the minimum vertical extent of the upper cavity 240 below the mounting hole 226 is about ½ inch ("vertical" being the dimension that is orthogonal to the upper wall 224)).

The cross member 238 and each of the bracket side legs 228a, 228b also collectively define a rib receptacle 242' (also part of the hollow interior 248' of the mounting bracket 220'). At least an upper portion of a trapezoidal rib 204 may be disposed within the rib receptacle 242' of the mounting bracket 220' when the mounting bracket 220' is installed on such a trapezoidal rib 204. The underside of at least part of the cross member 238 would be positioned on the upper rib wall 206 of the trapezoidal rib 204 to dispose the upper wall 224 of the mounting bracket 220' above and in spaced relation to the upper rib wall 206 of the trapezoidal rib 204.

In the illustrated embodiment the portions of the cross member 238 that are adjacent to the bracket side legs 228a, 228b would be seated on the upper rib wall 206 of the trapezoidal rib 204, while the central portion of the cross member 238 would be spaced from the upper rib wall 206 of the trapezoidal rib 204, again to address capillary entrapment.

The mounting brackets 220, 220' provide a number of advantages for installing an attachment on a trapezoidal rib panel surface. Initially, photovoltaic modules may be installed on a trapezoidal rib panel surface with or without rails using the mounting brackets 220/220'. The mounting brackets 220/220' alleviate the need for any fastener to extend to any underlying deck or any other substrate (e.g., purlins) for the trapezoidal rib panel surface when securing the mounting brackets 220/220' to a trapezoidal rib on such a trapezoidal rib panel surface. This provides significant flexibility when installing PV modules on a trapezoidal rib panel surface.

Multiple mounting brackets 220/220' may be used to support a photovoltaic module above a trapezoidal rib panel surface without having these mounting brackets 220/220' directly anchored to an underlying substrate or support deck for the trapezoidal rib panel surface. A total of at least four of the mounting brackets 220/220' may be used to support a given photovoltaic module (two brackets 220/220' spaced along a first trapezoidal rib, and two brackets 220/220' spaced along a second trapezoidal rib that is appropriately spaced from the first trapezoidal rib). Where a photovoltaic module is characterized as having four edge portions (e.g., of a square or rectangular configuration), at least two mounting brackets 220/220' may support one edge portion of a given photovoltaic module, and at least two mounting brackets 220/220' may support an oppositely disposed edge portion of the same photovoltaic module. This allows the sheeting of the trapezoidal rib panel surface to itself support the photovoltaic modules (versus having to "anchor" supporting structures for the photovoltaic modules to the underlying deck or substrate for the trapezoidal rib panel surface).

Figure 15:
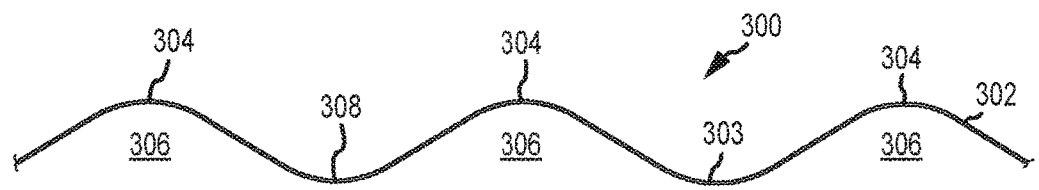
FIG. 15 is an end view of part of a representative corrugated panel.

Standing seam panels 38 were addressed above. Other types of panels are commercially available. Another example of a panel configuration is commonly referred to as a corrugated panel (e.g., formed from an appropriate metal or metal alloy). A representative corrugated panel is illustrated in FIG. 15 and is identified by reference numeral 302. A plurality of corrugated panels 302 may be assembled to define a building surface or a corrugated panel surface 300 (e.g., a roof or roofing surface).

A corrugated panel 302 is defined by a plurality of panel crowns 304 and a plurality of panel valleys 308. In the illustrated embodiment, a panel valley 308 is disposed between each adjacent pair of panel crowns 304. The corrugated panel 302 may be of a sinusoidal or "sine wave" configuration in an end view (FIG. 15). In any case, typically a corrugated panel 302 will be installed in a roofing application such that the length dimension of its panel crowns 304 and panel valleys 308 each extend along the roof pitch (e.g., the elevation of each panel crown 304 and each panel valley 308 may continually change proceeding along its length dimension). A "panel crown" 304 of a corrugated panel 302 may also be referred to as a "rib" or "the high." A "panel valley" 308 of a corrugated panel 302 may also be referred to as a "trough" or "the low."

Figure 16A:
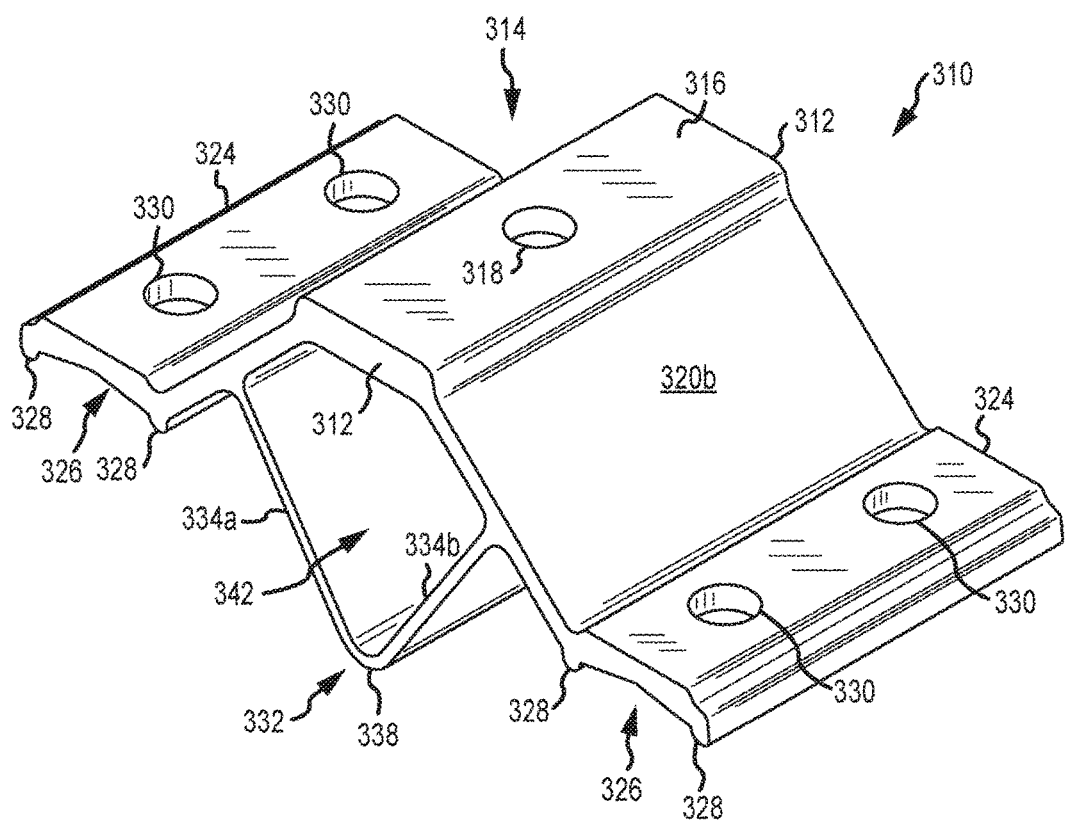
FIG. 16A is a perspective view of one embodiment of a mounting bracket for use with corrugated panels.
Figure 16B:
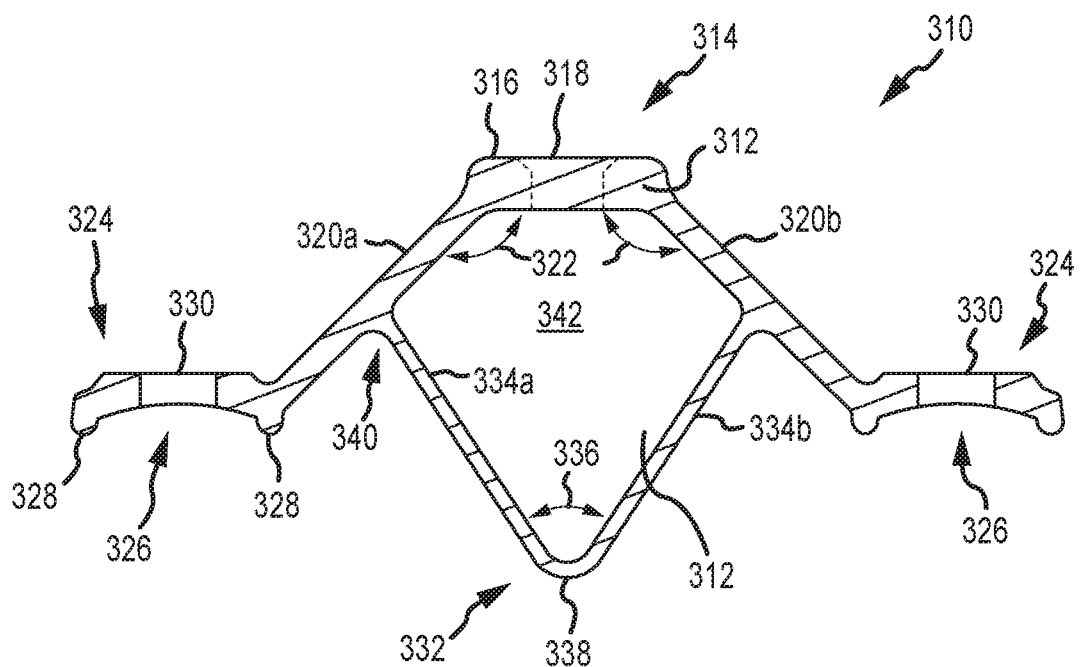
FIG. 16B is a cross-sectional view of the mounting bracket of FIG. 16A.
Figure 16C:
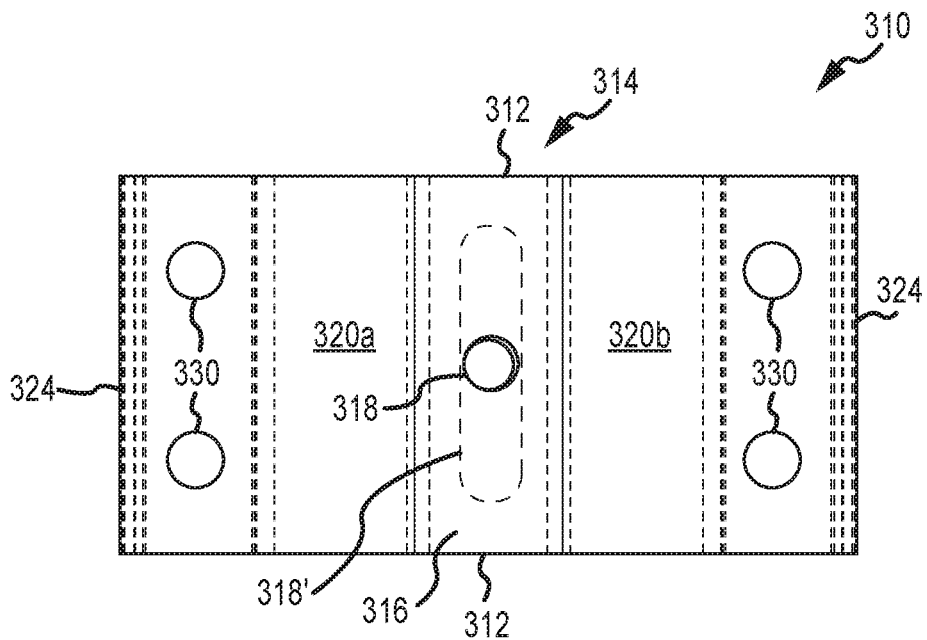
FIG. 16C is a top view of the mounting bracket of FIG. 16A.

One embodiment of a mounting device that is adapted for use with corrugated panels is illustrated in FIGS. 16A-C, and may be used to install various types of attachments on such corrugated panels. The mounting device shown in FIGS. 16A-C is in the form of a mounting device or bracket 310 that may be of one-piece construction (e.g., no joint of any kind between any adjacent portions of the mounting bracket 310; the mounting bracket 310 is not an assembly of two or more separately-formed and separately-joined portions). In one embodiment, the mounting bracket 210 is in the form of extrusion to provide such a one-piece construction. The mounting bracket 310 may be formed from any appropriate material or combination of materials (e.g., an aluminum alloy; other metal alloys).

The mounting bracket 310 includes what may be characterized as a valley section 314 that is positioned above a panel valley 308 when the mounting bracket 310 is positioned on a corrugated panel 302 (e.g., FIGS. 16D-F, discussed below). In the illustrated embodiment, the entirety of the valley section 314 is defined by an upper wall or mounting surface 316. The upper wall 316 is the uppermost portion of the mounting bracket 310 when disposed in an upright position (e.g., FIG. 16B), extends between a pair of ends 312 of the mounting bracket 310, and is in the form of an at least substantially flat surface (e.g., having a rectangular perimeter in the illustrated embodiment). In one embodiment, the perimeter of the upper wall 316 defines an area of at least 2.5 inches$^2$ to provide an appropriate surface for supporting attachments of any appropriate type (discussed below). In this regard, the upper wall 316 includes a mounting hole 318 that extends completely through this upper wall 316. One or more mounting holes 318 may be used to secure at least one attachment relative to the mounting bracket 310 (e.g., using one or more attachment fasteners of any appropriate type).

A single mounting hole 318 is shown in the illustrated embodiment (e.g., located equidistantly from the two ends 312, although such may not be required in all instances). Multiple mounting holes could be incorporated by the upper wall 316 if required by a particular application or if otherwise desired. Each given mounting hole 318 may be threaded or unthreaded. In the case of a threaded mounting hole 318, a threaded attachment fastener (e.g., a threaded stud or bolt) could have its threads engaged with the threads of a particular mounting hole 318 to secure at least one attachment relative to the mounting bracket 310. An attachment fastener could also extend through a particular mounting hole 318 without having any type of threaded engagement with the mounting bracket 310, and a nut could be threaded onto an end of this attachment fastener (this end being disposed within an open space 342 of the mounting bracket 310, discussed below) to secure at least one attachment relative to the mounting bracket 310.

Any appropriate configuration may be utilized by each mounting hole 318 through the upper wall 316 of the mounting bracket 310. Representative configurations for each mounting hole 318 include circular or round. A given mounting hole could also be in the form of an elongated slot 318', as shown in FIG. 16C. Such an elongated slot 318' allows the position of an attachment fastener to be adjusted relative to the mounting bracket 310, for instance after the mounting bracket 310 has already been anchored relative to a building surface and which may be of significant benefit for at least certain installations on a building surface (e.g., an attachment fastener can be moved to any position along the length of the mounting slot 318', and can then be secured relative to the mounting bracket 310 by the above-noted nut).

The above-noted bracket ends 312 may be characterized as being spaced along a length dimension of the mounting bracket 310 (e.g., the spacing between the bracket ends 312 may define the length of the mounting bracket 310). When the mounting bracket 310 is positioned on a corrugated panel 302 (e.g., FIGS. 16D-F, discussed below), the length dimension of the mounting bracket 310 will be aligned or coincide with (e.g., parallel to) the length dimension of the corresponding panel valley 308 (e.g., one bracket end 312 will be at one location along the length dimension of the corresponding panel valley 308, while the opposite bracket end 312 will be at a different location along the length dimension of this same panel valley 308).

The mounting bracket 310 further includes a pair of bracket legs 320a, 320b. The bracket leg 320a extends from one side of the valley section 314 (the upper wall 316 in the illustrated embodiment), while the other bracket leg 320b extends from the opposite side of the valley section 314 (the upper wall 316 in the illustrated embodiment). Each bracket leg 320a, 320b may be characterized as extending both downwardly and away from its corresponding side of the valley section 314 when the mounting bracket 320 is in an upright position (e.g., FIG. 16B). Another characterization is that the bracket leg 320a extends from the valley section 314 at least generally in the direction of one panel crown 304 of a corrugated panel 302 on which the mounting bracket 310 is positioned (e.g., FIGS. 16D-F, discussed below), while the bracket leg 320b extends from the valley section 314 at least generally in the direction of another panel crown 304 of a corrugated panel 302 on which the mounting bracket 310 is positioned (e.g., FIGS. 16D-F, discussed below).

The upper wall 316 and the two bracket legs 320a, 320b may be characterized as collectively defining a hollow interior 340 for the mounting bracket 310. An included angle 322 is defined between the underside of the upper wall 316 and each of the bracket legs 320a, 320b. In the illustrated embodiment, the included angle 322 associated with each of the bracket legs 320a, 320b is greater than 90°. The bracket legs 320a, 320b may be the mirror image of each other with regard to their respective orientations (e.g., the included angle 322 associated with the bracket leg 320a may be of the same magnitude as the included angle 322 associated with the other bracket leg 320b).

The mounting bracket 310 further includes a third bracket leg 334a that extends from the first bracket leg 320a within the hollow interior 340 of the mounting bracket 310, along with a fourth bracket leg 334b that extends from the second bracket leg 320b within the hollow interior 340 of the mounting bracket 310. The bracket legs 334a, 334b may converge to define a panel valley engagement section 332. Stated another way, the intersection of the third bracket leg 334a and the fourth bracket leg 334b may define a panel valley engagement section 332 for the mounting bracket 310. This defines an included angle 336 between the third bracket leg 334a and the fourth bracket leg 334b. In the illustrated embodiment, the magnitude of this included angle 336 is less than 90°.

The panel valley engagement section 332 includes what may be characterized as a panel valley interface surface 338—the surface of the panel valley engagement section 332 that interfaces with a panel valley 308 of a corrugated panel 302 when the mounting bracket 310 is positioned on such a corrugated panel 302. In the illustrated embodiment, the panel valley interface surface 338 is convex or of a "rounded" configuration.

The upper wall 316 of the mounting bracket 310 may be characterized as being disposed in overlying relation to the panel valley engagement section 332. The upper wall 316 may also be characterized as being separated from the panel valley engagement section 332 by an open space 342 (the open space 342 being within or part of the hollow interior 340 of the mounting bracket 310). In one embodiment, the vertical extent of this open space 342 (i.e., "vertical" being when the mounting bracket 310 is disposed in an upright position, and also coinciding with the dimension that is orthogonal/perpendicular to the pitch of a roofing defined by a corrugated panel 302 on which the mounting bracket 310 is positioned) is at least about 1 inch. That is, the underside of the upper wall 316 may be separated from the panel valley engagement section 332 by a distance of at least about 1 inch in at least one embodiment.

The mounting hole 318 in the upper wall 316 may be characterized as being aligned in the vertical dimension with the panel valley engagement section 332 when the mounting bracket 310 is disposed in an upright position. The open space 342 also therefore exists between the mounting hole 318 and the panel valley engagement section 332 (e.g., the mounting hole 318 may be aligned with the open space 342 in the vertical dimension; the open space 342 may be characterized as being below the mounting hole 318). As such, an attachment fastener may be directed within the mounting hole 318, may extend through the upper wall 316, and may terminate within the open space 342. That is, such an attachment fastener could extend beyond the underside of the upper wall 316 a distance of at least about 1" in the noted embodiment before contacting another portion of the mounting bracket 310 (e.g., the side of the panel valley engagement section 332 that is opposite of the panel valley interface surface 338).

The mounting bracket 310 also includes a pair of panel crown engagement sections 324. Initially, each panel crown engagement section 324 is offset or spaced in the vertical dimension from the panel valley engagement section 332. Stated another way and when the mounting bracket 314 is disposed in an upright position, the panel valley engagement section 332 is disposed at a different elevation than each panel crown engagement section 324 (each panel crown engagement section 324 being disposed at a higher elevation than the panel valley engagement section 332). Moreover, the panel valley engagement section 332 is offset from each panel crown engagement section 324 in a lateral dimension that is orthogonal to the above-noted vertical dimension (e.g., the lateral dimension coinciding with the horizontal dimension in the view of FIG. 16B).

The first bracket leg 320a extends between one of the panel crown engagement sections 324 and the valley section 314. Similarly, the second bracket leg 320b extends between the other panel crown engagement section 324 and the valley section 314. As will be discussed in more detail below, one panel crown engagement section 324 of the mounting bracket 310 may be positioned on one panel crown 304 of a corrugated panel 302 (located on one side of a panel valley 308 engaged by the panel valley engagement section 332), while the other panel crown engagement section 324 may be positioned on a different panel crown 304 of a corrugated panel 302 (located on the opposite side of a panel valley 308 engaged by the panel valley engagement section 332). In the illustrated embodiment, each panel crown engagement section 324 engages the adjacent-most panel crown 304 to the panel valley 308 contacted by the panel valley engagement section 332 of the mounting bracket 310, although such may not be required in all instances.

Each panel crown engagement section 324 may engage a panel crown 304 of a corrugated panel 302 on which the mounting bracket 310 is positioned. In the illustrated embodiment, there may be two discrete zones of contact between each panel crown engagement section 324 and its corresponding panel crown 304. In this regard, each panel crown engagement section 324 may include a pair of rails, projections, or dimples 328 that may extend between the two ends 312 of the mounting bracket 310. If the spacing between the two ends 312 is characterized as the length dimension for the mounting bracket 310, each projection 328 may be characterized as extending along at least part of the length of the mounting bracket 310. Each projection 328 may be convex or rounded where engaged with a corresponding panel crown 304.

Each projection 328 may provide a discrete zone of contact (e.g., extending along a line or axial path) between the corresponding panel crown engagement section 324 and its corresponding panel crown 304 of a corrugated panel 302. Generally, the use of the projections 328 reduces the area of contact between the mounting bracket 310 and a panel crown 304 of a corrugated panel 302, which should reduce the potential for capillary entrapment (e.g., should reduce the potential of water "wicking" into interfacing surfaces of the mounting bracket 310 and a corrugated panel 302, which could lead to the development of corrosion and premature failure of a building surface 300 incorporating such a corrugated panel 302).

A gasket pocket or receptacle 326 is defined between the projections 328 on each of the panel crown engagement sections 324. At least one bracket fastener hole 330 extends through each of the panel crown engagement sections 324 and intersects the corresponding gasket pocket 326. In the illustrated embodiment, there are two bracket fastener holes 330 that are aligned with the gasket pocket 326 for each of the panel crown engagement sections 324. Any appropriate number of bracket fastener holes 330 may be utilized by each panel crown engagement section 324. In one embodiment, each bracket fastener hole 330 is un-threaded. An appropriate bracket fastener (e.g., threaded screw, rivet) may be directed through each bracket fastener hole 330 and through the aligned portion of a corrugated panel 302 to secure the mounting bracket 310 relative to the corrugated panel 302. Various options in this regard will be discussed in more detail below in relation to FIGS. 16D-F.

A gasket of any appropriate type (e.g., an EPDM gasket—not shown) may be disposed within each of the gasket pockets 326. The projections 328 on each panel crown engagement section 324 should confine the corresponding gasket therebetween. In one embodiment, each gasket that is positioned within a gasket pocket 326 is thicker than the depth of its corresponding gasket pocket 326 prior to the mounting bracket 310 being secured relative to a corrugated panel 302. As such, the gaskets may be compressed between the mounting bracket 310 and the corresponding panel crown 304 as the mounting bracket 310 is secured relative to a corrugated panel 302. The above-described projections 328 may also provide the function of reducing the potential of these gaskets being "over-compressed" while securing the mounting bracket 310 relative to a corrugated panel 302.

Each gasket may be installed within its corresponding gasket pocket 326 prior to installing the mounting bracket 310 on a corrugated panel 302. Any appropriate way of maintaining a gasket within its corresponding gasket pocket 326 may be utilized (e.g., by being press fit within the corresponding gasket pocket 326; adhering a gasket 326 to an inner surface of its corresponding gasket pocket 326). When the mounting bracket 310 is secured relative to a corrugated panel 302, each gasket may compress to bring the above-noted projections 328 into contact with the corresponding panel crown 304 of the corrugated panel 302. However, the projections 328 should still at least substantially confine the corresponding gasket within its corresponding gasket pocket 326, and furthermore should reduce the potential for the gaskets being over-compressed during installation as noted.

Figure 16D:
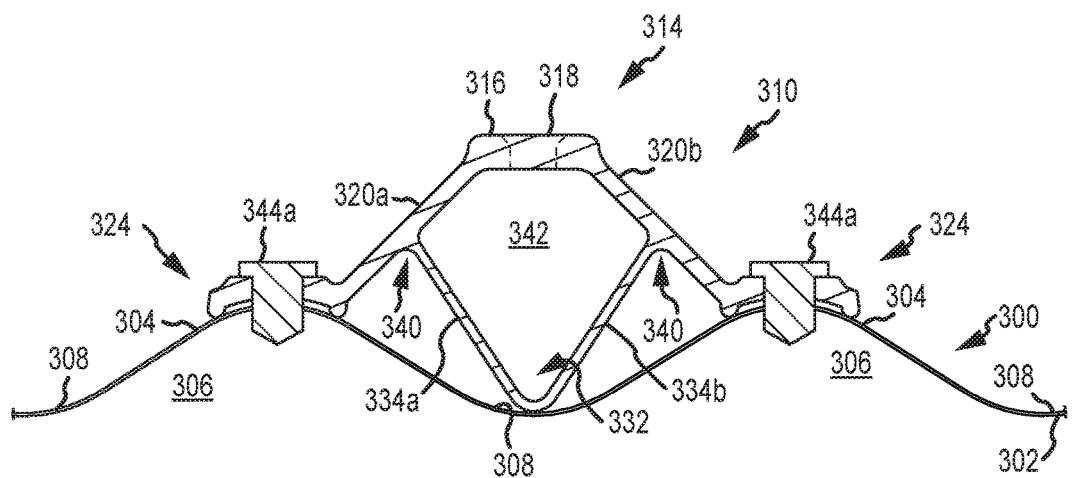
FIG. 16D is a cross-sectional view of the mounting bracket of FIG. 16A when installed on a corrugated panel for a first installation configuration, where bracket fasteners are anchored only in the sheeting of the corrugated panel.

FIG. 16D illustrates how the above-described mounting bracket 310 may be positioned or "seated" on a corrugated panel 302. Generally: 1) the panel valley engagement section 332 of the mounting bracket 310 is engaged with one panel valley 308 of the corrugated panel 302; 2) one panel crown engagement section 324 of the mounting bracket 310 is positioned on one panel crown 304 on one side of this same panel valley 308 (the adjacent-most panel crown 304 in the illustrated embodiment, although such may not be required in all instances); and 3) the other panel crown engagement section 324 of the mounting bracket 310 is positioned on one panel crown 304 on the opposite side of this same panel valley 308 (the adjacent-most panel crown 304 in the illustrated embodiment, although such may not be required in all instances).

FIG. 16D also illustrates one manner of securing the mounting bracket 310 relative to a corrugated panel 302. A separate bracket fastener 344*a* (e.g., a threaded screw) may be directed through each bracket fastener hole 330 of each panel crown engagement section 324, through a corresponding portion of the panel crown 304 of the corrugated panel 302, and may terminate within a hollow interior 306 located "under" this panel crown 304. In this case, the mounting bracket 310 is secured only to the sheeting that defines the corrugated panel 302.

Figure 16E:
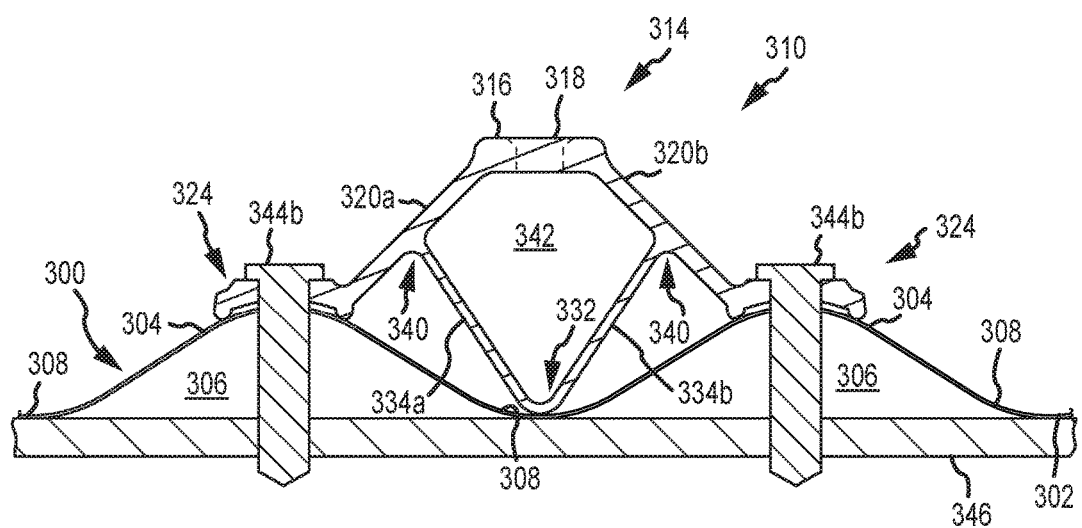
FIG. 16E is a cross-sectional view of the mounting bracket of FIG. 16A when installed on a corrugated panel for a second installation configuration, where bracket fasteners are anchored in a deck that supports the corrugated panel.

FIG. 16E illustrates another option for securing a mounting bracket 310 relative to a corrugated panel 302. Here, the corrugated panel 302 is positioned on a deck 346 or other substrate—the underside of each panel valley 308 of the corrugated panel 302 may contact the deck 346. This deck 346 may be formed from any appropriate material or combination of materials (e.g., wood, for instance plywood). In this case, a separate bracket fastener 344*b* (e.g., threaded screw) may be directed through each bracket fastener hole 330 of each panel crown engagement section 324, through a corresponding portion of the panel crown 304 of the corrugated panel 302, through the corresponding hollow interior 306, and may be anchored to the deck 346 (e.g., each such bracket fastener 344*b* at least extends within the deck 346, and may in fact extend completely through the deck 346). Here, the mounting bracket 310 may be characterized as being secured to both the sheeting of the corrugated panel 302, as well as to the underlying deck 346.

The installation configuration shown in FIG. 16E provides a number of advantages over the installation configuration shown in FIG. 16D. One is the additional securement of the mounting bracket 310 relative to the corrugated panel 302 provided by anchoring the mounting bracket 310 to the underlying deck 346 (versus just to the sheeting of the corrugated panel 302, as in the FIG. 16D configuration). Another is that the panel valley engagement section 332 should reduce the potential that the two panel crowns 304 (engaged by the panel crown engagement sections 324 of the mounting bracket 310) will collapse as the bracket fasteners 344*b* are anchored to the deck 346 in the above-described manner. That is, the panel valley engagement section 332 should reduce the potential of "over-tightening" the bracket fasteners 344*b* to the extent that could affect the structural integrity of the corresponding panel crown 304 (e.g., by at least partially collapsing such a panel crown 304).

FIG. 16F illustrates yet another option for securing a mounting bracket 310 relative to a corrugated panel 302.

Here, the corrugated panel 302 is positioned on a plurality of purlins 348 (only one shown in FIG. 16F). The length dimension of these purlins 348 are disposed orthogonal or perpendicular to the length dimension of the panel crowns 304 and panel valleys 308 of the corrugated panel 302. Each such purlin 348 may be formed from any appropriate material or combination of materials (e.g., a metal or metal alloy), and is commonly referred to in the art as being "Z-shaped."

Figure 16G:
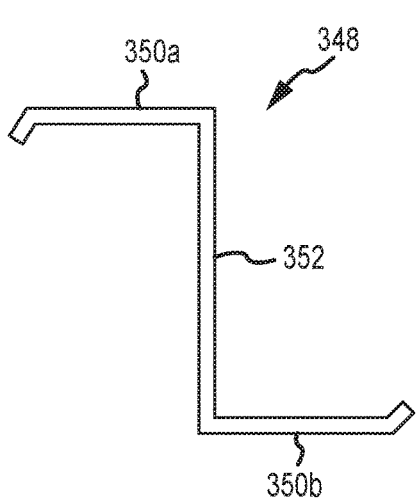
FIG. 16G is an end view of the Z-shaped purlin shown in FIG. 16F.

An end view of the purlin 348 from FIG. 16F is presented in FIG. 16G. Generally, the purlin 348 includes a pair of flanges 350a, 350b that are spaced from one another, but that are connected by an intermediate web 352. The flange 350a of the purlin 348 may engage the underside of the corrugated panel 302. That is, the various panel valleys 308 of the corrugated panel 302 may be positioned on the flange 350a of the purlin 348. As such, a separate bracket fastener 344b may be directed through each bracket fastener hole 330 of each panel crown engagement section 324 of the mounting bracket 310, through a corresponding portion of the panel crown 304 of the corrugated panel 302, through the corresponding hollow interior 306, and may be anchored to the upper flange 350a of the purlin 248 (e.g., each such bracket fastener 344b at least extends within the upper flange 350a, and may in fact extend completely through the upper flange 350a). Here, the mounting bracket 310 may be characterized as being secured to both the sheeting of the corrugated panel 302, as well as to one or more underlying purlins 348. The installation configuration shown in FIG. 16F provides the same advantages discussed above in relation to the installation configuration of FIG. 16E.

Figure 16H:
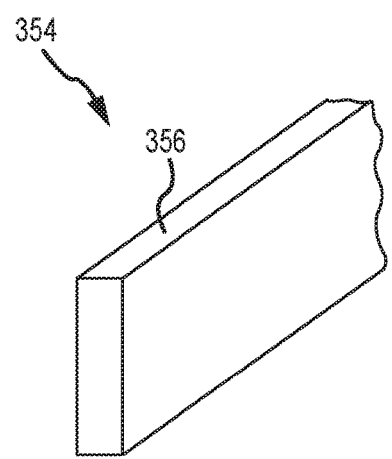
FIG. 16H is a perspective view of another embodiment of a purlin that may be used to support a corrugated panel, and that may be engaged by one or more bracket fasteners that secure the mounting bracket of FIGS. 16A-F on/relative to a corrugated panel.

The mounting bracket 310 may be anchored to purlins of any appropriate configuration. Another representative configuration is presented in FIG. 16H in the form of a purlin 354. This purlin 354 may be formed from any appropriate material or combination of materials (e.g., wood), and may be of any appropriate dimensions (e.g., a 2"×4" timber). The purlin 354 includes a panel interface surface 356 that is positioned for contact with the underside of a corrugated panel 302. As such, each bracket fastener 344b would be directed through this panel interface surface 356 and could terminate within the interior of the purlin 354. However, each bracket fastener 344b could be directed completely through the purlin 354 as well.

Figure 17:
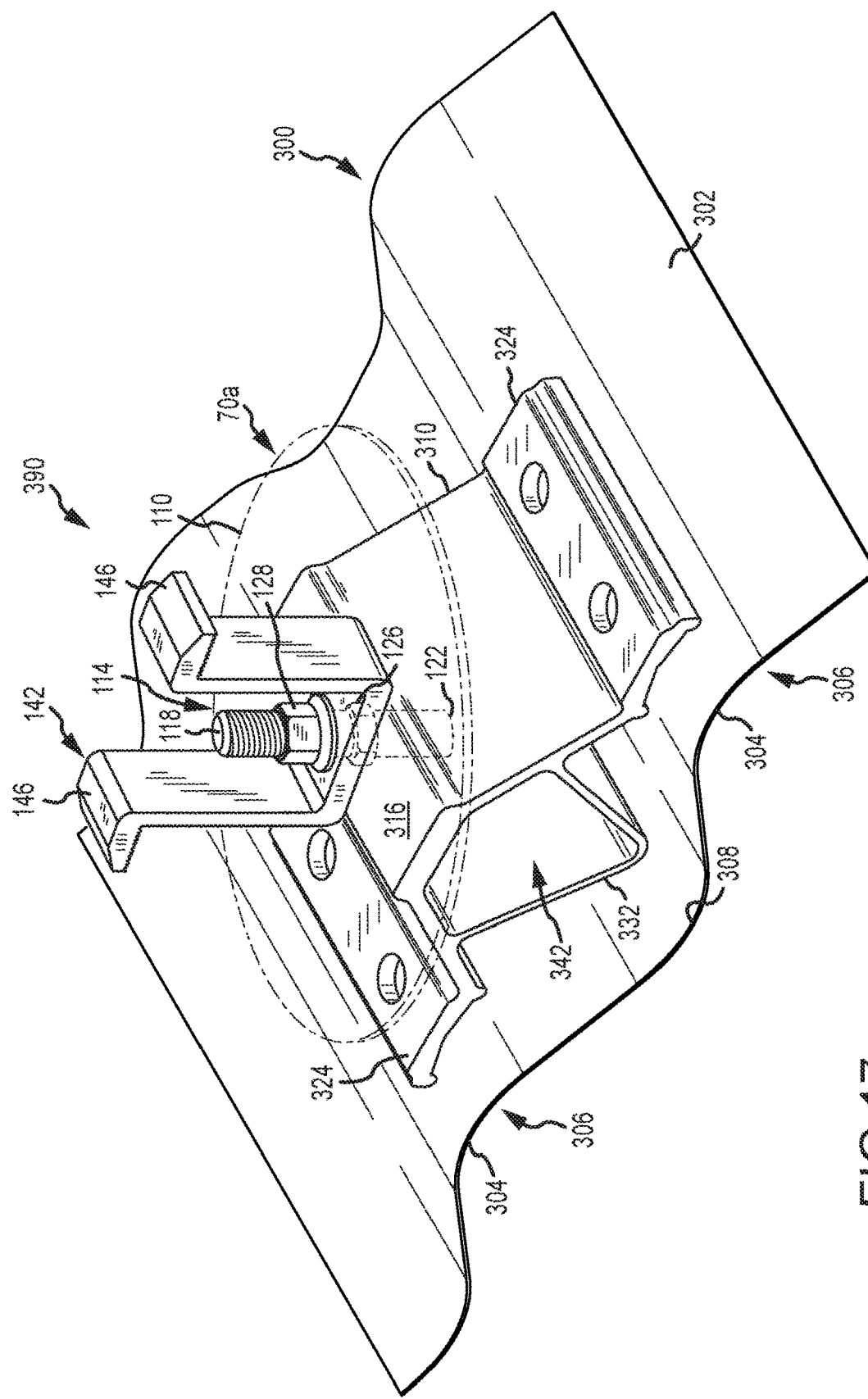
FIG. 17 is a perspective view of the mounting bracket of FIGS. 16A-F positioned on a corrugated panel, and when incorporated by the mounting assembly 70a from FIGS. 7A-B.

Various types of attachments may be installed on a building surface 300 defined by one or more corrugated panels 302 using the above-described mounting bracket 310. One example is shown in FIG. 17. One or more bracket fasteners (e.g., fasteners 344a, 344b) may be used to secure the mounting bracket 310 relative to a corrugated panel 302 (e.g., in accordance with FIGS. 16D-G). Here, a portion of the mounting assembly 70a (discussed above, and illustrated in FIG. 7A—the associated photovoltaic modules 58 not being shown in FIG. 17 for clarity) is installed on the mounting bracket 310 (i.e., the mounting bracket 310 may be used in place of the above-described mounting device 74 for corrugated panel configurations and for the above-noted photovoltaic module applications, as well as in conjunction with each of the above-discussed mounting assemblies (e.g., mounting 70a-c)). The threaded stud 114 of the mounting assembly 70a is engaged with the mounting hole 218 (threaded in this example) on the upper wall 316 of the mounting bracket 310. The second stud end 122 is disposed within the open space 342 of the mounting bracket 310 (e.g., so as to not contact any structure of the mounting bracket 310). The mounting assemblies 70b, 70c discussed above may be similarly mounted to the mounting bracket 210 and at least generally in the above-discussed manner. It should be appreciated that the clamping member 142 may be rotated 90° from the position illustrated in FIG. 17 to accommodate installation of one or more photovoltaic modules 58 in the above-described manner.

The clamping member 142 and mounting plate 110/110' of the mounting assemblies 70a-c addressed above each may be characterized as an "attachment" when secured to the mounting bracket 310 in the above-noted manner (e.g., a mounting bracket 310 secured to a corrugated panel 302, and having an attachment that is secured relative to the mounting bracket 310, may be collectively characterized as an "attachment assembly 390," with such a representative attachment assembly 390 being shown in FIG. 17). Any photovoltaic module 58 that is engaged by any such mounting assembly 70a-c (when incorporating a mounting bracket 310) may also be characterized as an "attachment" that is secured relative to the mounting bracket 310 using at least one attachment fastener (e.g., threaded stud 114) that is directed into a mounting hole 318 on the upper wall 316 of the mounting bracket 310, and collectively may be referred to as an "attachment assembly" as well.

Figure 18:
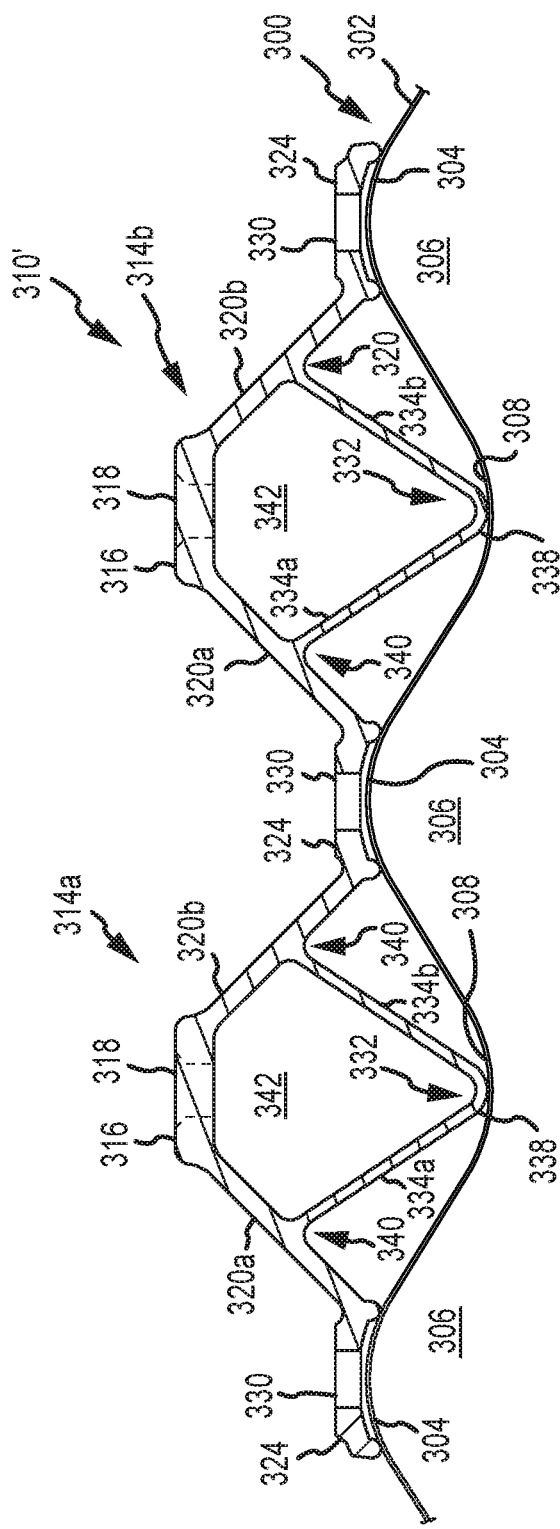
FIG. 18 is a cross-sectional view of a variation of the mounting bracket of FIGS. 16A-F, and when positioned on a corrugated panel.

A variation of the mounting device or bracket 310 of FIGS. 16A-F is presented in FIG. 18. Corresponding components of these two embodiments are identified by the same reference numerals, and the discussion presented above remains applicable unless otherwise noted. Those corresponding components that differ in at least some respect are identified by a "single prime" designation. In the case of the mounting bracket 310' of FIG. 18, basically two of the above-described mounting brackets 310 have been combined into a single unit and which in turn provides two valley sections 314a, 314b, each having an upper wall 316. The bracket leg 320b extending from the valley section 314a and the bracket leg 320a extending from the valley section 314b share a common panel crown engagement section 324. The mounting bracket 310' may be used in the various installation configurations discussed above in relation to FIGS. 16D-H.

The FIG. 18 configuration could also be modified to use only a single panel crown engagement section 324 (the panel crown engagement section located between the two panel valley engagement sections 332). In this case: 1) for the bracket leg 320a that extends from the valley section 214a, the portion after its intersection with the third bracket leg 334a could be eliminated (and its corresponding panel crown engagement section 324); and 2) for the bracket leg 320b that extends from the valley section 314b, the portion after its intersection with the fourth bracket leg 334b could be eliminated (and its corresponding panel crown engagement section 324).

Figure 12A:
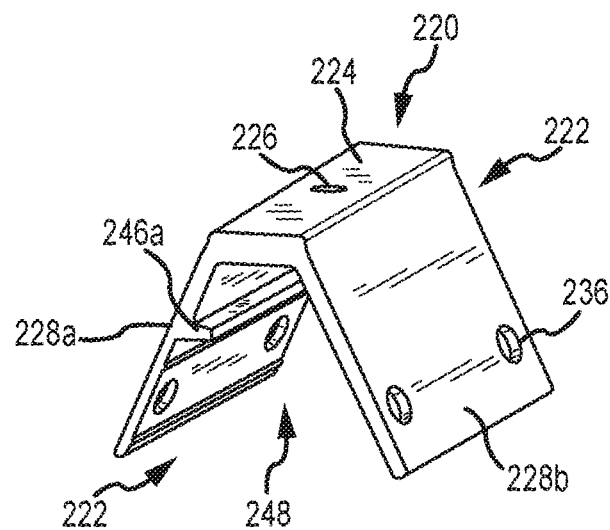
FIG. 12A is a perspective view of one embodiment of a mounting bracket for use with trapezoidal rib panels.
Figure 12B:
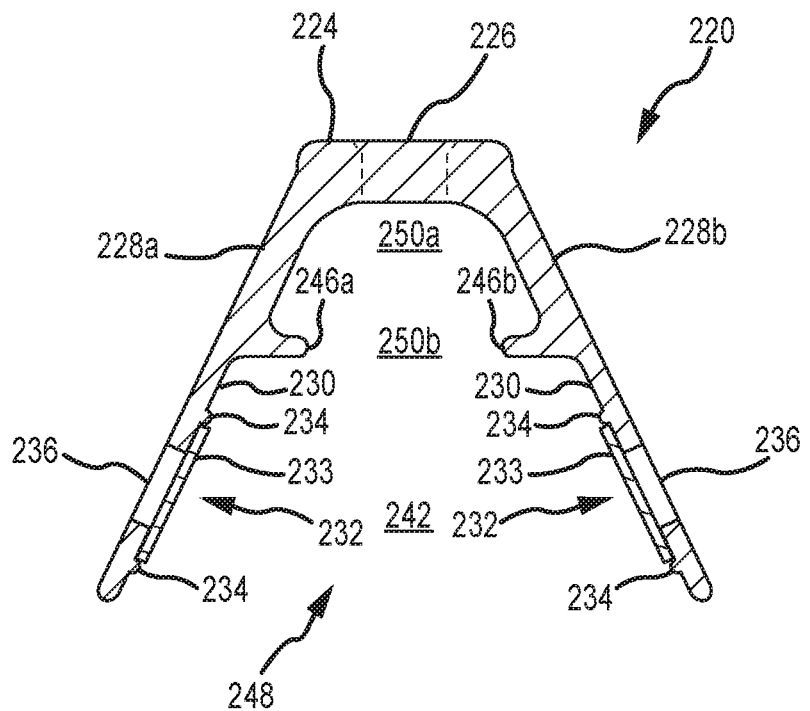
FIG. 12B is cross-sectional view of the mounting bracket of FIG. 12A.
Figure 12C:
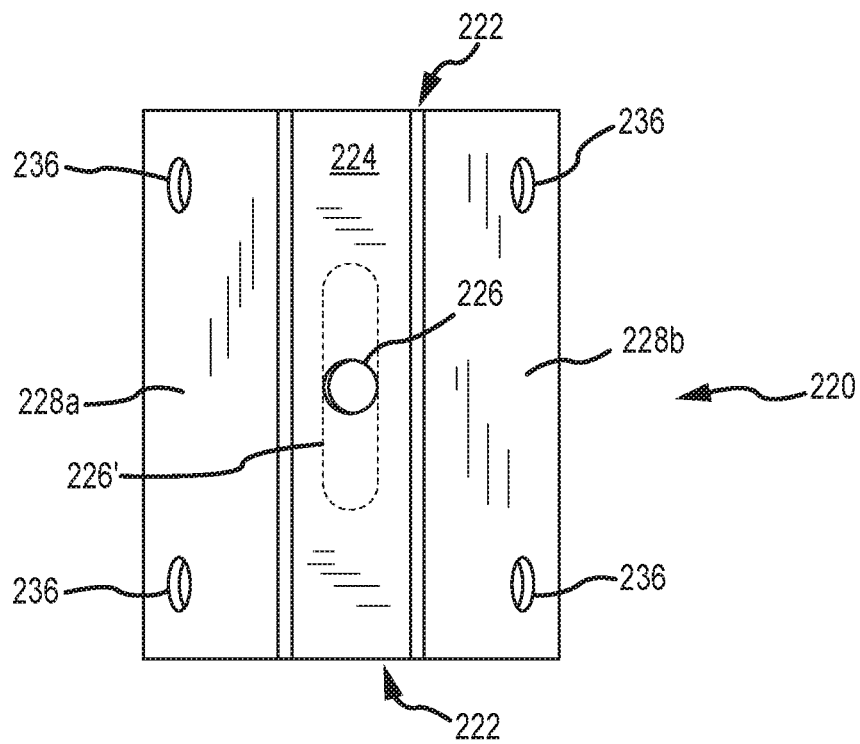
FIG. 12C is a top view of the mounting bracket of FIG. 12A.
Figure 19:
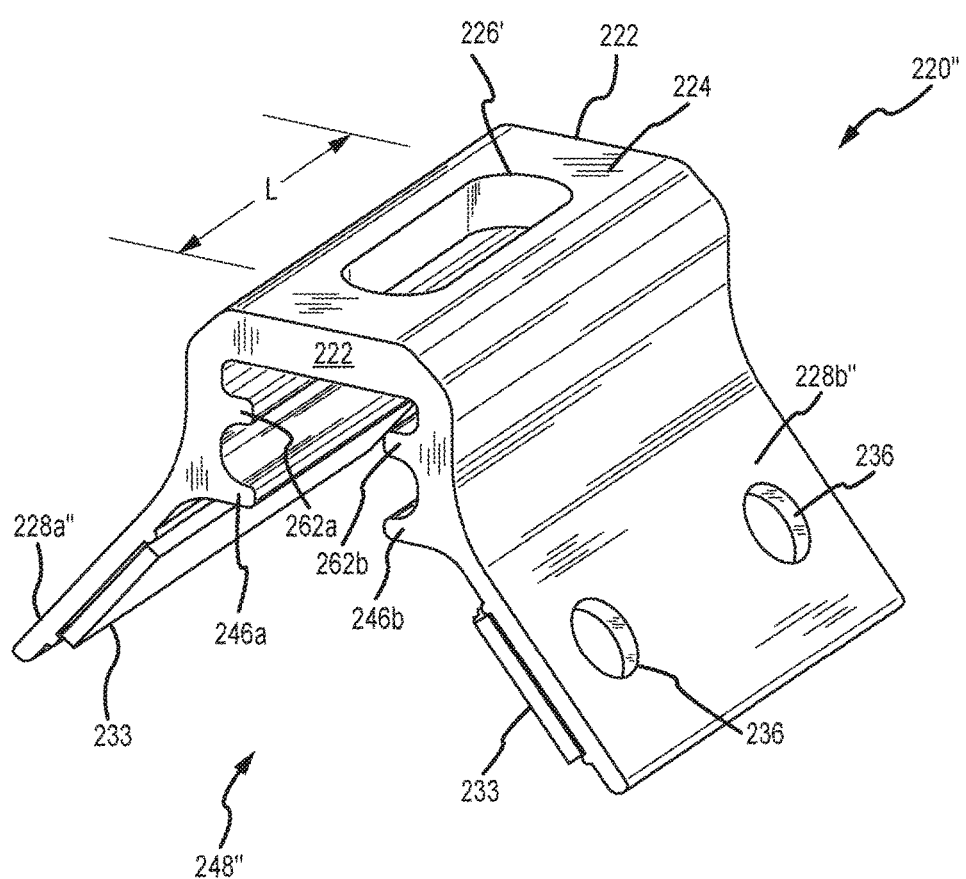
FIG. 19 is a perspective view of a variation of the mounting bracket of FIGS. 12A-C, which incorporates both an elongated mounting slot and an elongated nut receptacle.
Figure 20:
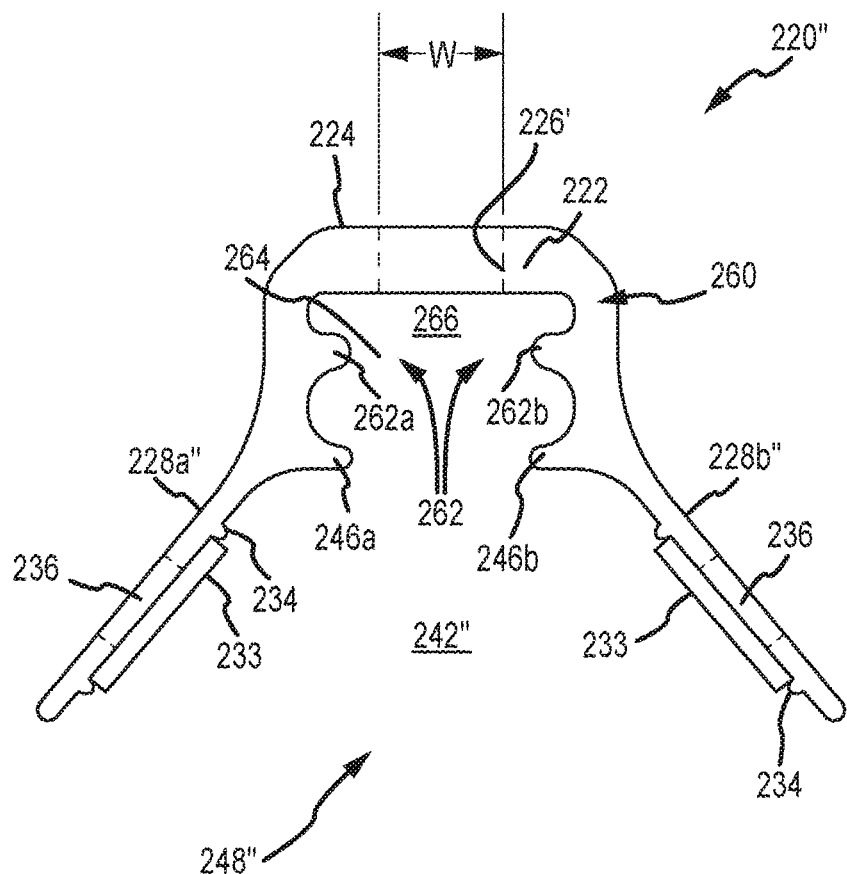
FIG. 20 is an end view of the mounting bracket of FIG. 19.
Figure 21:
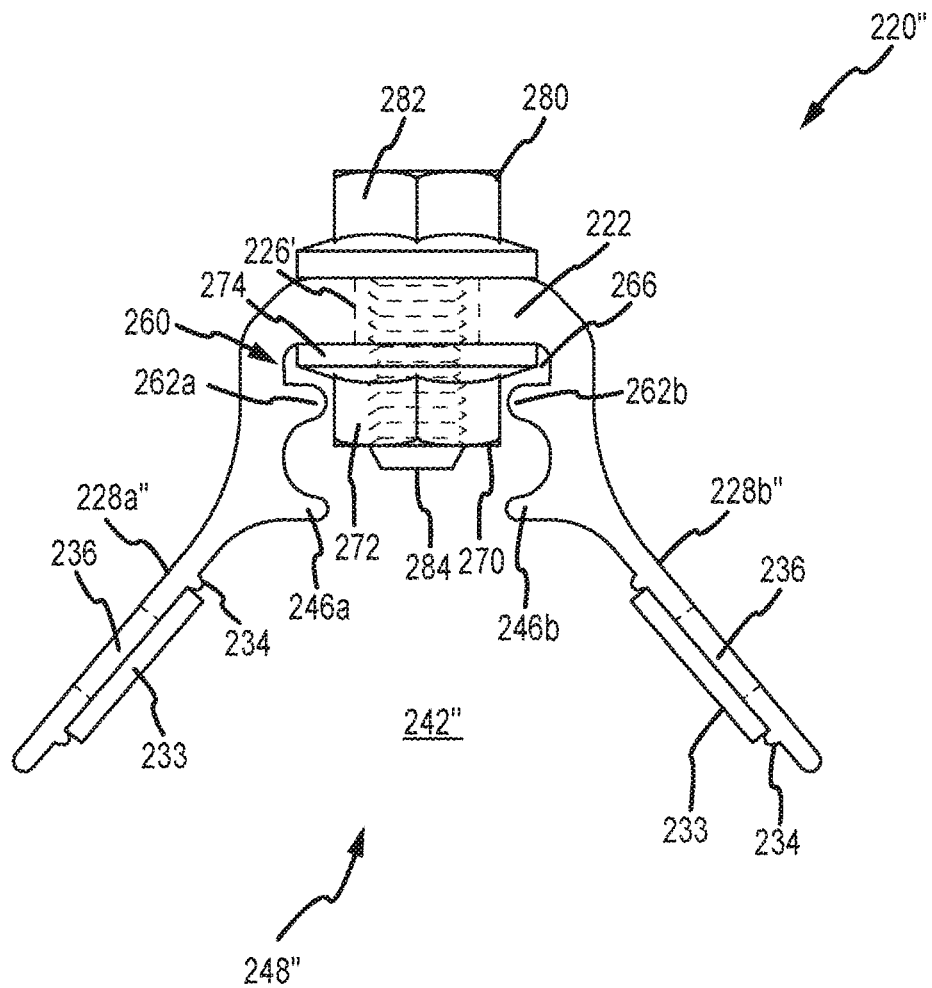
FIG. 21 is an end view of the mounting bracket of FIG. 19, along with a corresponding attachment fastener engaged with a nut that is movably disposed within the nut receptacle.

Another variation of the mounting device of FIGS. 12A-C is illustrated in FIGS. 19-21 and is identified by reference numeral 220". Corresponding components between the embodiments of FIGS. 12A-C and FIGS. 19-21 are identified by the same reference numerals. Those corresponding components that differ in at least some respect may be further identified by a double prime designation. Unless otherwise noted herein to the contrary, the discussion of the details of the mounting bracket 220, including the various features thereof, remains equally applicable to the mounting device 220" of FIGS. 19-21.

The mounting device or bracket 220" of FIGS. 19-21 includes an elongated mounting slot 226' of the type that was addressed above in relation to the embodiment of FIGS. 12A-C (e.g., having an un-threaded sidewall or perimeter wall that defines the mounting slot 226'). The side legs 228a", 228b" of the mounting bracket 220" are of a different configuration from that set forth in the embodiments of FIGS. 12A-C, and thereby are further identified by a double prime designation. Generally, the side legs 228a", 228b" each include an upper section and a corresponding lower section that are disposed in different orientations. The side legs 228a", 228b" each initially extend downwardly from the upper wall 224 in at least generally parallel relation to one another (the noted upper section), and then the side legs 228a", 228b" diverge from one another (the noted lower section) proceeding to their respective free lower ends. The lower section of each of the side legs 228a", 228b" are also more angled than shown in relation to the embodiment of FIGS. 12 A-C. As such, both the rib receptacle 242" and the hollow interior 248" of the mounting bracket 220" differ in at least some respects from the embodiment of FIGS. 12A-C, and thereby are further identified by a double prime designation.

A fundamental difference between the embodiments of FIGS. 12A-C and FIGS. 19-21 is the addition of a nut receptacle 260 for the mounting bracket 220". The nut receptacle 260 is defined by a base 262 that is disposed in spaced relation to an underside of the upper wall 224 of the mounting bracket 220", and further includes an open space or nut flange receptacle 266. The open space 266 for the nut receptacle 260 extends from the base 262 to the underside of the upper wall 224 in the illustrated embodiment, and thereby may be characterized as being disposed between the associated building surface and the upper wall 224.

The base 262 for the nut receptacle 260 is defined by a first base portion 262a and a second base portion 262b. The first base portion 262a extends from the side leg 228a" in the direction of the side leg 228b" (but not to the side leg 228b"). The second base portion 262b extends from the side leg 228b" in the direction of the side leg 228a" (but not to the side leg 228a"). The base portions 262a, 262b may be the mirror image of one another, and may be disposed in coplanar relation or directly across from one another. A nut body receptacle or base slot 264 extends between the base portions 262a, 262b, or stated another way the spacing between the base portions 262a, 262b defines a width for the base slot 264.

The mounting slot 226' is of an elongated configuration. A length dimension for the mounting bracket 220" may be defined as coinciding with the dimension in which the two ends 222 of the mounting bracket 220" are spaced from one another, while a width dimension for the mounting bracket 220" may be defined as coinciding with the dimension in which the side legs 228a", 228b" are spaced from one another. The mounting slot 226' may be characterized as being elongated in the noted length dimension (the mounting slot 226' having a length L—FIG. 19). As such, the mounting slot 226' has a length dimension that is larger, including significantly larger, than its corresponding width dimension (the mounting slot 226' having a length L (FIG. 19) and a width W (FIG. 20), where the magnitude of the length L exceeds the magnitude of the width W). In one embodiment, the length L of the mounting slot 226' is three times or more than the magnitude of the width W of the mounting slot 226'. The height or depth of the mounting slot 226' corresponds with the thickness of the upper wall 224 (where this height or depth dimension is orthogonal to a plane that contains the above-noted length and width dimensions for the mounting bracket 220"). The height or depth dimension may also be referred to as a vertical dimension.

Each of the base slot 264 and the open space 266 of the nut receptacle 260 extend between the ends 222 of the mounting bracket 220" in the illustrated embodiment. As such, each of the base slot 264 and the open space 266 may be characterized as being elongated in the length dimension of the mounting bracket 220". The mounting slot 226', the base slot 264, and the open space 266 may be characterized as being elongated in a common dimension—the length dimension of the mounting bracket 220" in the illustrated embodiment.

The elongated mounting slot 226' allows for adjustment of the location of an attachment fastener 280 (FIG. 21) relative to the mounting bracket 220", which may be of significant benefit for at least certain installations on a building surface. Even after the mounting bracket 220" is anchored relative to the building surface in the manner discussed above in the relation to the embodiment of FIGS. 12A-C, the attachment fastener 280 can be moved to any position along the length L of the mounting slot 226'. The length L of the mounting slot 226' accommodates a significant number of different positions of the attachment fastener 280 relative to the mounting bracket 220"—the attachment fastener 280 may assume a number of different positions between the two ends 222 of the mounting bracket 220" and that is accommodated by the elongated mounting slot 226'.

A nut 270 is positioned within the nut receptacle 260 of the mounting bracket 220" to maintain the attachment fastener 280 in a fixed position relative to the mounting bracket 220"—more specifically to secure an attachment to/relative to the mounting bracket 220". The nut 270 includes a nut flange 274 (e.g., of a circular configuration) that is positioned within the open space 266 of the nut receptacle 260, along with a nut body 272 (e.g., of a hexagonal configuration) that extends entirely through the base slot 264 of the nut receptacle 260 (i.e., the nut body receptacle 264 is open-ended in the illustrated embodiment). In the illustrated embodiment, the first base portion 262a and the second base portion 262b of the nut receptacle 260 are each disposed in closely spaced relation to a sidewall of the nut body 272. The first base portion 262a and the second base portion 262b may be disposed at least substantially adjacent to opposing portions on the sidewall of the nut body 272, and could in fact contact either of the base portions 262a, 262b so long as the nut 270 can be moved along the nut receptacle 260. The ends of the base portions 262a, 262b (disposed adjacent to or in contact with a corresponding sidewall of the nut body 272; that adjoin the nut body receptacle 264; that face or project toward one another) may be rounded or convexly shaped in the vertical dimension.

The effective outer diameter of the nut flange 274 is larger than the width of the base slot 264. As such, the nut 270 may be introduced into the nut receptacle 260 from either of the ends 222. Moreover, opposing portions of the nut flange 274 may be at least initially positioned on the base portions 262a, 262b (surfaces thereof that project in the direction of the upper wall 224) so as to keep the nut 270 from passing or falling into the hollow interior 248" of the mounting bracket 220". The base portions 262a, 262b may also be characterized as defining a maximum amount that the nut 270 is able to move away from the upper wall 224 when the nut 270 is disposed in the nut receptacle 260. Generally, the configuration of the nut receptacle 260 retains at last part of the nut 270 (e.g., the nut flange 274) within the nut receptacle 260 (at least in the vertical dimension).

Further restraint is provided by the configuration of the nut receptacle 260 in relation to a nut 270 disposed therein. Generally, the nut receptacle 260 is configured to restrain or limit rotation of the nut 270 relative to the mounting bracket 220", where this rotation is about a center axis of the nut 270

(coinciding with the direction that the attachment fastener 280 is directed into/through the nut 270). This rotational restraint is provided by the above-noted positioning of the base portions 262a, 262b relative to the sidewall of the nut body 272. One base portion 262a could be positioned adjacent to or in contact with one flat on the sidewall of the nut body 272, and the other base portion 262b could be positioned adjacent to or in contact with an oppositely disposed flat on the sidewall of the nut body 272. Although a small degree of relative rotational movement may be allowed between the nut 270 and the mounting bracket 220" when initially engaged by the attachment fastener 280, a flat on the sidewall of the nut body 272 should not be able to rotate past its corresponding base portion 262a, 262b based upon the noted positioning of the base portions 262a, 262b. Further in this regard, preferably the depth of the open space 266 and/or the height of the nut body 272 is selected such that when the nut flange 272 is pulled up against the underside of the upper wall 224, at least part of the nut body 272 is still disposed between the base portions 262a, 262b (to provide the noted rotational restraint).

In order to secure an attachment relative to the mounting bracket 220", at least part of the attachment may be positioned on the upper wall 224 of the mounting bracket 220". A threaded shaft 284 of the attachment fastener 280 may be directed through the attachment, and then into the mounting slot 226'. The nut 270 may be moved along the length dimension of the mounting bracket 220" (within the nut receptacle 260) so as to be aligned with the attachment fastener 280. This repositioning of the nut 270 may be undertaken in any appropriate manner and at any appropriate time. For instance, the desired location of the attachment fastener 280 along the length L of the mounting slot 226' could be determined prior to positioning the attachment on the mounting bracket 220", and an installer could then direct the attachment fastener 280 into/through the mounting slot 226' to engage and then move the nut 270 along the nut receptacle 260 (in the length dimension of the mounting bracket 220") into the desired position. In any case and once the attachment fastener 280 and the nut 270 are properly aligned, and with the attachment being positioned on the upper wall 224 of the mounting bracket 220", the shaft 284 of the attachment fastener 280 may be threaded into/through the nut 270 (after having first passed through a portion of the attachment and then through the mounting slot 226'), preferably until a head 282 of the attachment fastener 280 compresses the corresponding portion of the attachment against the upper wall 224 of the mounting bracket 220". The nut flange 274 should engage the underside of the upper wall 224 at this time as well, which provides an increased area of contact with the upper wall 224 compared to if the nut flange 274 were not used (e.g., if instead an end of the nut body 272 engaged the underside of the upper wall 224).

Figure 22:
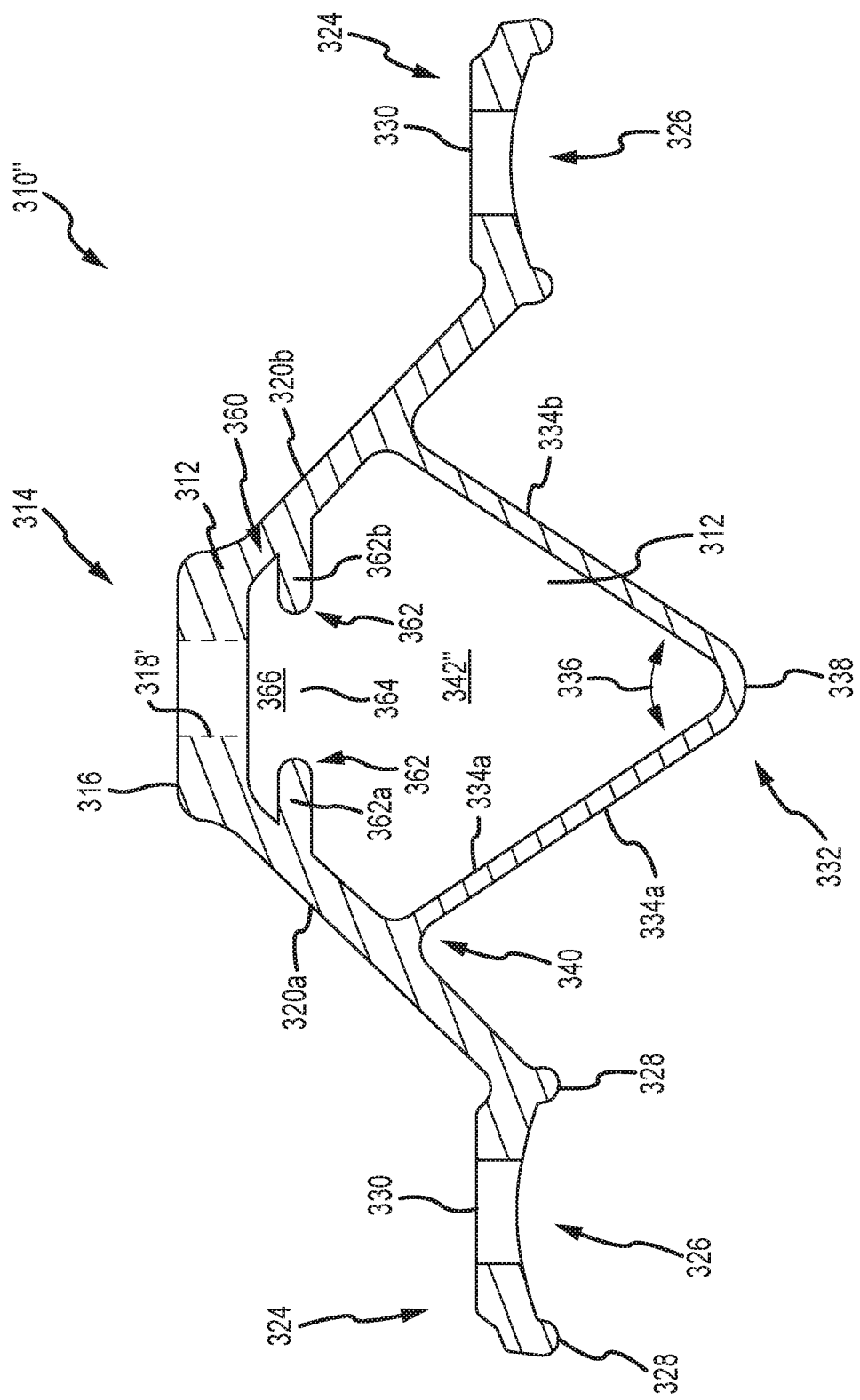
FIG. 22 is an end view of a variation of the mounting bracket of FIGS. 16A-C, which incorporates an elongated mounting slot and a corresponding elongated nut receptacle.

Another variation of the mounting device of FIGS. 16A-C is illustrated in FIGS. 22-23 and is identified by reference numeral 310". Corresponding components between the embodiments of FIGS. 16A-C and FIGS. 22-23 are identified by the same reference numerals. Those corresponding components that differ in at least some respect may be further identified by a double prime designation. Unless otherwise noted herein to the contrary, the discussion of the details of the mounting bracket 310, including the various features thereof, remains equally applicable to the mounting device 310" of FIGS. 22-23.

The mounting device or bracket 310" of FIGS. 22-23 includes an elongated mounting slot 318' of the type that was addressed above in relation to the embodiment of FIGS. 16A-C (e.g., having an un-threaded sidewall or perimeter that defines the mounting slot 318'). A fundamental difference between the embodiments of FIGS. 16A-C and FIGS. 22-23 is the addition of a nut receptacle 360 for the mounting bracket 310". The nut receptacle 360 is defined by a base 362 that is disposed in spaced relation to an underside of the upper wall 316, and further includes an open space or nut flange receptacle 366. The open space 366 for the nut receptacle 360 extends from the base 362 to the underside of the upper wall 316 in the illustrated embodiment, and thereby may be characterized as being disposed between the associated building surface and the upper wall 316.

The base 362 for the nut receptacle 360 is defined by a first base portion 362a and a second base portion 362b. The first base portion 362a extends from the first leg 320a in the direction of the second leg 320b (but not to the second leg 320b). The second base portion 362b extends from the second leg 320b in the direction of the first leg 320a (but not to the first leg 320a). The base portions 362a, 362b may be the mirror image of one another, and may be disposed in coplanar relation or directly across from one another. A nut body receptacle or base slot 364 extends between the base portions 362a, 362b, or stated another way the spacing between the base portions 362a, 362b defines a width for the base slot 364.

The mounting slot 318' is of an elongated configuration. A length dimension for the mounting bracket 310" may be defined as coinciding with the dimension in which the two ends 312 of the mounting bracket 310" are spaced from one another, while a width dimension for the mounting bracket 310" may be defined as coinciding with the dimension in which the legs 320a, 320b are spaced from one another. The mounting slot 318' may be characterized as being elongated in the noted length dimension. As such, the mounting slot 318' has a length dimension that is larger, including significantly larger, than its corresponding width dimension. In one embodiment, the length of the mounting slot 318' is three times or more than the magnitude of the width of the mounting slot 318'. The height or depth of the mounting slot 318' corresponds with the thickness of the upper wall 316 (where this height or depth dimension is orthogonal to a plane that contains the above-noted length and width dimensions for the mounting bracket 310"). The height or depth dimension may also be referred to as a vertical dimension.

Each of the base slot 364 and the open space 366 of the nut receptacle 360 extend between the ends 312 of the mounting bracket 310" in the illustrated embodiment. As such, each of the base slot 364 and the open space 366 may be characterized as being elongated in the length dimension of the mounting bracket 320". The mounting slot 318', the base slot 364, and the open space 366 may be characterized as being elongated in a common dimension—the length dimension of the mounting bracket 310" in the illustrated embodiment.

The elongated mounting slot 318' allows for adjustment of the location of an attachment fastener 380 (FIG. 23) relative to the mounting bracket 310", which may be of significant benefit for at least certain installations on a building surface. Even after the mounting bracket 310" is anchored relative to the building surface in the manner discussed above in the relation to the embodiment of FIGS. 16A-C, the attachment fastener 380 can be moved to any position along the length of the mounting slot 318'. The length of the mounting slot 318' accommodates a significant number of different positions of the attachment fastener 380 relative to the mounting bracket 310"—the attachment fastener 380 may assume a number of different positions between the two ends 312 of the mounting bracket 310" and that is accommodated by the elongated mounting slot 318'.

A nut 370 is positioned within the nut receptacle 360 of the mounting bracket 310" to maintain the attachment fastener 380 in a fixed position relative to the mounting bracket 310"—more specifically to secure an attachment to/relative to the mounting bracket 310". The nut 370 includes a nut flange 374 (e.g., of a circular configuration) that is positioned within the open space 366 of the nut receptacle 360, along with a nut body 372 (e.g., of a hexagonal configuration) that extends entirely through the base slot 364 of the nut receptacle 360. In the illustrated embodiment, the first base portion 362a and the second base portion 362b of the nut receptacle 360 are each disposed in closely spaced relation to a sidewall of the nut body 372. The first base portion 362a and the second base portion 362b may be disposed at least substantially adjacent to opposing portions on the sidewall of the nut body 372, and could in fact contact either of the base portions 362a, 362b so long as the nut 370 can be moved along the nut receptacle 360. The ends of the base portions 362a, 362b may be rounded or convexly shaped in the vertical dimension.

The effective outer diameter of the nut flange 374 is larger than the width of the base slot 364. As such, the nut 370 may be introduced into the nut receptacle 360 from either of the ends 312. Moreover, opposing portions of the nut flange 374 may be at least initially positioned on the base portions 362a, 362b (surfaces thereof that project in the direction of the upper wall 316) so as to keep the nut 370 from passing or falling into the open space 342" of the mounting bracket 310". In this regard, the configuration of the nut receptacle 360 retains at last part of the nut 370 (e.g., the nut flange 374) within the nut receptacle 360 (at least in the vertical dimension).

Further restraint is provided by the configuration of the nut receptacle 360 in relation to a nut 370 disposed therein. Generally, the nut receptacle 360 is configured to restrain or limit rotation of the nut 370 relative to the mounting bracket 310", where this rotation is about a center axis of the nut 370 (coinciding with the direction that the attachment fastener 380 is directed into/through the nut 370). This rotational restraint is provided by the above-noted positioning of the base portions 362a, 362b relative to the sidewall of the nut body 372. One base portion 362a could be positioned adjacent to or in contact with one flat on the sidewall of the nut body 372, and the other base portion 362b could be positioned adjacent to or in contact with an oppositely disposed flat on the sidewall of the nut body 372. Although a small degree of relative rotational movement may be allowed between the nut 370 and the mounting bracket 310", a flat on the sidewall of the nut body 372 should not be able to rotate past its corresponding base portion 362a, 362b based upon the noted positioning of the base portions 362a, 362b. Further in this regard, preferably the depth of the open space 366 and/or the height of the nut body 372 is selected such that when the nut flange 372 is pulled up against the underside of the upper wall 316, at least part of the nut body 372 is still disposed between the base portions 362a, 362b (to provide the noted rotational restraint).

In order to secure an attachment relative to the mounting bracket 310", at least part of the attachment may be positioned on the upper wall 316 of the mounting bracket 310". A threaded shaft 384 of the attachment fastener 380 may be directed through the attachment, and then into the mounting slot 318'. The nut 370 may be moved along the length dimension of the mounting bracket 310" (within the nut receptacle 360) so as to be aligned with the attachment fastener 380. This repositioning of the nut 370 may be undertaken in any appropriate manner and at any appropriate time. For instance, the desired location of the attachment fastener 380 along the length of the mounting slot 318' could be determined prior to positioning the attachment on the mounting bracket 310", and an installer could then direct the attachment fastener 380 into/through the mounting slot 318' to engage and then move the nut 370 along the nut receptacle 360 (in the length dimension of the mounting bracket 310") into the desired position. In any case and once the attachment fastener 380 and the nut 370 are properly aligned, and with the attachment being positioned on the upper wall 324 of the mounting bracket 320", the shaft 384 of the attachment fastener 380 may be threaded into/through the nut 370 (after having first passed through a portion of the attachment and then through the mounting slot 318'), preferably until a head 382 of the attachment fastener 380 compresses the corresponding portion of the attachment against the upper wall 316 of the mounting bracket 310". The nut flange 374 should engage the underside of the upper wall 316 at this time as well, which provides an increased area of contact with the upper wall 316 compared to if the nut flange 374 were not used (e.g., if instead an end of the nut body 372 engaged the underside of the upper wall 316).

Figure 24A:
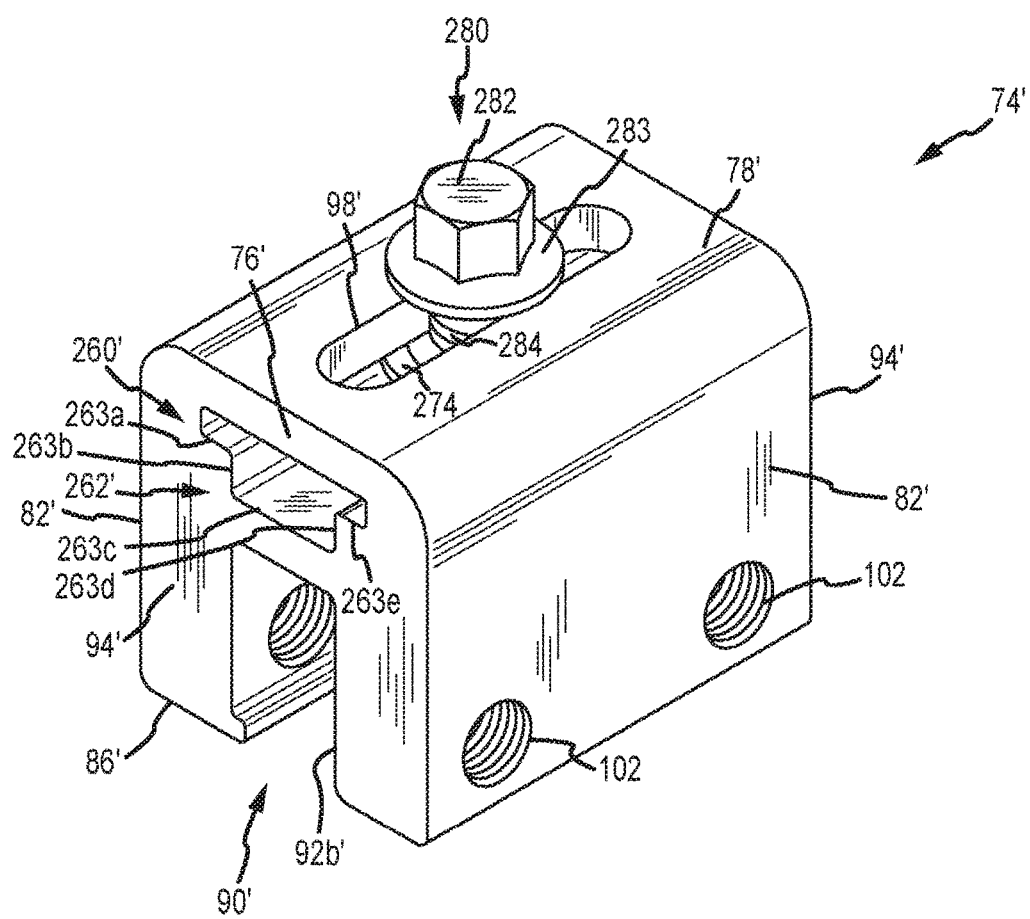
FIG. 24A is a perspective view of a variation of the mounting device shown in FIG. 5, and which incorporates both an elongated mounting slot and an elongated nut receptacle.
Figure 24B:
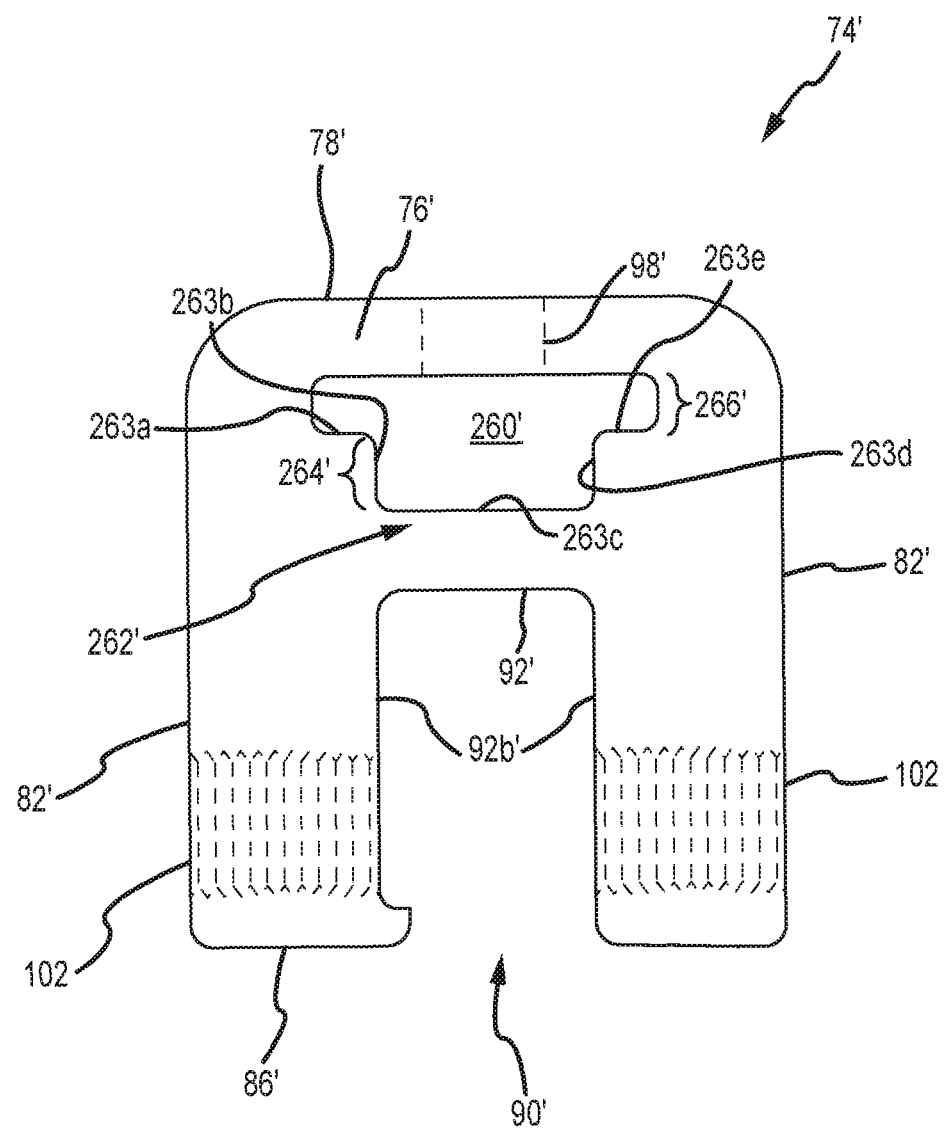
FIG. 24B is a cut-away view of the mounting bracket of FIG. 24A.
Figure 24C:
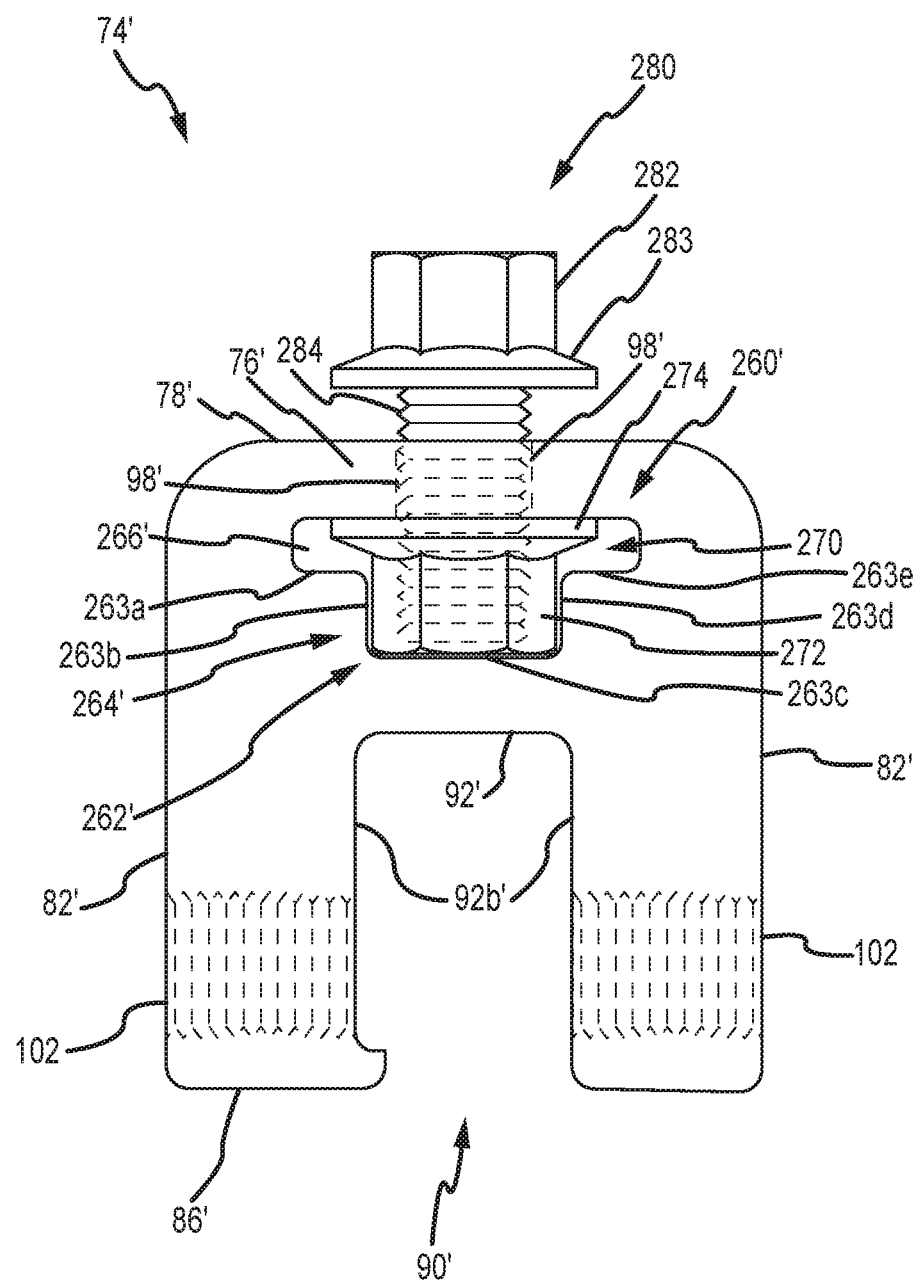
FIG. 24C is a cut-away view of the mounting bracket of FIG. 24A, along with a corresponding attachment fastener engaged with a nut that is movably disposed within the nut receptacle.

A variation of the mounting device 74 from FIG. 5 is presented in FIGS. 24A-C and is identified by reference numeral 74'. Corresponding components are identified by the same reference numerals. Those corresponding components that differ in at least some respect may be further identified by a single prime designation in the embodiment of FIGS. 24A-C.

The mounting device 74' of FIGS. 24A-C includes an upper surface 78' and an oppositely disposed bottom surface 86', a pair of oppositely disposed side surfaces 82', and a pair of oppositely disposed ends 94'. The upper surface 78' includes an elongated mounting slot 98', while the bottom surface 86' includes a slot 90' that extends between the two ends 94' of the mounting device 74'. The slot 90' on the bottom surface 86' of the mounting device 74' includes a slot base 92a' and a pair of slot sidewalls 92b' that are spaced apart to receive at least an end section of a standing seam 42. One or more seam fasteners 106 (FIG. 5) may be directed through a threaded hole 102 of the mounting device 74' and into the slot 90' to engage the standing seam 42. In the illustrated embodiment, each threaded hole 102 on one of the slot sidewalls 92b' is disposed in opposing relation to a threaded hole 102 on the other slot sidewall 92b'. The mounting device 74' could be configured such that only one of the slot sidewalls 92b' has one or more threaded holes 102. Moreover, the mounting device 74' could be configured such that each threaded hole 102 on one slot sidewall 92b' is not aligned with a threaded hole 102 on the other slot sidewall 92b'. In any case, each seam fastener 106 that is used to secure the mounting device 74' to a standing seam 42 only interfaces with an exterior surface of the standing seam 42. In this regard, an end of the seam fastener 106 that interfaces with the standing seam 42 may be convex, rounded, or of a blunt-nosed configuration to provide a desirable interface with the standing seam 42.

A fundamental difference between the mounting device 74 shown in FIG. 5 and the mounting device 74' shown in FIGS. 24A-C is the addition of a nut receptacle 260' and using an un-threaded, elongated mounting slot 98' instead of a threaded hole 98. Generally, the nut receptacle 260' is located between the upper surface 78' of the mounting device 74' and the base 92' of the slot 90', and furthermore extends between the two ends 94' of the mounting device 74'. This additionally may be viewed as defining an upper wall 76' for the mounting device 74'. In this regard, the mounting slot 98' may be characterized as extending entirely through this upper wall 76' and to the nut receptacle 260'.

The mounting slot 98' is of an elongated configuration. A length dimension for the mounting device 74' may be defined as coinciding with the dimension in which the two ends 94' of the mounting device 74' are spaced from one another, while a width dimension for the mounting device 74' may be defined as coinciding with the dimension in which the two slot sidewalls 92b are spaced from one another. The mounting slot 98' may be characterized as being elongated in the noted length dimension. As such, the mounting slot 98' has a length dimension that is larger, including significantly larger, than its corresponding width dimension. In one embodiment, the length of the mounting slot 98' is three times or more than the magnitude of the width of the mounting slot 98'. The height or depth of the mounting slot 98' corresponds with the thickness of the upper wall 76' (where this height or depth dimension is orthogonal to a plane that contains the above-noted length and width dimensions for the mounting device 74'). The height or depth dimension may also be referred to as a vertical dimension.

The nut receptacle 260' is defined by a base 262' that is disposed in spaced relation to an underside of an upper wall 76' of the mounting device 74'. The base 262' in the case of the mounting device 74' may be characterized as being defined by a first base surface 263a, a second base surface 263b, a third base surface 263c, a fourth base surface 263d, and a fifth base surface 263e. The spacing between underside of the upper wall 76' and the base surfaces 263a, 263e defines a nut body pocket or receptacle 266'. The spacing between the base surfaces 263b, 263d, along with the base surface 263c that extends between these base surfaces 263b, 263d, defines a nut body receptacle or pocket 264'. The base surface 263a and base surface 263b may be characterized as collectively defining a first base portion, the base surface 263e and base surface 263d may be characterized as collectively defining a second base portion, and the nut body receptacle or pocket 264' may therefore be characterized as being defined in part by the first and second base portions (the bottom of the nut body receptacle or pocket 264' is closed by the third base surface 263c (versus being "open" as in the embodiments of FIGS. 19-21 and 22-23)).

Each of the nut body receptacle 264' and the nut flange receptacle 266' of the nut receptacle 260' extend between the ends 94' of the mounting device 74' in the illustrated embodiment. As such, each of the nut body receptacle 264' and the nut flange receptacle 266' may be characterized as being elongated in the length dimension of the mounting device 74'. The mounting slot 98', the nut body receptacle 264', and the nut flange receptacle 266' may be characterized as being elongated in a common dimension—the length dimension of the mounting 74' in the illustrated embodiment.

The elongated mounting slot 98' allows for adjustment of the location of an attachment fastener 280 relative to the mounting device 74', which may be of significant benefit for at least certain installations on a building surface. Even after the mounting device 74' is anchored relative to the building surface in the above-noted manner, the attachment fastener 280 can be moved to any position along the length L of the mounting slot 98'. The length of the mounting slot 98' accommodates a significant number of different positions of the attachment fastener 280 relative to the mounting device 74'—the attachment fastener 280 may assume a number of different positions between the two ends 94' of the mounting device 74' and that is accommodated by the elongated mounting slot 98'.

A nut 270 is positioned within the nut receptacle 260' of the mounting device 74' to maintain the attachment fastener 280 in a fixed position relative to the mounting device 74'—more specifically to secure an attachment to/relative to the mounting device 74'. The nut 270 includes a nut flange 274 (e.g., of a circular configuration) that is positioned within the nut flange receptacle 266' of the nut receptacle 260', along with a nut body 272 (e.g., of a hexagonal configuration) that is at least partially disposed in the nut body receptacle 264' of the nut receptacle 260'. In the illustrated embodiment, the second surface 263b and the fourth base surface 263d of the nut receptacle 260' are each disposed in closely spaced relation to a corresponding portion of the sidewall of the nut body 272. The second base surface 263b and the fourth base surface 263d may be disposed at least substantially adjacent to opposing portions on the sidewall of the nut body 272, and could in fact contact the nut 270 so long as the nut 270 can be moved along the nut receptacle 260'.

The effective outer diameter of the nut flange 274 is larger than the width of the nut body receptacle 264'. As such, the nut 270 may be introduced into the nut receptacle 260 from either of the ends 94' of the mounting device 74'. Moreover, opposing portions of the nut flange 274 may be at least initially positioned on the base surfaces 263a, 263d. However, the nut 270 may be disposed on the base surface 263c, which may dispose the nut flange 274 in spaced relation to the base surfaces 263a, 263e as shown. In any case, the nut body receptacle 264' is closed in the embodiment of FIGS. 24A-C.

Further restraint is provided by the configuration of the nut receptacle 260' in relation to a nut 270 disposed therein. Generally, the nut receptacle 260' is configured to restrain or limit rotation of the nut 270 relative to the mounting device 74', where this rotation is about a center axis of the nut 270 (coinciding with the direction that the attachment fastener 280 is directed into/through the nut 270). This rotational restraint is provided by the above-noted positioning of the base surfaces 263b, 263d relative to the sidewall of the nut body 272. The base surface 263b could be positioned adjacent to or in contact with one flat on the sidewall of the nut body 272, and the base surface 263d could be positioned adjacent to or in contact with an oppositely disposed flat on the sidewall of the nut body 272. Although a small degree of relative rotational movement may be allowed between the nut 270 and the mounting device 74' when initially engaged by the attachment fastener 280, a flat on the sidewall of the nut body 272 should not be able to rotate past its corresponding base surface 263b, 263d based upon the noted positioning of the base surfaces 263b, 263d. Further in this regard, preferably the depth of the nut flange receptacle 266' and/or the height of the nut body 272 is selected such that when the nut flange 272 is pulled up against the underside of the upper wall 76', at least part of the nut body 272 is still disposed between the base surfaces 263b, 263d (to provide the noted rotational restraint).

In order to secure an attachment relative to the mounting device 74', at least part of the attachment may be positioned on the upper surface 78' of the mounting device 74'. A threaded shaft 284 of the attachment fastener 280 may be directed through the attachment, and then into the mounting slot 98'. The nut 270 may be moved along the length dimension of the mounting device 74' (within the nut receptacle 260') so as to be aligned with the attachment fastener 280. This repositioning of the nut 270 may be undertaken in any appropriate manner and at any appropriate time. For instance, the desired location of the attachment fastener 280 along the length of the mounting slot 98' could be determined prior to positioning the attachment on the mounting device 74', and an installer could then direct the attachment fastener 280 into/through the mounting slot 98' to engage and then move the nut 270 along the nut receptacle 260 (in the length dimension of the mounting device 74') into the desired position. In any case and once the attachment fastener 280 and the nut 270 are properly aligned, and with the attachment being positioned on the upper surface 78' of the mounting device 74', the shaft 284 of the attachment fastener 280 may be threaded into/through the nut 270 (after having first passed through a portion of the attachment and then through the mounting slot 98'), preferably until a head 282 of the attachment fastener 280 compresses the corresponding portion of the attachment against the upper surface 78' of the mounting device 74'. The nut flange 274 should engage the underside of the upper wall 76' at this time as well, which provides an increased area of contact with the upper wall 76' compared to if the nut flange 274 were not used (e.g., if instead an end of the nut body 272 engaged the underside of the upper wall 76').

Figure 25A:
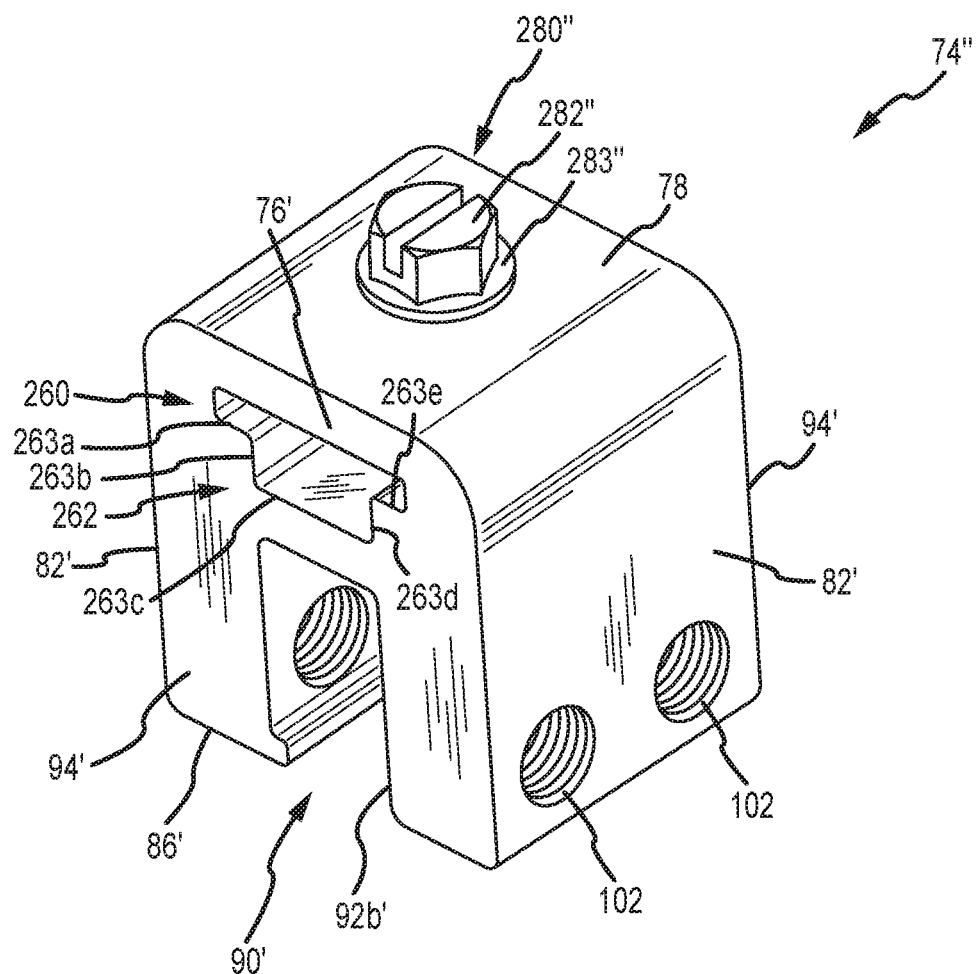
FIG. 25A is a perspective view of a variation of the mounting device shown in FIGS. 24A-C by eliminating the elongated nut receptacle.
Figure 25B:
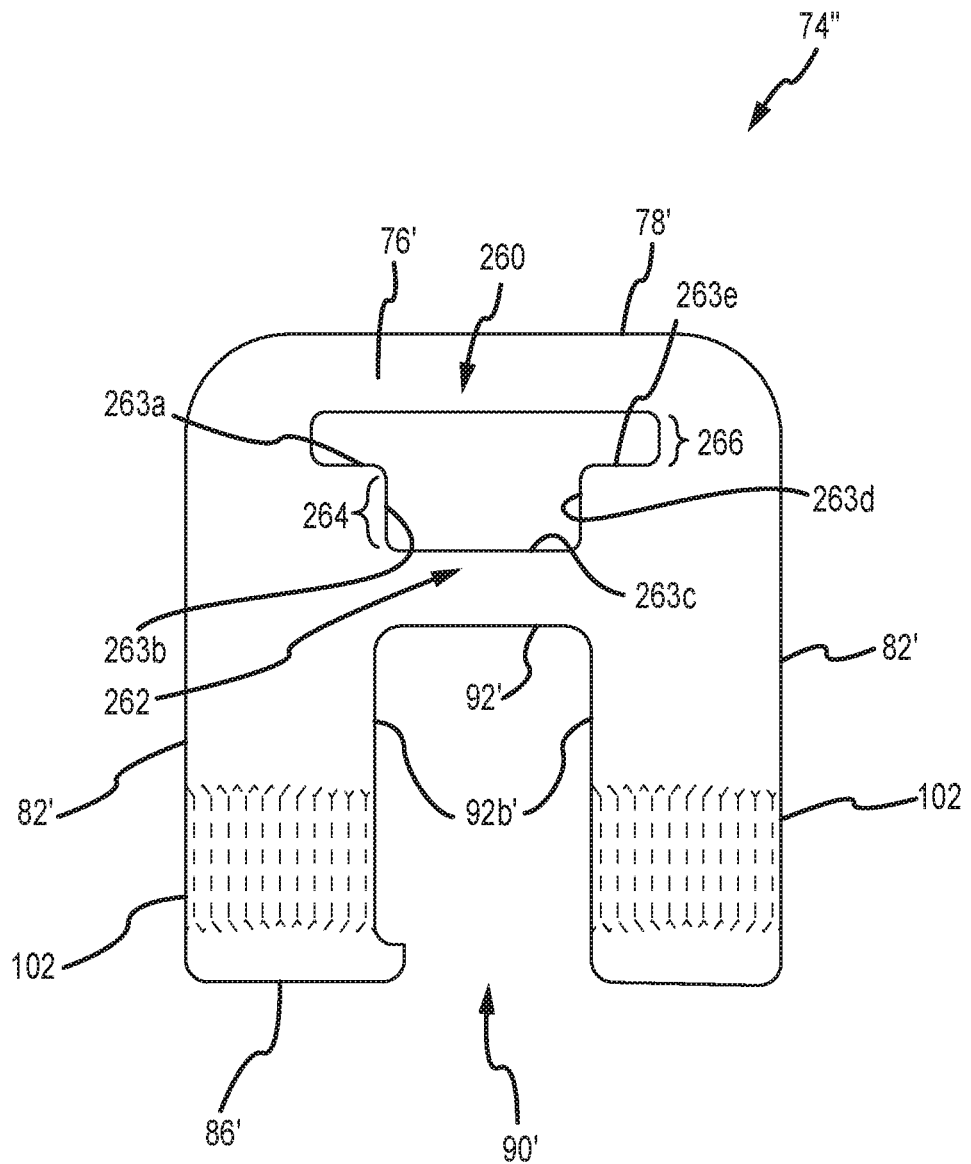
FIG. 25B is a cut-away view of the mounting bracket of FIG. 25A.

A variation of the mounting device 74' from the embodiment of FIGS. 24A-C is presented in FIGS. 25A-C and is identified by reference numeral 74". Corresponding components between these two embodiments are identified by the same reference numerals. Those corresponding components that differ in at least some respect may be further identified by a double prime designation in the embodiment of FIGS. 25A-C. The primary difference between these two embodiments is that the mounting device 74" of FIGS. 25A-C does not utilize the elongated mounting slot 98' that is used by the embodiment of FIGS. 24A-C. The mounting device 74" could instead use the threaded hole 98 shown in FIG. 5 (not shown). Alternatively, a self-drilling or self-tapping attachment fastener 280" could be used (having a slotted head 282", a flange 283", and a self-drilling or self-tapping shaft 284"). The base surface 263c in the case of the mounting device 74" (and also in the case of the mounting device 74' of FIGS. 24A-C), limits the amount that the attachment fastener (whether in the form of a bolt, a self-drilling or self-tapping fastener, or any other threaded fastener) can be directed into the corresponding mounting device, and keeps the end of the attachment fastener from contacting the standing seam 42. This is illustrated in FIG. 25C, and which also shows an attachment 250' installed on the mounting device 74".

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A building system comprising:
    a building surface comprising a plurality of interconnected panels that in turn comprises a plurality of building surface protrusions;
    a mounting device positioned on said building surface, wherein a first dimension coincides with a length of said mounting device, wherein a second dimension is orthogonal to said first dimension and coincides with a width of said mounting device, wherein a third dimension is orthogonal to a reference plane that contains said length and width of said mounting device and coincides with a height of said mounting device, wherein a length of each of said plurality of building surface protrusions coincides with said first dimension, wherein each adjacent pair of said plurality of building surface protrusions are spaced from one another in said second dimension, and wherein said plurality of building surface protrusions are parallel to one another in said first dimension;
    a first fastener engaged with each of said building surface and said mounting device, wherein said mounting device is maintained in a fixed position relative to said building surface, and wherein said mounting device is mounted to a first building surface protrusion of said plurality of building surface protrusions by said first fastener, said mounting device comprising:
        an upper wall disposed above and spaced from an underlying portion of said building surface in said third dimension;
        an un-threaded mounting slot that is elongated in said first dimension and that extends through said upper wall in said third dimension;
        an open space that is disposed directly below and aligned with said mounting slot in said third dimension, wherein said open space is located between said building surface and said mounting slot in said third dimension, and wherein said open space is bordered by said upper wall, a first portion of said mounting device that extends relative to said upper wall in a direction of said building surface, and a second portion of said mounting device that is spaced from said first portion of said mounting device in said second dimension and that extends relative to said upper wall in a direction of said building surface;
    an attachment fastener comprising a shaft, a first member positioned on said shaft, and a second member positioned on said shaft, wherein said first and second members are movable relative to one another along said shaft to change a spacing between said first and second members along said shaft, wherein said first member is positioned above said upper wall, wherein said shaft extends through said mounting slot, wherein said second member is positioned within said open space, and wherein said attachment fastener is disposable in multiple positions along said mounting slot and in said first dimension.

2. The building system of claim 1, wherein said mounting slot comprises a length, width, and depth, wherein said length of said mounting slot is measured in said first dimension and is of a greater magnitude than said width of said mounting slot, wherein said width of said mounting slot is measured in said second dimension, and wherein a depth of said mounting slot corresponds with a thickness of said upper wall and is measured in said third dimension.

3. The building system of claim 1, wherein said mounting device comprises a base that is spaced from an underside of said upper wall in said third dimension, and wherein said open space extends from said underside of said upper wall to said base in said third dimension.

4. The building system of claim 3, wherein said second member is a nut, wherein said open space is in the form of a receptacle, and wherein said base is configured to retain at least part of said nut within said receptacle in said third dimension.

5. The building system of claim 3, wherein said second member is a nut comprising a nut flange and a nut body, wherein said open space is in the form of a receptacle, wherein said receptacle comprises a nut flange receptacle and a nut body receptacle, wherein a width of said nut flange receptacle in said second dimension is larger than a width of said nut body receptacle in said second dimension, wherein an entirety of said nut flange is retained in said nut flange receptacle, and wherein said nut body extends into said nut body receptacle.

6. The building system of claim 5, wherein an effective outer diameter of said nut flange is larger than said width of said nut body receptacle in said second dimension.

7. The building system of claim 5, wherein said base comprises first and second base portions that are oppositely disposed, wherein said nut body receptacle extends between said first and second base portions.

8. The building system of claim 7, wherein said nut body is positioned between said first and second base portions.

9. The building system of claim 8, wherein said first and second base portions limit relative rotational movement between said nut and said mounting device.

10. The building system of claim 8, wherein said first and second base portions are disposed in closely spaced relation to opposing sidewall portions of said nut body.

11. The building system of claim 10, wherein at least a portion of said nut body is at all times retained between said first and second base portions.

12. The building system of claim 5, wherein said width of said nut body receptacle limits relative rotation between said nut and said mounting device.

13. The building system of claim 1, wherein said second member is a nut comprising a nut flange and a nut body, wherein said open space is in the form of a receptacle, wherein said receptacle comprises a nut flange receptacle and a nut body receptacle with said nut flange receptacle being located between said nut body receptacle and said upper wall in said third dimension, and wherein a width of said nut flange receptacle in said second dimension is larger than a width of said nut body receptacle in said second dimension.

14. The building system of claim 13, wherein an entirety of said nut flange is retained in said nut flange receptacle, and wherein said nut body extends into said nut body receptacle.

15. The building system of claim 14, wherein an effective outer diameter of said nut flange is larger than said width of said nut body receptacle.

16. The building system of claim 15, said width of said nut body receptacle is defined by a pair of base surfaces that are disposed in opposing relation, wherein each base surface of said pair is associated with a flat on a sidewall of said nut body, and wherein said base surfaces of said pair are spaced from each other in said second dimension such that each said flat is unable to be rotated past its corresponding said base surface.

17. The building system of claim 13, said width of said nut body receptacle is defined by a pair of base surfaces that are disposed in opposing relation, wherein each base surface of said pair is associated with a flat on a sidewall of said nut body, and wherein said base surfaces of said pair are spaced in said second dimension such that each said flat is unable to be rotated past its corresponding said base surface.

18. The building system of claim 1, wherein said open space is in the form of a receptacle, wherein said receptacle is defined at least in part by a pair of base surfaces that are disposed in opposing relation, wherein each base surface of said pair is associated with a flat on a sidewall of said second member, and wherein said base surfaces of said pair are spaced in said second dimension such that each said flat is unable to be rotated past its corresponding said base surface.

19. The building system of claim 1, wherein said open space is in the form of a receptacle, wherein said receptacle is defined at least in part by a pair of base surfaces that are spaced from one another in said second dimension and that each project in a direction of said upper wall, wherein said pair of base surfaces are spaced from an underside of said upper wall in said third dimension, and wherein said pair of base surfaces define a maximum amount that said second member is able to move away from said upper wall when said second member is disposed within said receptacle.

20. The building system of claim 1, wherein said open space is in the form of a receptacle, wherein said receptacle is defined in part by a base surface that projects toward said upper wall, that is vertically aligned with said mounting slot, and that is spaced from an underside of said upper wall in said third dimension, wherein a lowermost surface of said second member is positioned on said base surface.

21. The building system of claim 1, wherein said mounting device is of a one-piece construction.

22. The building system of claim 1, wherein said mounting slot is centrally disposed in said second dimension relative to an entirety of said mounting device in said second dimension.

23. The building system of claim 1, wherein said mounting device is disposed over a single one of said plurality of building surface protrusions in the form of a first building surface protrusion.

24. The building system of claim 23, wherein said first fastener engages said first building surface protrusion.

25. The building system of claim 1, wherein said mounting device is mounted to an adjacent pair of said plurality of building surface protrusions.

* * * * *